US012424884B2

United States Patent
Williams et al.

(10) Patent No.: US 12,424,884 B2
(45) Date of Patent: Sep. 23, 2025

(54) TRANSVERSE FLUX ELECTRIC MACHINE

(71) Applicant: Electric Torque Machines, Inc., Minneapolis, MN (US)

(72) Inventors: Tyler K. Williams, Flagstaff, AZ (US); Thomas F. Janecek, Flagstaff, AZ (US)

(73) Assignee: Graco Minnesota Inc., Minneapolis, MN (US)

( * ) Notice: Subject to any disclaimer, the term of this patent is extended or adjusted under 35 U.S.C. 154(b) by 627 days.

(21) Appl. No.: 17/797,873

(22) PCT Filed: Feb. 10, 2021

(86) PCT No.: PCT/US2021/017409
§ 371 (c)(1),
(2) Date: Aug. 5, 2022

(87) PCT Pub. No.: WO2021/163156
PCT Pub. Date: Aug. 19, 2021

(65) Prior Publication Data
US 2023/0058117 A1   Feb. 23, 2023

Related U.S. Application Data

(60) Provisional application No. 62/972,622, filed on Feb. 10, 2020, provisional application No. 62/972,615, filed on Feb. 10, 2020, provisional application No. 62/972,636, filed on Feb. 10, 2020, provisional application No. 62/972,609, filed on Feb. 10, 2020, (Continued)

(51) Int. Cl.
*H02K 1/14*   (2006.01)
*H02K 21/22*  (2006.01)

(52) U.S. Cl.
CPC ........... *H02K 1/145* (2013.01); *H02K 21/227* (2013.01); *H02K 2201/12* (2013.01)

(58) Field of Classification Search
CPC .............................. H02K 1/145; H02K 21/227
USPC ....................................................... 310/156.02
See application file for complete search history.

(56) References Cited

U.S. PATENT DOCUMENTS

| 2,243,318 A | 5/1941 | William |
| 5,306,183 A | 4/1994 | Holt et al. |
| 6,924,579 B2 | 8/2005 | Calley |

(Continued)

FOREIGN PATENT DOCUMENTS

| DE | 29500878 U1 | 10/1995 |
| DE | 102010018145 A1 | 10/2011 |

(Continued)

OTHER PUBLICATIONS

International Preliminary Report on Patentability for PCT Applicaiton No. PCT/US2021/017409, Dated Aug. 25, 2022, pp. 14.

(Continued)

*Primary Examiner* — Jose A Gonzalez Quinones
(74) *Attorney, Agent, or Firm* — Kinney & Lange, P.A.

(57) ABSTRACT

A transverse flux motor is formed by a stator portion and a rotor portion. The stator portion includes one or more phase assemblies formed by flux ring plates axially bracketing coil wire windings. The flux rings include teeth that magnetically interact with circumferentially opposed and adjacent teeth to form flux paths transverse to the axis of rotation of the rotor assembly.

20 Claims, 30 Drawing Sheets

Related U.S. Application Data provisional application No. 62/972,629, filed on Feb. 10, 2020.

(56) References Cited

U.S. PATENT DOCUMENTS

| | | | |
|---|---|---|---|
| 7,199,500 | B2 | 4/2007 | Yoshida |
| 7,626,308 | B2 | 12/2009 | Kang et al. |
| 7,876,019 | B2 | 1/2011 | Calley |
| 8,242,658 | B2 | 8/2012 | Calley et al. |
| 8,395,291 | B2 | 3/2013 | Calley et al. |
| 8,405,275 | B2 | 3/2013 | Calley et al. |
| 8,415,848 | B2 | 4/2013 | Calley et al. |
| 8,749,108 | B2 | 6/2014 | Dyer et al. |
| 8,760,023 | B2 | 6/2014 | Calley et al. |
| 8,854,171 | B2 | 10/2014 | Janecek |
| 8,952,590 | B2 | 2/2015 | Calley et al. |
| 8,970,205 | B2 | 3/2015 | Janecek et al. |
| 8,994,243 | B2 | 3/2015 | Calley et al. |
| 9,006,951 | B2 | 4/2015 | Janecek et al. |
| 9,236,773 | B2 | 1/2016 | Janecek et al. |
| 9,360,020 | B2 | 6/2016 | Janecek |
| 9,509,181 | B2 | 11/2016 | Janecek et al. |
| 9,618,003 | B2 | 4/2017 | Janecek et al. |
| 9,749,108 | B2 | 8/2017 | Hoshino et al. |
| 11,646,635 | B2 | 5/2023 | Janecek et al. |
| 2002/0074891 | A1 | 6/2002 | Gieras et al. |
| 2004/0046478 | A1 | 3/2004 | Zierer et al. |
| 2005/0012427 | A1 | 1/2005 | Seki et al. |
| 2009/0206696 | A1 | 8/2009 | Calley |
| 2011/0169366 | A1* | 7/2011 | Calley ............ H02K 29/03 310/216.112 |
| 2011/0221298 | A1 | 9/2011 | Calley et al. |
| 2012/0119599 | A1 | 5/2012 | Calley et al. |
| 2012/0119609 | A1 | 5/2012 | Janecek |
| 2012/0234108 | A1 | 9/2012 | Janecek et al. |
| 2012/0235519 | A1* | 9/2012 | Dyer ............ H02K 21/22 310/46 |
| 2013/0002068 | A1 | 1/2013 | Miyasaka et al. |
| 2013/0015733 | A1 | 1/2013 | Rasch et al. |
| 2015/0048712 | A1* | 2/2015 | Janecek ............ H02K 15/022 29/596 |
| 2015/0147188 | A1 | 5/2015 | Danielsson |
| 2017/0113773 | A1 | 4/2017 | Kaiser et al. |
| 2020/0031445 | A1 | 1/2020 | Wei |
| 2020/0083762 | A1 | 3/2020 | Nitta et al. |
| 2023/0058117 | A1 | 2/2023 | Williams et al. |

FOREIGN PATENT DOCUMENTS

| | | |
|---|---|---|
| DE | 102011084296 A1 | 4/2013 |
| DE | 112014006362 T5 | 11/2016 |
| EP | 1063754 A2 | 12/2000 |
| EP | 1587207 A1 | 10/2005 |
| EP | 2006977 A2 | 12/2008 |
| EP | 2159903 A2 | 3/2010 |
| EP | 2594477 A1 | 5/2013 |
| EP | 2686939 A2 | 1/2014 |
| EP | 3082231 A1 | 10/2016 |
| GB | 2491880 A | 12/2012 |
| JP | 2009005420 A | 1/2009 |
| WO | 2010064368 A1 | 6/2010 |
| WO | 2012125790 A2 | 9/2012 |
| WO | 2015089518 A1 | 6/2015 |
| WO | 2015163871 A1 | 10/2015 |
| WO | 2021163156 A1 | 8/2021 |
| WO | 2022035940 A1 | 2/2022 |
| WO | 2022066616 A2 | 3/2022 |
| WO | 2022165015 A1 | 8/2022 |
| WO | 2023043904 A1 | 3/2023 |
| WO | 2023055690 A2 | 4/2023 |
| WO | 2023114290 A1 | 6/2023 |

OTHER PUBLICATIONS

International Search Report and Written Opinion for PCT Application No. PCT/US2021/017409, Dated Jul. 20, 2021, pp. 20.

Invitation to Pay Additional Fees for PCT Application No. PCT/US2021/017409, Dated May 28, 2021, pp. 16.

* cited by examiner

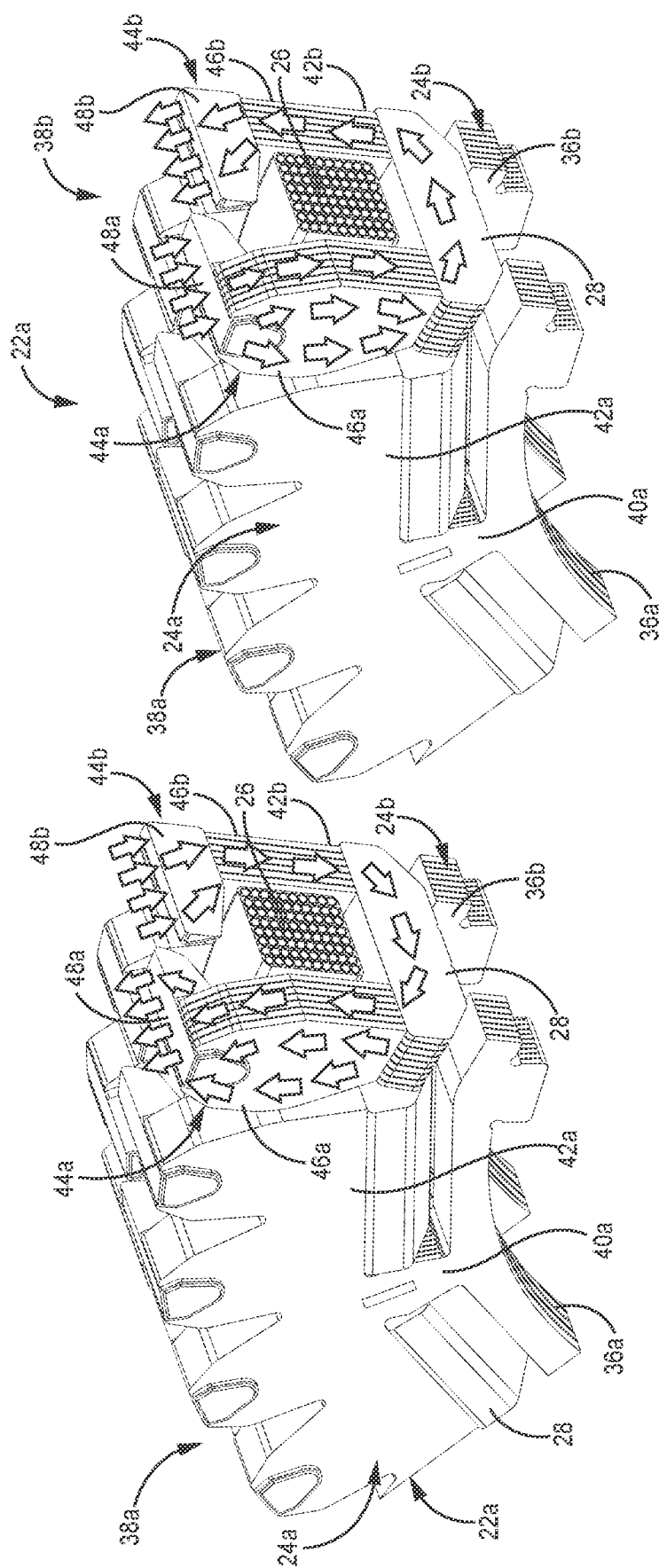

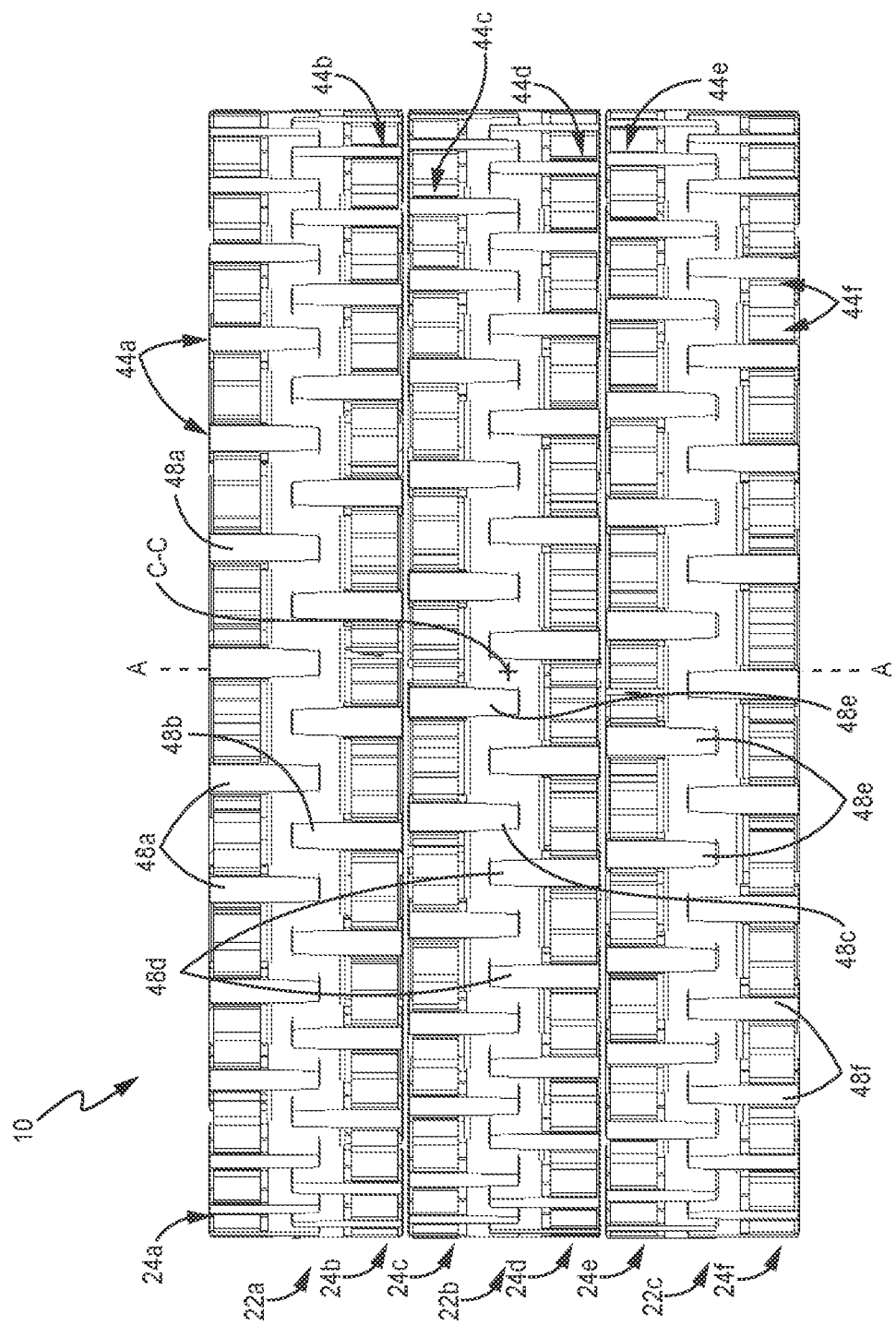

TRANSVERSE FLUX ELECTRIC MACHINE

CROSS-REFERENCE TO RELATED APPLICATION(S)

This application is a 371 national phase application of International Application No. PCT/US2021/017409, which claims the benefit of U.S. Provisional Application No. 62/972,609 filed Feb. 10, 2020 for "TOOTH ASSEMBLY FOR A TRANSVERSE FLUX ELECTRIC MACHINE EMPLOYING A LAMINATION STACK HAVING A TOOTH TRENCH WITH A TOOTH SPRING GEOMETRY," and claims the benefit of U.S. Provisional Application No. 62/972,615 filed Feb. 10, 2020 for "MULTIPHASE TRANSVERSE FLUX ELECTRIC MACHINE EMPLOYING A SINGLE LAMINATION GEOMETRY," and claims the benefit of U.S. Provisional Application No. 62/972,622 filed Feb. 10, 2020 for "LAMINATION RINGS WITH RETURN GAPS FOR COIL RETURN AND TRANSVERSE FLUX ELECTRIC MACHINE INCORPORATING SAME," and claims the benefit of U.S. Provisional Application No. 62/972,636 filed Feb. 10, 2020 for "TRANSVERSE FLUX ELECTRIC MACHINE WITH POTTING DIMPLES AND METHOD OF PRODUCING SAME," and claims the benefit of U.S. Provisional Application No. 62/972,629 filed Feb. 10, 2020 for "CONTINUOUSLY TAPERED TOOTH AND PHASE ASSEMBLIES WITH CONSTANT TOOTH OFFSET DISTANCES BETWEEN THE CONTINUOUSLY TAPERED TEETH," the disclosures of which are hereby incorporated by reference in their entireties.

BACKGROUND

The present disclosure relates generally to electric machines. More specifically, the present disclosure relates to transverse flux electric machines.

Electric motors utilize electricity to generate a mechanical output. Some electric motors generate rotational outputs. In alternating current (AC) induction motors, a stator is electrically energized to electromagnetically drive rotation of a rotor about a motor axis. The stator includes laminates and windings. The rotor includes permanent magnets that are acted on by the electromagnetic field induced by current through the stator to cause rotation of the rotor. Such electric motors include coils that extend axially relative to the rotational axis and that extend axially beyond the ends of the rotor to wrap around and form the ends of the coil windings.

Each coil represents a potential pole for acting on a magnet. The discrete coils arrayed circumferentially around the axis of rotation are out of phase with respect to each other. The potential torque generated is proportional to the number of poles. The number of poles in such a motor is limited by the ability to fit discrete coils circumferentially around the axis of rotation within the motor. Coil windings can be made smaller and the diameter of the stator can be made bigger to accommodate more coils to support more poles, but this increases the size, weight, and cost of the motor and still has limits. Power can also be increased when the rotor is rotating at a relatively high rate, whereby more coil-magnet passes can be experienced per unit time. This requires the motor to operate a relatively high speed, but some applications may desire low-speed output.

SUMMARY

According to one aspect of the present disclosure, an electric motor includes a stator and a rotor. The stator includes at least one phase assembly. The phase assembly includes a flux ring having a plurality of flux projections extending radially relative to an axis of rotation of the rotor.

According to an aspect of the present disclosure, an electric motor configured to generate a rotational output includes a rotor configured to rotate on a motor axis; and a stator configured to be electrically energized to generate magnetic flux that causes the rotor to rotate. The stator includes a flux ring comprising a hoop and a plurality of flux projections extending radially from the hoop and arranged circumferentially about the motor axis. A first flux projection of the plurality of flux projections includes a first holder and a first tooth disposed at least partially within the first holder and retained on the flux ring by the first holder.

According to an additional or alternative aspect of the present disclosure, a flux ring for an electric motor includes a ring body disposed about an axis and a plurality of flux projections extending radially relative to the ring body. Each flux projection of the plurality of flux projections includes a holder having a holder body extending radially relative to the ring body, a first finger extending from the holder body, and a second finger extending from the holder body; and a tooth disposed at least partially within a retaining cavity of the holder. The first finger and the second finger exert a radial force on the tooth to clamp the tooth within the retaining cavity.

According to another additional or alternative aspect of the present disclosure, a flux ring for use in a transverse flux electric motor includes a ring body disposed about an axis and a plurality of flux projections extending radially relative to the ring body. Each flux projection of the plurality of flux projections includes a holder having a holder body extending radially relative to the ring body, the holder defining a retaining cavity; and a tooth disposed at least partially within the retaining cavity of the holder. The retaining cavity includes a radial opening at an end of the cavity opposite the holder body. The retaining cavity includes a U-shaped base portion that has a first leg and a second leg, the first let canted in a first circumferential direction and the second leg canted in a second circumferential direction opposite the first circumferential direction.

According to yet another additional or alternative aspect of the present disclosure, a method of manufacturing a flux ring for use in a transverse flux electric motor includes forming a flux ring from a stack of laminate sheets, the flux ring having a hoop defining a motor axis and a plurality of holders extending radially relative to the hoop; aligning a powdered metal tooth with a receiving chamber of a first holder of the plurality of holders; shifting the powdered metal tooth axially relative to the flux ring such that the powdered metal tooth passes through an axial opening of the receiving chamber into the retaining cavity; and securing the tooth within the receiving chamber by a first finger of the first holder and a second finger of the second holder exerting a radial force on the tooth towards the hoop and seat the tooth within the retaining cavity.

According to yet another additional or alternative aspect of the present disclosure, a flux ring for forming a phase assembly of a transverse flux electric motor includes a ring body disposed about a motor axis; a plurality of trunks extending radially from the ring body; a plurality of branches supported by the plurality of trunks radially away from the body such that a plurality of return openings are defined between the ring body and the plurality of branches; and a plurality of flux projections extending radially from the plurality of branches and away from the ring body, wherein spacing gaps are formed circumferentially between adjacent flux projections of the plurality of flux projections. The flux ring includes a first lateral portion on a first side of a flip axis orthogonal to the motor axis and a second lateral portion on a second side of the motor axis. The return openings on the first lateral side are aligned with the return openings on the second lateral side about the flip axis. The flux projections on the first lateral side are misaligned with the flux projections of the second lateral side about the flip axis.

According to yet another additional or alternative aspect of the present disclosure, a phase assembly of a transverse flux electric motor includes a first flux ring disposed about a motor axis and having a first plurality of flux projections extending radially; a second flux ring disposed about the motor axis and having a second plurality of flux projections extending radially; a coil disposed axially between the first flux ring and the second flux ring; and a plurality of axial returns extending axially between the first flux ring and the second flux ring and into a first plurality of return openings of the first flux ring and a second plurality of return openings of the second flux ring. The first flux ring has a first configuration defining radial and circumferential locations of each of the first plurality of return openings and the first plurality of flux projections. The second flux ring has a second configuration defining radial and circumferential locations of each of the second plurality of return openings and the second plurality of flux projections. The first configuration is the same as the second configuration.

According to yet another additional or alternative aspect of the present disclosure, a stator for a transverse flux electric motor includes a plurality of flux rings disposed along and arrayed about a motor axis. Each flux ring of the plurality of flux rings includes a ring body disposed about a motor axis; a plurality of trunks extending radially from the ring body; a plurality of branches supported by the plurality of trunks radially away from the ring body such that a plurality of return openings are formed between the ring body and the plurality of branches; and a plurality of flux projections extending radially from the plurality of branches and away from the ring body. Each flux ring of the plurality of flux rings has a common base configuration defining radial and circumferential locations of each of the plurality of return openings and the plurality of flux projections. A first flux ring of the plurality of flux rings is disposed in a first position relative to the motor axis. A second flux ring of the plurality of flux rings is disposed in a second position relative to the motor axis, the second position rotated about the motor axis relative to the first position.

According to yet another additional or alternative aspect of the present disclosure, a flux ring for a phase assembly of a stator of a transverse flux electric motor includes a ring body disposed about a motor axis; a plurality of trunks extending radially from the ring body; a plurality of branches supported by the plurality of trunks radially away from the ring body such that a plurality of return openings are formed between the ring body and the plurality of branches; a plurality of flux projections extending radially from the plurality of branches and away from the ring body; and a plurality of gaps each disposed circumferentially between adjacent flux projections of the plurality of flux projections. A first gap of the plurality of gaps is disposed between a first branch of the plurality of branches and a second branch of the plurality of branches to define a wire return opening therebetween.

According to yet another additional or alternative aspect of the present disclosure, a flux ring for a phase assembly of a stator of a transverse flux electric motor includes a ring body disposed about a motor axis; a plurality of trunks extending radially from the ring body; a plurality of branches supported by the plurality of trunks radially away from the ring body such that a plurality of return openings are formed between the ring body and the plurality of branches; a plurality of flux projections extending radially from the plurality of branches and away from the ring body; a first plurality of gaps each disposed circumferentially between adjacent flux projections of the plurality of flux projections; and a second plurality of gaps each disposed circumferentially between adjacent branches of the plurality of branches. The second plurality of gaps are disposed asymmetrically about the motor axis.

According to yet another additional or alternative aspect of the present disclosure, a phase assembly for a transverse flux electric motor includes a first flux ring disposed about a motor axis; a second flux ring spaced axially from the first flux ring; a coil disposed axially between the first flux ring and the second flux ring; and a plurality of axial returns extending between the first flux ring and the second flux ring, wherein each axial return of the plurality of axial returns extends into a first return opening of the first flux ring and in a second return opening of the second flux ring. The plurality of axial returns are disposed asymmetrically about the motor axis. A first coil connector of the coil extends from the coil and radially through a return gap formed between a first axial return of the plurality of axial returns and a second axial return of the plurality of axial returns. A second coil connector of the coil extends from the coil and radially trough the return gap.

According to yet another additional or alternative aspect of the present disclosure, an electric motor includes a rotor configured to rotate about a motor axis; a stator comprising a plurality of phase assemblies arrayed along and about a motor axis; and an air gap disposed radially between the rotor and the stator. A size of the air gap between the rotor and the stator varies.

According to yet another additional or alternative aspect of the present disclosure, a potting assembly for applying potting compound to a stator of an electric motor, the stator configured to oppose a rotor with an air gap disposed radially between the stator and the rotor to form the electric motor. The potting assembly includes a conformable member configured to interface with a surface of the stator exposed to the air gap; and an opposing member disposed on an opposite radial side of the stator from the conformable member such that the stator is radially bracketed by the conformable member and the opposing member. The conformable member projects into gaps formed between flux collecting components of the stator to define dimples in the surface of the stator exposed to the air gap.

According to yet another additional or alternative aspect of the present disclosure, an electric motor includes a rotor configured to rotate about a motor axis; a stator comprising a plurality of phase assemblies arrayed along and about a motor axis; and an air gap disposed radially between the rotor and the stator. A plurality of dimples are formed in a surface of the stator exposed to the air gap.

According to yet another additional or alternative aspect of the present disclosure, an electric motor includes a rotor that rotates about a motor axis and a stator. The stator includes at least one phase. Each phase includes a first flux ring, the first flux ring comprising a first plurality of return slots, a first plurality of flux projections, a first face side, and a first away side; a second flux ring, the second flux ring comprising a second plurality of return slots, a second plurality of flux projections, a second face side, and a second away side, wherein the first flux ring and the second flux ring are positioned such that the first plurality of flux projections are offset circumferentially with respect to the second plurality of flux projections; a plurality of returns arrayed around the motor axis, each return of the plurality of returns extending, respectively, into one of the first plurality of return slots and one of the second plurality of return slots such that each return bridges between the first flux ring and the second flux ring; and a coil disposed directly between the first flux ring and the second flux ring such that the first face side of the first flux ring faces the coil and the second face side of the second flux ring faces the coil. Positions of the first plurality of return slots and the first plurality of flux projections on the first flux ring with respect to the motor axis are the flip mirror of positions of the second plurality of return slots and the second plurality of flux projections on the second flux ring.

According to yet another additional or alternative aspect of the present disclosure, a method for assembling a first phase of an electric motor includes positioning a first flux ring of a plurality of flux rings to be coaxial with a motor axis, wherein each flux ring of the plurality of flux rings has a plurality of return slots, a plurality of flux projections, a face side, and an away side; positioning a first side of a coil adjacent to the first flux ring and coaxial with the motor axis such that the face side of the first flux ring faces the first side of the coil; positioning a second flux ring of the plurality of flux rings to be coaxial with the motor axis and adjacent to the coil such that the face side of the second flux ring faces a second side of the coil and the coil is directly between the first flux ring and the second flux ring, and further such that the plurality of flux projections of the first flux ring are circumferentially offset from the plurality of flux projections of the second flux ring; and inserting a plurality of axial returns into the plurality of return slots of the first flux ring and the plurality of return slots of the second flux ring such that each return bridges between the first flux ring and the second flux ring and the plurality of axial returns are arrayed around the motor axis.

According to yet another additional or alternative aspect of the present disclosure, an electric motor includes a rotor which rotates about a motor axis and a stator including at least one phase. Each phase includes a first flux ring comprising a first plurality of trunks and a first plurality of flux projections that are supported by the first plurality of trunks, wherein the first plurality of trunks are unevenly arrayed circumferentially around the motor axis; a second flux ring comprising a second plurality of trunks and a second plurality of flux projections that are supported by the second plurality of trunks; and a coil that is coaxial with the motor axis and located directly between the first flux ring and the second flux ring, the coil configured to be energized to electromagnetically polarize the first plurality of flux projections with respect to the second plurality of flux projections.

According to yet another additional or alternative aspect of the present disclosure, an electric motor includes a rotor which rotates about a motor axis; and a stator comprising at least one phase. Each phase includes a first flux ring comprising a first plurality of groups of branches and a first plurality of flux projections that are supported by the first plurality of groups of branches, wherein the first plurality of groups of branches are unevenly arrayed circumferentially around the motor axis in respective groups; a second flux ring comprising a second plurality of groups of branches and a second plurality of flux projections that are supported by the second plurality of groups of branches; and a coil that is coaxial with the motor axis and located directly between the first flux ring and the second flux ring, the coil configured to be energized to electromagnetically polarize the first plurality of flux projections with respect to the second plurality of flux projections.

According to yet another additional or alternative aspect of the present disclosure, an electric motor includes a rotor which rotates about a motor axis and a stator comprising at least one phase. Each phase includes a first flux ring comprising a first plurality of flux projections arrayed circumferentially around the motor axis, each flux projection of the first plurality of flux projections formed at least in part from each of a first plurality of laminations; a second flux ring comprising a second plurality of flux projections arrayed circumferentially around the motor axis, each flux projection of the second plurality of flux projections formed at least in part from each of a second plurality of laminations; a plurality of axial returns, each axial return formed from a respective stack of a first plurality of lamination stacks, the first plurality of lamination stacks unevenly arrayed around the motor axis, each axial return bridging between the first flux ring and the second flux ring; and a coil that is coaxial with the motor axis and located directly between the first flux ring and the second flux ring, the coil configured to be energized to electromagnetically polarize the first plurality of flux projections with respect to the second plurality of flux projections.

According to yet another additional or alternative aspect of the present disclosure, an electric motor includes a rotor which rotates about a motor axis, a stator having at least one phase, and an air gap located between the rotor and the stator. Each phase includes a first plurality of flux projections arrayed circumferentially around the motor axis; a second plurality of flux projections arrayed circumferentially around the motor axis; a coil that is coaxial with the motor axis and located axially between the first plurality of flux projections and the second plurality of flux projections; and a potting compound that embeds the first plurality of flux projections, the second plurality of flux projections, and the coil in a contiguous matrix of potting compound, the potting compound forming a first plurality of dimples that face the air gap.

BRIEF DESCRIPTION OF THE DRAWINGS

FIG. 3B is an enlarged cross-sectional view taken along line 8-8 in FIG. 8A showing electric flux flow through the phase assembly.

FIG. 3C is an enlarged cross-sectional view taken along line 8-8 in FIG. 8A showing electric flux flow opposite to that shown in FIG. 3B.

FIG. 6C is a top view of the stator.

DETAILED DESCRIPTION

The present invention is directed to a transverse flux electric machine. The electric machine includes a rotor rotatable about a motor axis and a stator configured to drive rotation of the rotor. The stator of the transverse flux electric motor includes phase assemblies, such as one, two, three, or more, formed from flux rings and a coil disposed axially between opposing flux rings. The flux rings include flux projections that extend radially relative to the motor axis and towards the rotor. The flux projections can include teeth that extend axially over the coil. The flux rings of a phase assembly are joined by axial returns contacting each flux ring and disposed on an opposite radial side of the coil from the rotor. The rotor includes permanent magnets and concentrators interspersed between the permanent magnets. It is understood that, while the electric machine is generally discussed as being an electric motor, the principles discussed herein are applicable to other electric machines, such as generators.

Figure 1:
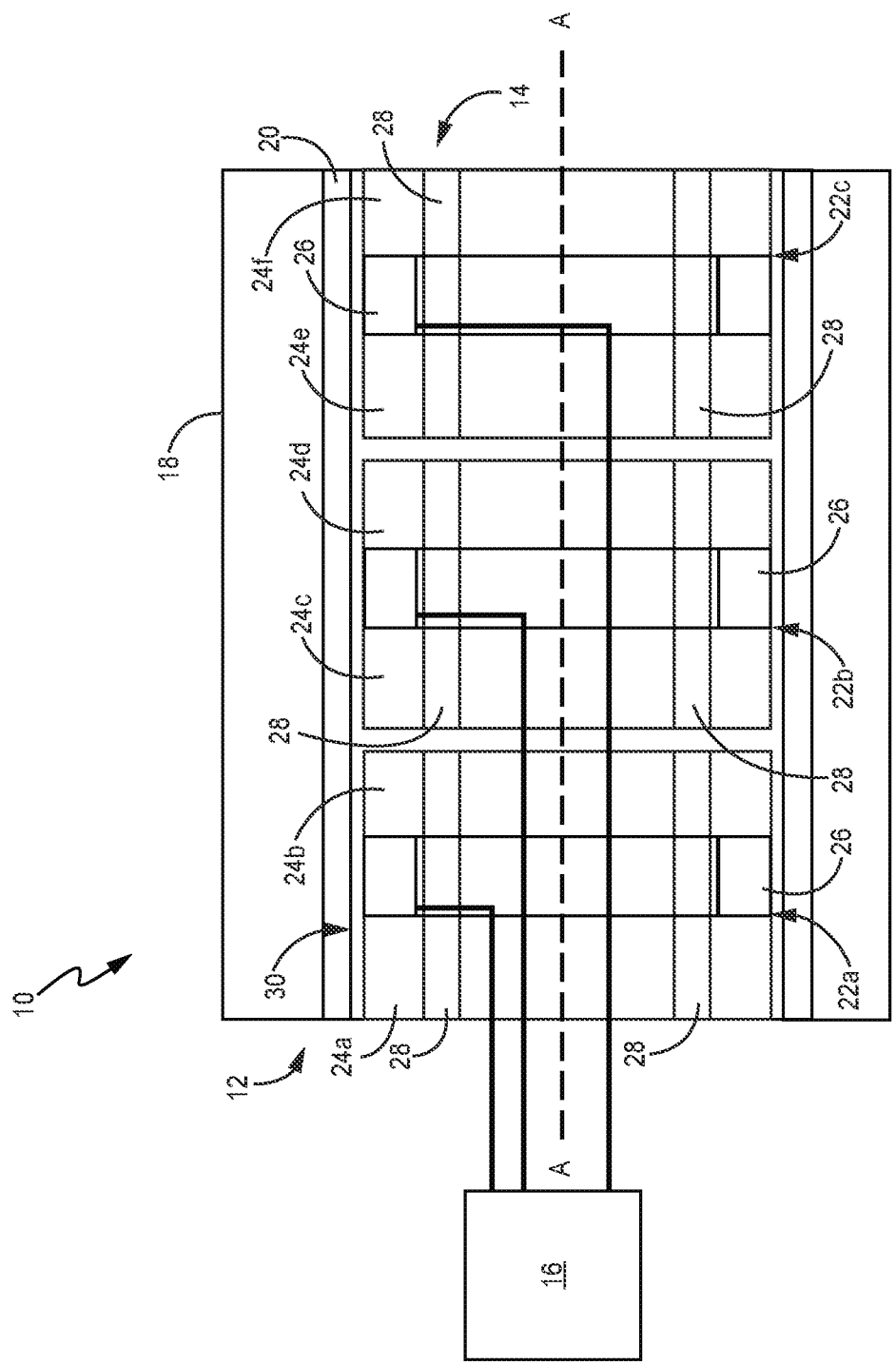
FIG. 1 is a schematic block diagram of a transverse flux electric motor.

FIG. 1 is a block diagram of electric machine 10. Electric machine 10 includes rotor 12, stator 14, and motor controller 16. Rotor 12 includes rotor body 18 and permanent magnet array 20. Stator 14 includes phase assemblies 22a, 22b, 22c (collectively herein "phase assembly 22" or "phase assemblies 22"). Phase assembly 22a includes flux rings 24a, 24b, coil 26, and axial returns 28. Phase assembly 22b includes flux rings 24c, 24d, coil 26, and axial returns 28. Phase assembly 22c includes flux rings 24e, 24f, coil 26, and axial returns 28. Flux rings 24a-24f are referred to collectively herein as "flux rings 24" or "flux ring 24".

Rotor 12 is spaced radially from stator 14 such that air gap 30 is formed between rotor 12 and stator 14. Electric machine 10 extends along motor axis A-A and rotor 12 is configured to rotate about motor axis A-A. In the example shown, rotor 12 surrounds stator 14 such that electric machine 10 is an outer rotator. It is understood, however, that some examples of electric machine 10 include stator 14 extending about rotor 12 such that electric machine 10 is an inner rotator. Permanent magnet array 20 is mounted to the radially inner side of rotor body 18. Permanent magnet array 20 is disposed across air gap 30 from stator 14 such that permanent magnet array 20 is spaced radially from stator 14. Permanent magnet array 20 includes a plurality of permanent magnets disposed annularly about motor axis A-A.

Stator 14 is formed by phase assemblies 22 arrayed along the motor axis A-A. Each phase assembly 22 includes paired flux rings 24 that are disposed on opposite axial sides of a coil 26 of that phase assembly 22. Flux rings 24a, 24b are paired to form phase assembly 22a and are disposed on opposite axial sides of the coil 26 of phase assembly 22a. Flux rings 24c, 24d are paired to form phase assembly 22b and are disposed on opposite axial sides of the coil 26 of phase assembly 22b. Flux rings 24e, 24f are paired to form phase assembly 22b and are disposed on opposite axial sides of the coil 26 of phase assembly 22c.

In some examples, portions of each flux ring 24 can extend axially over the coil 26. As such, portions of each flux ring 24 can be disposed radially between the coil 26 and permanent magnet array 20, as discussed in more detail below. Flux rings 24 are formed by laminations and can include powdered metal components. Flux rings 24 can be configured to have radially oriented lamination grain.

Laminations can be formed from material which is readily susceptible to polarization from the fields generated by coils 26. Such material is typically ferromagnetic. The ferromagnetic materials can be metal such as iron or an alloy of iron, such as steel. More specially, laminations can be formed from silicon steel, among other options. Ferromagnetic material can be a ceramic that is doped or otherwise embedded with ferromagnetic elements.

For each phase assembly 22, axial returns 28 are disposed on an opposite radial side of coil 26 from permanent magnet array 20. Axial returns 28 extend between and connect paired ones of the flux rings 24 in each phase assembly 22. Axial returns 28 electrically connect the paired flux rings 24. Axial returns 28 can be formed by stacked laminations having an axially oriented lamination grain (e.g., parallel with the motor axis A-A).

Each coil 26 is a winding of wire, typically copper, around the motor axis A-A. Thus, each coil 26 could be a continuous winding of 20, 30, 40, 50, 100, or less or more wire loops around the motor axis. In some embodiments, a ribbon is wound instead of a wire.

Controller 16 is operably connected to electric machine 10, electrically or communicatively, to control operation of electric machine 10, thereby controlling the rotational output of electric machine 10. Controller 16 can be of any desired configuration for controlling operation of electric machine 10 and can include control circuitry and memory. Controller 16 is configured to store executable code, implement functionality, and/or process instructions. Controller 16 is configured to perform any of the functions discussed herein, including controlling operation of any components referenced herein. Controller 16 can be of any suitable configuration for controlling operation of electric machine 10, gathering data, processing data, etc. Controller 16 can include hardware, firmware, and/or stored software. Controller 16 can be of any type suitable for operating in accordance with the techniques described herein. While controller 16 is illustrated as a single unit, it is understood that controller 16 can be entirely or partially mounted on one or more boards. In some examples, controller 16 can be implemented as a plurality of discrete circuitry subassemblies.

During operation, an alternating current (AC) signal is run through each coil 26. The AC signal rapidly builds and collapses the magnetic field due to the current reversal of the AC signal through the coil 26. Flux concentrating material of each phase assembly 22 (e.g., the flux rings 24 and axial returns 28) is wrapped around at least three sides of the coil 26. Generally, flux flows with the grain, along the direction of lamination, as flux will generally follow the path of highest permeability and there is significant resistance to flux jumping from one layer of lamination to another layer of lamination. The lamination grain of the flux rings 24 can be radially orientated relative to motor axis A-A while the lamination grain of the axial returns 28 can be axially oriented relative to motor axis A-A. As such, the flux flows axially through the axial returns 28 and radially through flux rings 24 in a U-shaped path about coil 26 and towards rotor 12.

The AC signal routed through the coil 26 is synchronized to develop magnetic fields through the flux rings 24 in time with the rotational position of permanent magnet array 20 to drive rotation of rotor 12. The respective AC signals (e.g., sinusoidal or trapezoidal) delivered through the coils 26 in each phase assembly 22a, 22b, 22c are out of phase with respect to each other. In this way, the magnets forming the permanent magnet array 20 more frequently have flux peaks acting on them, as compared to synchronizing the sinusoidal AC signals, thereby providing a smoother torque profile acting on the rotor 12 along the motor axis A-A. The embodiment of the electric machine 10 discussed has three phases corresponding to the three phase assemblies 22a, 22b, 22c and respective coils 26 therein. As such, three sinusoidal AC signals are delivered through the coils 26 120-degrees electrically offset. It is understood that, while electric machine 10 is generally discussed as being an electric motor, electric machine 10 can be a generator.

Figure 2A:
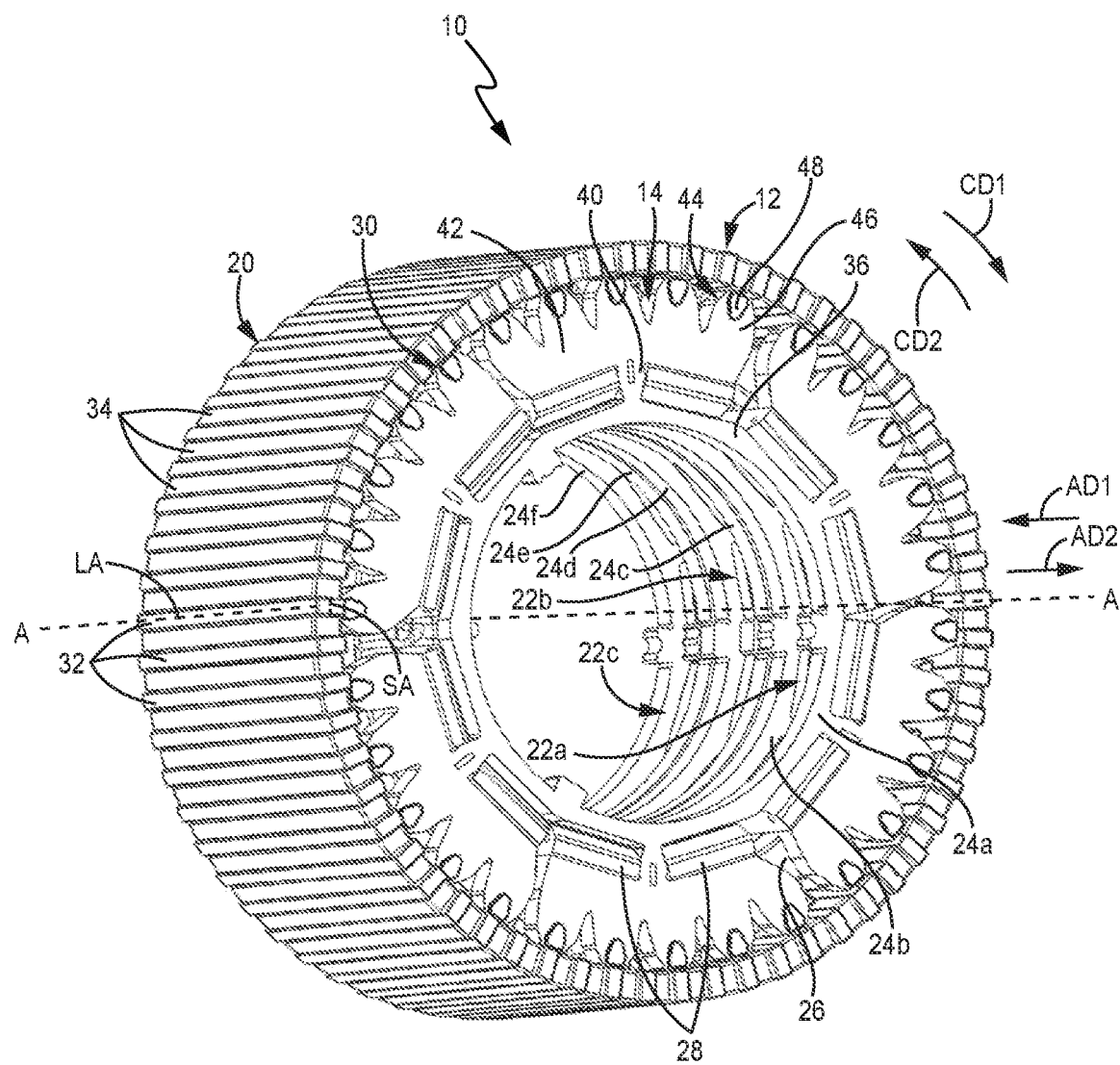
FIG. 2A is an isometric view showing parts of an electric motor in isolation.
Figure 2B:
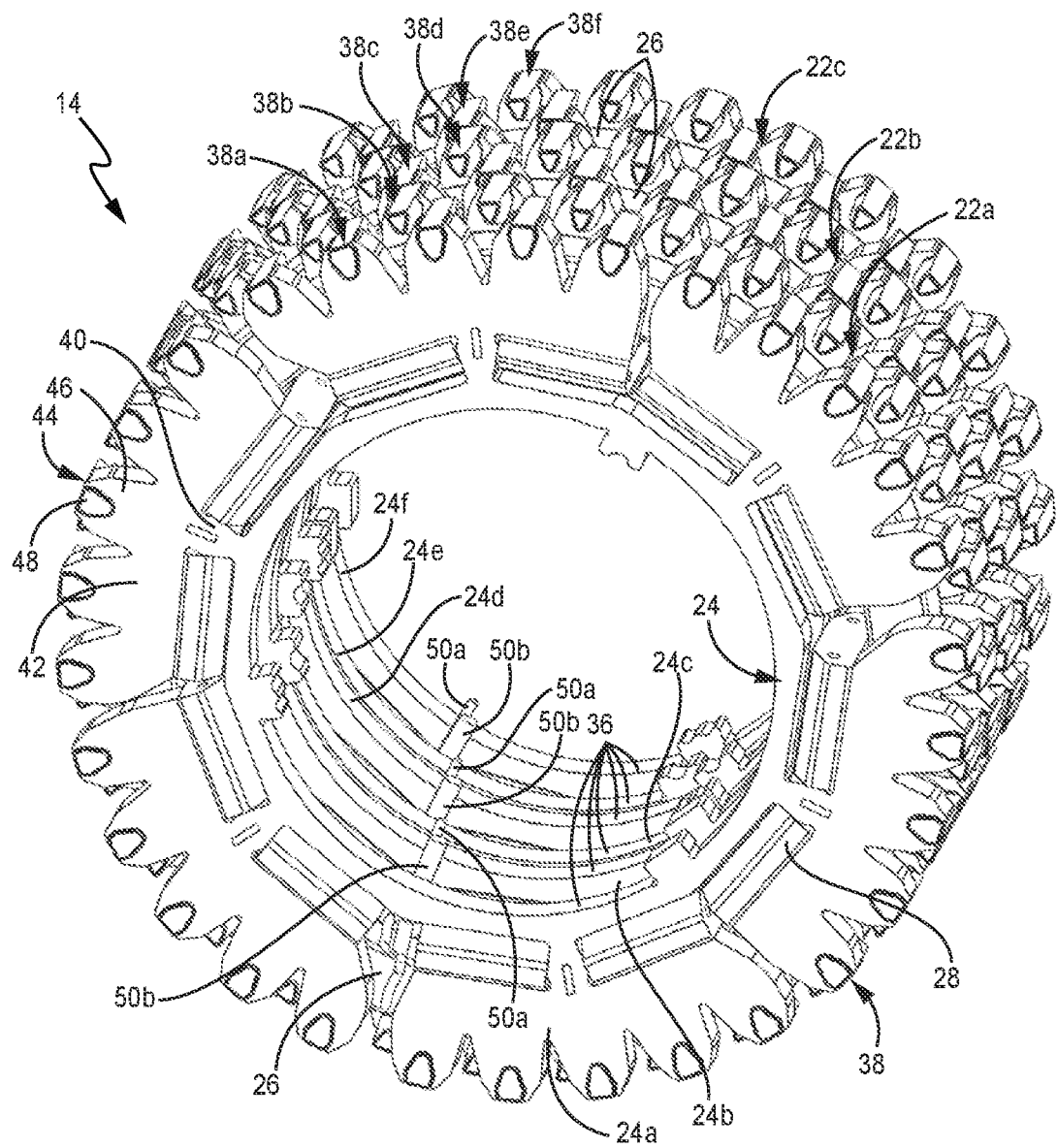
FIG. 2B is an isometric view of a stator of an electric motor.

FIG. 2A is an isometric view showing parts of electric machine 10 in isolation. FIG. 2B is an isometric view of stator 14. FIGS. 2A and 2B will be discussed together. Electric machine 10 includes rotor 12 and stator 14. Permanent magnet array 20 of rotor 12 is shown. Permanent magnet array 20 includes magnets 32 and concentrators 34. Stator 14 includes phase assemblies 22a, 22b, 22c. Phase assembly 22a includes flux rings 24a, 24b, coil 26, and axial returns 28. Phase assembly 22b includes flux rings 24c, 24d, coil 26, and axial returns 28. Phase assembly 22c includes flux rings 24e, 24f, coil 26, and axial returns 28. Each flux ring 24a-24f includes ring body 36, trunks 40, branches 42, and flux projections 44. Each flux projection 44 includes holder 46 and tooth 48.

Electric machine 10 includes stator 14 surrounded by rotor 12. Stator 14 is configured to drive rotation of rotor 12 about motor axis A-A. Both rotor 12 and stator 14 are disposed coaxially on motor axis A-A. Air gap 30 is disposed radially between rotor 12 and stator 14 and similarly has a cylindrical profile coaxial with the motor axis A-A. In the example shown, rotor 12 surrounds stator 14 such that rotor 12 rotates circumferentially around stator 14 about the motor axis A-A. Electric machine 10 can thus be considered as an outer rotating motor. It is understood, however, that some examples include rotor 12 located radially inside of stator 14. In such examples the electric machine 10 can be considered as an inner rotating motor. The principles of operation of the electric machine 10, and the structure of the rotor 12 and stator 14, can be similar whether the rotor 12 is around the stator 14 or within the stator 14. While the below discussion refers to an embodiment where the rotor 12 rotates around the stator 14, it is understood that the teachings are equally applicable to embodiments in which the rotor 12 rotates within the stator 14.

In the illustrated embodiment, rotor 12 includes permanent magnet array 20. The permanent magnet array 20 includes a plurality of magnets 32. The plurality of magnets 32 are annularly arrayed about the motor axis A-A. More specifically, the tubular array of the plurality of magnets 32 is coaxial with the motor axis A-A. The plurality of magnets 32 are circumferentially arrayed about the stator 14 and motor axis A-A.

Each magnet 32 has a long axis LA, as indicated in FIG. 2A. The long axis LA is orientated axially, parallel with the motor axis A-A. Each magnet 32 also has a short axis SA, as indicated in FIG. 2A. The short axis SA is orientated orthogonal to the long axis and tangentially with respect to a circle centered on the motor axis A-A. Each magnet 32 has permanent poles, north N (shown in FIG. 3D) and south S (shown in FIG. 3D), that are circumferentially orientated. More specifically, each magnet 32 has a north pole at one end of the short axis SA and a south pole at the opposite end of the short axis SA. Each of the north pole and south pole extends the length of the long axis LA such that the north and south poles are divided by an axial interface along the long axis LA. The north and south poles of each magnet 32 are not axially orientated in the way that magnets are typically divided to the north and south poles at opposite ends of a long axis. Each magnet 32 is continuous between the phase assemblies 22a-22c such that each magnet 32 extends straight, parallel to motor axis A-A and such that each magnet 32 is positioned to magnetically interact with each phase assembly 22.

In the illustrated embodiment, the plurality of magnets 32 are annularly arrayed about the stator 14, but as previously mentioned, the plurality of magnets 32 could be annularly arrayed radially within the stator 14 for an inner rotator example of electric machine 10. Stator 14 and rotor 12 magnetically interface to drive rotation of rotor 12 about stator 14 and motor axis A-A. The stator 14 may not include any permanent magnets but rather is an electromagnet that generates a magnetic field when electrically energized by coils 26, as further described herein. Likewise, the rotor 12 may include only permanent magnets and not include any electromagnets.

Rotor 12 further includes a plurality of concentrators 34. The plurality of concentrators 34 are interleaved with the plurality of magnets 32 such that the magnets 32 and concentrators 34 alternate and each magnet 32 is bracketed by concentrators 34 and each concentrator 34 is bracketed by magnets 32. In this way, none of the magnets 32 physically contact each other but are nevertheless physically fixed by the plurality of concentrators 34. The plurality of concentrators 34 are orientated axially, such that the long axis of each concentrator 34 is parallel with the motor axis A-A. The long axis of each concentrator 34 is parallel with the long axis of each magnet 32. Each concentrator 34 can be formed by stacked laminations. The long axis of each lamination is orientated parallel with the motor axis A-A. As such, the grain of the stack of laminations is oriented axially.

Stator 14 includes an array of phase assemblies 22a-22c. The phase assemblies 22a-22c are arrayed along the motor axis A-A. Each phase assembly 22 is formed by a pair of paired flux rings 24. Phase assembly 22a is formed by paired flux rings 24a, 24b. Phase assembly 22b is formed by paired flux rings 24c, 24d. Phase assembly 22c is formed by paired flux rings 24e, 24f. A coil 26 is sandwiched axially between the paired flux rings 24 of each phase assembly 22. The multiple coils 26 do not overlap with each other along the motor axis A-A. There is an axial gap along motor axis A-A between each of the coils 26 disposed along the motor axis A-A. The phase assemblies 22a-22c do not overlap with each other along motor axis A-A. The flux rings 24 of each phase assembly 22a-22c do not overlap or contact each other. For example, the flux rings 24a, 24b of phase assembly 22a do not overlap along motor axis A-A with the flux rings 24c, 24d or the flux rings 24e, 24f. Unlike the flux rings 24 of differing phase assemblies 22, the flux rings 24 within each phase assembly 22 (e.g., flux rings 24a, 24b of phase assembly 22a) do axially overlap along motor axis A-A. Specifically, the teeth 48 of the paired ones of flux rings 24 forming each phase assembly 22 axially overlap along motor axis A-A.

Each of phase assemblies 22a, 22b, 22c can be structurally and functionally identical, the only difference being that the signals delivered through the coils 26 are out of phase with respect to each other. In some examples, each flux ring 24 can have a common base configuration, as discussed in more detail below. For example, flux ring 24a of phase assembly 22a can have the same operational geometries as flux ring 24b of phase assembly 22a. The paired ones of flux rings 24 are assembled together such that a first one of the flux rings 24 (e.g., flux ring 24a) has teeth 48 projecting in a first axial direction AD1 and the second one of the flux rings 24 (e.g., flux ring 24b) has teeth 48 extending in a second axial direction AD2 opposite the first axial direction AD1. The teeth 48 of the first flux ring 24 extend into circumferential gaps between teeth 48 of the second flux ring 24. Teeth 48 of the second flux ring 24 extend into circumferential gaps between teeth 48 of the second flux ring 24.

Each flux ring 24a-24f includes an annular flux projection array 38a-38f, respectively formed by the flux projections 44 of that flux ring 24. Flux projection arrays 38a-38f can be referred to collectively as "flux projection array 38" or "flux projection arrays 38". The plurality of flux rings 24a-24f are arrayed along the motor axis A-A. Each flux ring 24a-24f is coaxial with the motor axis A-A. The laminate pieces forming each flux ring 24 also forms parts of the flux projections 44 of that flux ring 24. For example, holders 46 can be formed from the laminates. The flux projections 44 in this embodiment further include powdered metal tips, formed by teeth 48. It is understood, however, that in various other examples the laminate pieces may fully form the flux projections 44.

Annular flux projection arrays 38a-38f are coaxial with motor axis A-A. Each flux projection array 38 is formed by the flux projections 44 of its flux ring 24. Each flux projection 44 projects toward the rotor 12. For example, each flux projection 44 can extend radially (orthogonal) with respect to the motor axis A-A toward the rotor 12. In this embodiment, each flux projection 44 is a structure that narrows toward the rotor 12 to focus concentrated flux to a limited part of the rotor 12. In some embodiments, the flux projections 44 may not narrow toward the rotor 12 but nevertheless may concentrate flux toward the rotor 12. The flux projections 44 project outward from the motor axis A-A in the example shown because the rotor 12 is located radially outward from the stator 14. However, in alternative inner rotor embodiments the flux projections 44 project inward towards such rotor 12 and toward the motor axis A-A. The flux projections 44 of stator 14 are arrayed to have a tubular profile. More specifically, the flux projections 44 are arrayed annularly about the motor axis A-A and arrayed axially along the motor axis A-A. In this way, the stator 14 comprises a plurality of circular flux projection arrays 38a-38f.

FIGS. 2A-2B show six circular flux projection arrays 38a-38f, the six circular flux projection arrays 38a-38f arrayed along the motor axis A-A. The plurality of circular flux projection arrays 38a-38f are arrayed along the motor axis A-A. Each circular flux projection array 38 is coaxial with the motor axis A-A.

The circular flux projection arrays 38a-38f can be formed as part of the plurality of flux rings 24a-24f, respectively. Each flux ring 24 supports all of the flux projections 44 of the respective circular flux projection array 38 of that flux ring 24. Each flux ring 24 can be a contiguous laminate piece or formed from a plurality of laminate pieces arrayed about the motor axis A-A. In this example, each flux ring 24a-24f includes a ring body 36, a trunk 40 that extends radially relative to the ring body 36, and a branch 42 supported by the trunk 40. Flux projections 44 extend from the branches 42. Whether assembled from discrete laminate pieces each supporting multiple but not all flux projections 44 of a circular flux projection array 38 or formed from a continuous laminate that supports all flux projections 44 of a circular flux projection array 38, the circular flux projection array 38 is supported by flux rings 24 that allows flow of flux between circumferentially adjacent flux projections 44 of a phase assembly 22.

In the example shown, each flux projection array 38 extends radially from the ring body 36 of its flux ring 24. Each ring body 36 is coaxial with the motor axis A-A. In the example shown, trunks 40 extend radially from ring body 36. Each trunk 40 extends radially outward from ring body 36 because rotor 12 is an outer rotator in the example shown. Each branch 42 is supported by an associated trunk 40. In the example shown, each branch 42 projects towards the rotor from an associated one of the trunks 40. Each branch 42 extends circumferentially relative to the trunk 40. In the example shown, each branch 42 extends in both the first circumferential direction CD1 (clockwise in the view of FIG. 2A) and the second circumferential direction CD2 (counterclockwise in the view of FIG. 2A). Each branch supports multiple ones of flux projections 44. Flux projections 44 extend relative to branches 42 and towards rotor 12.

It is understood, however, that in some examples, the flux rings 24a-24f do not include the ring bodies 36 and/or trunks 40, in which case the branches 42 are directly connected and/or supported by other structure, such as being connected by epoxy. In some examples, multiple laminate pieces are assembled to form each circular flux projection array 38a-38f, such as a plurality of arc portions that assemble together.

In the example shown, each flux projection 44 is tipped with a powdered metal tooth 48, which can be ideal in some embodiments due to the powdered metal component lacking directional grain, unlike laminates. It is understood, however, that various embodiments are not so limited and each flux projection 44 may not include a powdered metal component. Each flux projection 44 may be formed partially or entirely by a laminate piece. For example, each flux projection 44 can be formed by the laminate forming other portions of flux ring 24 and, in some examples, forming ring body 36.

As shown, multiple circumferentially adjacent portions of flux projections 44 of a single flux ring 24 are formed by a single laminate piece. Each flux projection 44 may be contiguous with the branch 42, trunk 40, and/or ring body 36 of that flux ring 24. In this way, the flux projections 44, branches 42, trunks 40, and/or ring bodies 36 can be formed from a single laminate piece or by multiple laminate pieces. In the embodiment shown, the laminate piece forms the flux ring 24 as a contiguous piece. The flux projections 44, branches 42, trunks 40, and/or ring bodies 36 can have a laminate grain that extends radially (e.g., is orthogonal) with respect to the motor axis A-A. Such laminate grain may be only radially orientated, in some examples.

Each phase assembly 22 includes a pair of circular flux projection arrays 38 formed by the flux projection arrays 38 of the paired flux rings 24 of that phase assembly 22. For example, flux projection arrays 38a, 38b form the paired flux projection array of phase assembly 22a. As discussed in more detail below, paired ones of the flux projection arrays 38a-38f of each phase assembly 22a-22c are respectively connected by axial returns 28. Each set of paired flux projection arrays 38 is formed by the flux projections 44 of the paired flux rings 24 (e.g., the paired flux projection array 38a, 38b for phase assembly 22a is formed by the flux projections 44 of flux ring 24a and the flux projections 44 of flux ring 24b).

Paired ones of the flux rings 24a-24f of each phase assembly 22 are respectively connected by axial returns 28. Each axial return 28 is a stack of laminations that have a grain orientation that is axial (i.e. parallel with the motor axis A-A). In some examples the laminations are stacked circumferentially relative to axis A-A. The laminate grain of the axial returns 28 may be only axial, in some examples. The axial returns 28 conduct electromagnetic flux between each pair of flux rings 24 forming a phase assembly 22. Likewise, the axial returns 28 conduct electromagnetic flux between each pair of circular flux projection arrays 38 of a phase assembly 22. Likewise, the axial returns 28 conduct electromagnetic flux between axially adjacent branches 42 of each set of paired flux rings 24. For example, the axial returns 28 conduct electromagnetic flux between the axially adjacent branches 42 of flux ring 24a and flux ring 24b for phase assembly 22a. As further explained herein, the flux projections 44 of the paired ones of flux rings 24a-24f and paired ones of circular flux projection arrays 38a-38f form a plurality of flux circuits through the stator 14 that magnetically acts on the magnets 32 of the rotor 12 to rotate the rotor 12 relative to the stator 14.

Coils 26 are disposed axially between paired ones of the flux rings 24. Each coil 26 is a winding of wire, typically copper, around the motor axis A-A. Each coil 26 can be a continuous winding of 20, 30, 40, 50, 100, or less or more loops around the motor axis. The loops together form the hoop of coil 26. In some embodiments, a ribbon is wound instead of a wire. In the example shown, each coil 26 has two termination coil connectors 50a, 50b representing the ends of the circuit of each coil 26. Coil connectors 50a, 50b of the coil 26 can be formed by the wire forming the winding of coil 26 and are configured for running an AC signal through the coil 26, which wires can electrically connect with controller 16 (FIG. 1). For each phase assembly 22, coil connectors 50a, 50b extend between circumferentially adjacent ones of the axial returns 28 and between axially spaced ring bodies 36 of the paired flux rings 24 of that phase assembly 22.

Each coil 26 is radially overlapped by the flux projections 44 of an associated phase assembly 22 due to teeth 48 of the flux projections 44 projecting axially. It is understood, however, that in some examples the flux projections 44 do not project axially and instead only project radially (either toward or away from the motor axis A-A). Each coil 26 is directly axially between the paired flux rings 24 of its phase assembly 22. Each coil 26 of each phase assembly 22 is entirely between the pair of flux rings 24 of that phase assembly 22. The coil 26 of phase assembly 22a is disposed axially between flux rings 24a, 24b; the coil 26 of phase assembly 22b is disposed axially between flux rings 24c, 24d; and the coil 26 of phase assembly 22c is disposed axially between flux rings 24e, 24f.

In the example shown, each flux projection 44 is formed by holder 46 formed from laminate and tooth 48 formed from powdered metal. The holder 46 retains the tooth 48 on flux ring 24. As discussed in more detail below, tooth 48 can be press-fit to holder 46 and holder 46 can clamp tooth 48 to flux ring 24 to form flux projection 44. Tooth 48 projects axially from holder 46 and relative to laminate portions of flux ring 24. Tooth 48 projects axially from its flux ring 24 to the other flux ring 24 forming the pair of flux rings 24 of that phase assembly 22. A portion of each tooth 48 is disposed radially between an associated coil 26 and permanent magnet array 20 of rotor 12.

Figure 3A:
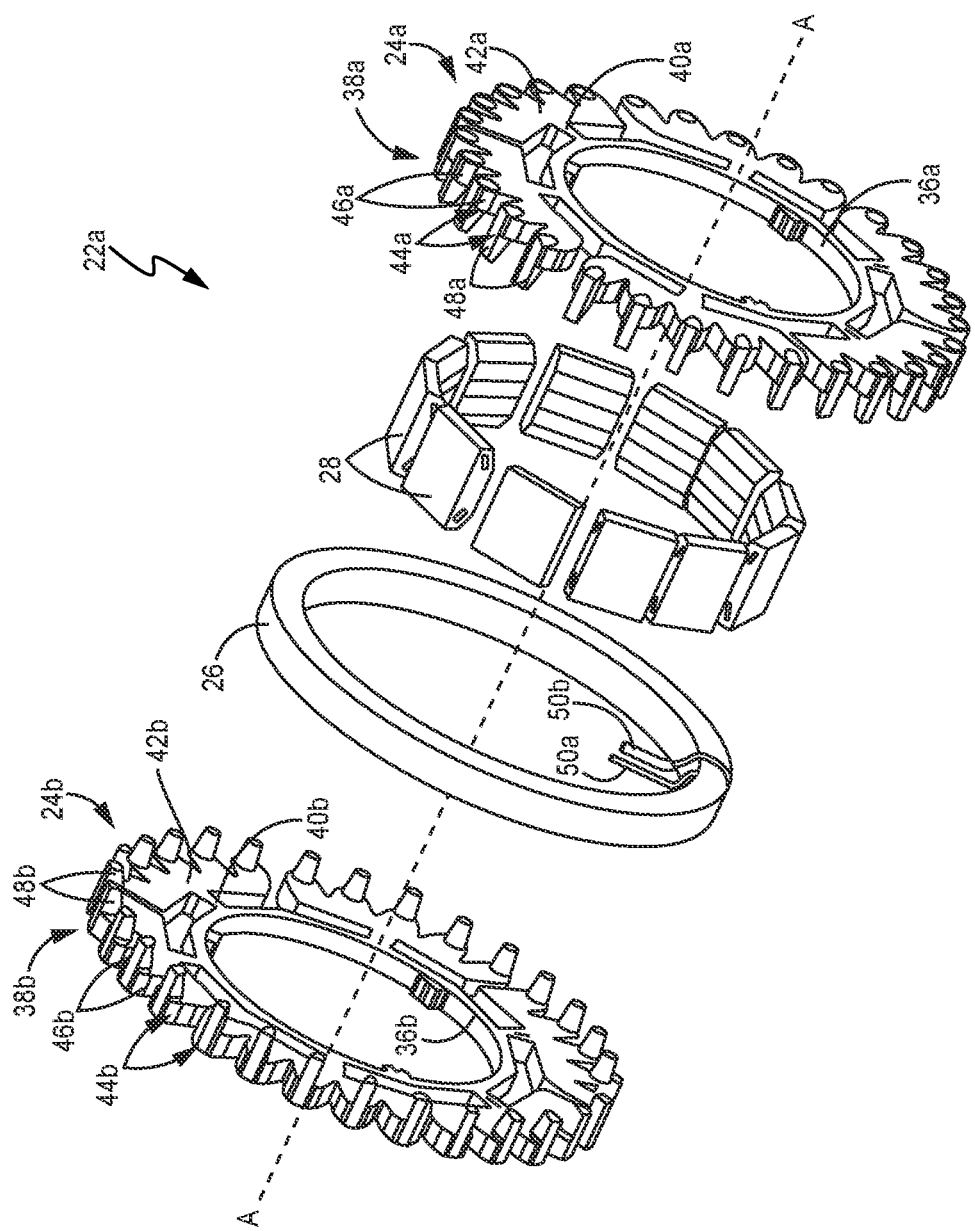
FIG. 3A is an exploded view of a phase assembly of an electric motor.
Figure 3D:
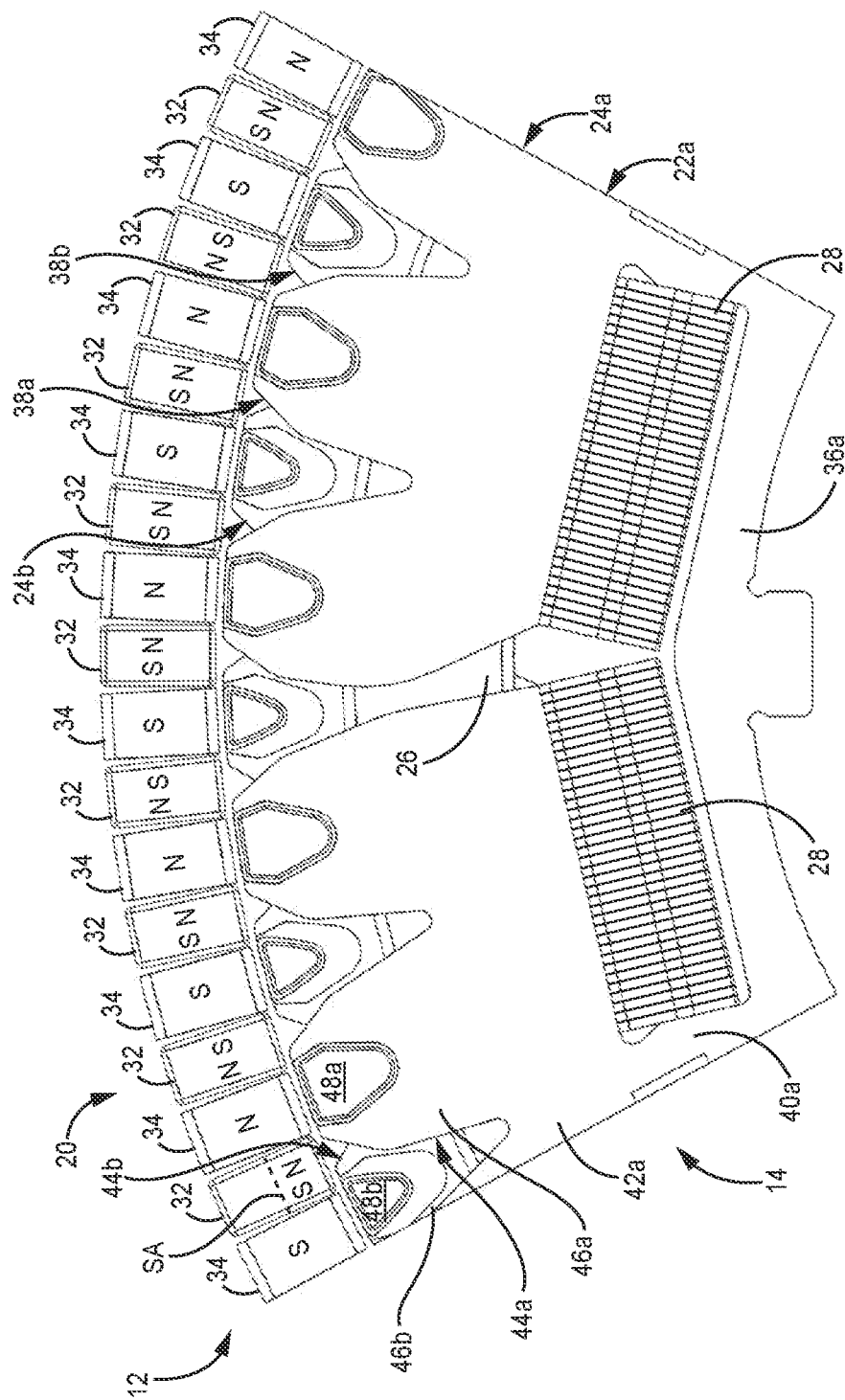
FIG. 3D is an enlarged end view showing magnetic polarity of components of the rotor portion.

FIG. 3A is an exploded view of phase assembly 22a. FIGS. 3B and 3C demonstrate how flux circuits are formed through flux paired flux projections 44a, 44b. FIG. 3D shows a detailed view of flux paired flux projections 44a, 44b of phase assembly 22a interacting with concentrators 34 and magnets 32 of the rotor 12. FIGS. 3A-3D will be discussed together. Phase assembly 22a includes flux rings 24a, 24b; coil 26; and axial returns 28. Flux ring 24a includes ring body 36a, trunks 40a, branches 42a, and flux projections 44a. Flux ring 24b includes ring body 36b, trunks 40b, branches 42b, and flux projections 44b. Flux projections 44a, 44b respectively include holders 46a, 46b and teeth 48a, 48b.

Flux ring 24a is oriented in a first axial direction AD1 along motor axis A-A such that teeth 48a project axially in the first axial direction AD1. Flux ring 24b opposes flux ring 24a. Flux ring 24b is oriented in a second axial direction AD2 along motor axis A-A such that teeth 48b project axially in the second axial direction AD2. The coil 26 is directly between the paired flux rings 24a, 24b of phase assembly 22a. Coil 26 is disposed axially between flux rings 24a, 24b. Even more specifically, the coil 26 is directly between opposed branches 42a, 42b of the paired flux rings 24a, 24b. Even more specifically, the coil 26 is directly between parts of paired flux projections 44a, 44b of the paired ones of flux projection arrays 38a, 38b (e.g., directly between the flux projections 44a of flux ring 24a and the flux projections 44a of flux ring 24b). The coil 26 radially overlaps with the axial returns 28. In this particular example, coil 26 is sandwiched radially between the axial returns 28 and the flux projections 44a, 44b due to each flux projection 44a, 44b having an axially extending tooth 48a, 48b, respectively.

Axial returns 28 extend between and electrically connect the paired flux rings 24a, 24b. The axial returns 28 extend into openings in each flux ring 24a, 24b. The axial returns 28 can directly contact the sides of branches 42a, 42b opposite flux projections 44a, 44b. Axial returns 28 are configured to conduct electromagnetic flux between flux rings 24a, 24b. Likewise, the axial returns 28 conduct electromagnetic flux between circular flux projection arrays 38a, 38b of phase assembly 22a. Likewise, the axial returns 28 conduct electromagnetic flux between axially adjacent branches 42a, 42b of paired flux rings 24a, 24b.

Axial returns 28 extend into openings in flux ring 24a radially defined between branches 42a and ring body 36a. The openings are circumferentially defined between trunks 40a. Axial returns 28 further extend into paired ones of the openings in flux ring 24b that are radially defined between branches 42b and ring body 36b. The openings are circumferentially defined between trunks 40b.

Flux paired flux projections 44 refer to respective closest pairs of flux projections 44 of opposed circular flux projection arrays 38 of a phase assembly 22 (e.g., the flux projections 44 of flux projection arrays 38a, 38b are flux paired, the flux projections 44 of flux projection arrays 38c, 38d (FIG. 2B) are flux paired, the flux projections 44 of flux projection arrays 38e, 38f (FIG. 2B) are flux paired). While a set of flux projections 44a, 44b are highlighted as flux pairing in FIGS. 3B and 3C, these are examples and all flux projections 44 can similarly flux pair across the circular flux projection arrays 38a, 38b. Each flux projection 44a is part of a similar flux circuit with its corresponding flux paired flux projection 44b. The flux paired flux projections 44a, 44b pair generally axially, and not circumferentially to the neighbor flux projection 44 of the same circular flux projection array 38 because all flux projections 44 of a first one of the paired flux projection arrays 38 (e.g., a first one of flux projection array 38a and flux projection array 38b) will have the same polarity at any given time while all flux projections 44 of the opposed circular flux projection array 38 (e.g., the other one of flux projection array 38a and flux projection array 38b) of the same phase assembly 22 will have the opposite polarity at any given time. More specifically, each flux projection 44 flux pairs with the closest flux projection 44 of the circular flux projection array 38 on the other side of the coil 26. As shown in FIGS. 3B and 3C, a flux circuit is formed through flux paired flux projections 44a, 44b such that the flux projections 44a, 44b are respectively polarized, north and south. All flux projections 44 of a phase assembly 22 are polarized simultaneously.

The flux is generated by coil 26. Specifically, an AC signal is run through coil 26 which rapidly builds and collapses the magnetic field due to the current reversal of the AC signal through the coil 26. As shown, flux concentrating material of the flux rings 24a, 24b and axial return 28 is wrapped around at least three sides of the coil 26. In the example show, the flux paired flux projections 44a, 44b; flux concentrating material of flux rings 24a, 24b; and axial returns 28 fully wrap around coil 26.

The lamination grain of the flux concentrating material is shown in FIGS. 3B and 3C. Generally, flux flows with the grain, along the direction of lamination, as flux will generally follow the path of highest permeability and there is significant resistance to flux jumping from one layer of lamination to another layer of lamination. The lamination grain of the branches 42a, 42b (including the flux projections 44a, 44b except for the powdered metal teeth 48a, 48b) is radially orientated while the lamination grain of the axial returns 28 is axially oriented. The laminate sheets of flux rings 24a, 24b can thereby be disposed orthogonal to the laminate sheets of axial returns 28.

Flux rings 24a, 24b are formed by stacked lamination sheets except for teeth 48 that are formed by powdered metal. Flux ring 24a can be formed by stacked lamination sheets with each lamina covering the entire flux ring 24a. For example, the stacked lamination sheets can form the full hoop 36a, each trunk 40a, each branch 42a, and each holder 46a. As such, a holder 46a on one radial side of flux ring 24a can be formed from the same lamina as a holder 46a disposed on the opposite radial side of flux ring 24a. Flux ring 24b can be formed similar to flux ring 24a from contiguous lamination sheets stacked axially and extending radially. As such, phase assembly 22a can include two contiguous stacks of radially extending lamination sheets (forming flux rings 24a, 24b) and can include multiple contiguous stacks of axially extending lamination sheets (forming axial returns 28).

In the example shown, the laminate sheets forming flux rings 24a, 24b are stacked axially and have the radial grain. The stacked laminate sheets of flux rings 24a, 24b can be oriented on a plane that the motor axis A-A is orthogonal to. The laminations forming each flux ring 24a, 24b can be contiguous for the whole portion of the flux rings 24a, 24b formed by laminate. For example, flux ring 24a can be formed by contiguous laminate from hoop 36a to the trunk 40a to the branches 42a and to the holders 46a. The laminate stack forming a flux ring 24 can include at least ten layers of lamina.

The laminate sheets of axial returns 28 can be stacked tangentially to a circle centered on the motor axis A-A and have the axial grain. Each laminate sheet of the axial return 28 can contact each laminate sheet of the directly adjacent branches 42a, 42b. In some examples, an axial return 28 can directly contact each laminate sheet of a flux ring 24. In some examples, each axial return 28 directly contacts each laminate sheet of phase assembly 22a, such that each axial return 28 directly contacts each laminate sheet of flux ring 24a and directly contacts each laminate sheets of flux ring 24b. The lamination stacks forming an axial return 28 can include at least ten layers of lamina.

The flux flows axially through the axial returns 28 and radially through the branches 42a, 42b and flux projections 44a, 44b in a U-shape around coil 26 and toward rotor 12 (FIGS. 1A and 2A). FIGS. 3B and 3C represent the reversal of the AC signal (the signal in a first state in FIG. 3B and in a second state in FIG. 3C) and how the poles of the flux paired flux projections 44a, 44b are switched.

Flux projections 44a are not aligned axially with flux projections 44b; instead, each flux projection 44a, 44b of the flux paired flux projections 44a, 44b is offset circumferentially. As such, the flux circuit travels at least a limited circumferential distance between the paired flux projections 44a, 44b. Therefore, a cumulative flux circuit comprised of a plurality of flux paired flux projections 44a, 44b can flow in a spiral pattern circumferentially through the flux projections 44a, 44b and axial returns 28. The AC signal through the coil 26 changes current direction rapidly and thus changes the north-south polarity of the flux paired flux projections 44a, 44b rapidly.

At the instance illustrated, the flux projections 44a, 44b are aligned with the concentrators 122. The laminate of the concentrators 122 does not have an inherent polarization, but due to the fixed position of concentrators 34 between the poles of magnets 32, the concentrators 34 assume an effective permanent polarization that is the same as the adjacent poles of the magnets 32, as indicated. Magnets 32 are arranged such that the same poles are oriented circumferentially towards each other for adjacent ones of the magnets 32. A single concentrator 34 is thereby interleaved between two north poles or two south poles and assumes the polarization of those poles. The concentrators 34 take on alternating north and south polarization on opposite sides of each magnet 32. As indicated, each magnet 32 is permanently polarized north and south along its short axis SA (FIG. 2A). The interleaved arrangement of magnets 32 and concentrators 34 creates alternating regions of oppositely polarized concentrators 34 and magnet 32 poles.

The concentrators 34 route the magnetic flux from the magnets 32 toward the stator 14. Flux circuits are complete across the air gap 30 between the stator 14 and rotor 12. The flux from the rotor 12 (specifically the magnets 32) and the flux from the coil 26 (through the flux projections 44) interact in the air gap 30, and the resulting flux shear drives rotation of the rotor 12. The flux of the present electric machine 10 has an orientation transverse to the motor axis A-A. This is different from the radial flux orientation of traditional AC motors and DC brushless motors.

The flux generated by the stator 14 and acting on the rotor 12 is constantly changing due to both changing position of the permanent magnet array 20 (e.g., the changing circumferential positions of magnets 32 and concentrators 34 about axis A-A) and rotation of the rotor 12 as well as the change in polarization of flux projections 44a, 44b due to the change in the AC signal through the coil 26. As such, the AC signal routed through the coil 26 is synchronized to develop magnetic fields through the flux projections 44a, 44b in time to concentrators 34 approaching and departing the flux projections 44a, 44b to simultaneously push and pull the magnets 32 of rotor 12 to provide the force that rotates the rotor 12. More specifically, the N-N and S-S interfaces repel, while the N-S interfaces attract, on approach and departure of alignment.

With continued reference to FIGS. 2A-3D, the respective AC signals (e.g., sinusoidal or trapezoidal) delivered through the coils 26 of each phase assembly 22a, phase assembly 22b (FIG. 2B), and phase assembly 22c (FIG. 2B) are out of phase with respect to each other. In this way, the magnets 32 (along their long axis LA (FIG. 2B) lengths) more frequently have flux peaks acting on them, as compared to synchronizing the sinusoidal AC signals. The out of phase signals provide for a smooth torque profile acting on the rotor 12 along the axis of rotation of the rotor 12. The embodiment of the electric machine 10 shown in FIGS. 1-2B has three phases corresponding to the three phase assemblies 22a, 22b, 22c and the coils 26 therein in which three sinusoidal AC signals are delivered through the coils 26, 120-degrees electrically offset. If there were two phase assemblies 22 and two coils 26, then the two sinusoidal AC signals would be 180-degrees electrically offset, or 90-degrees electrically offset for sets of four phase assemblies 22 and four coils 26.

Being that the magnets 32 are elongate and radially overlap with multiple phase assemblies 22, and thus multiple coils 26, each magnet 32 is electromagnetically acted upon by multiple coils 26. More specifically, each magnet 32 can be electromagnetically acted upon by three coils 26 simultaneously along the length of the magnet 32, in the three phase embodiment shown. Each magnet 32 can be acted on by more or fewer coils 26 depending on the number of phases of a particular electric machine 10 (FIGS. 1 and 2A). As such, multiple different coils 26 electromagnetically act on each magnet 32. Also, each magnet 32 may be electromagnetically acted upon by only three coils 26 (or only two coils 26 in a two-phase motor embodiment, or only four coils 26 in a four-phase motor embodiment, etc.). This is unlike conventional AC induction motors in which each magnet interacts with all of the many coils of a traditional circumferential array of coils around the axis of rotation of the rotor. Each magnet 32 can simultaneously be acted upon by every coil 26 of electric machine 10, unlike traditional AC induction motors in which each magnet is acted upon in a stepwise manner by the various coils.

Traditional AC induction motors use a plurality of discrete coils arrayed circumferentially around the axis of rotation of the rotor. Each coil represents a potential pole for acting on a magnet. The discrete coils arrayed circumferentially around the axis of rotation in a conventional AC induction motor are out of phase with respect to each other. The number of poles in such a motor is limited by the ability to fit discrete coils circumferentially around the axis of rotation within the motor. Coil windings can be made smaller, and the diameter of the stator can be made bigger, to accommodate more coils to support more poles, but this increases the size, weight, and cost of the motor and still has its limits. Power can also be increased when the rotor is rotating at a relatively high rate, whereby more coil-magnet passes can be experienced per unit time. But this would require the motor to operate a relatively high speed, which can be undesirable depending on the application.

Motors 10 according to the present disclosure are different from traditional AC motors and DC brushless motors. Electric machine 10 contains relatively few coils 26, only three in the examples discussed. Unlike traditional AC motors and DC brushless motors, coils 26 are formed from loops that extend entirely around the axis of rotation of the rotor 12, as shown in FIG. 3A. The plurality of loops together form the hoop of coil 26. The axis of rotation of the rotor 12 extends through each loop (e.g., the center of each loop). Each coil 26 is annular, and the loops of each coil 26 are likewise annular, and the circular planar profile of the coil 26 and loops are orthogonal to the motor axis A-A. The wire of each coil 26 forms a single hoop, which has multiple loops that overlap and contact one another to form the single hoop assembly.

Coils 26 do not include any loops for generating flux that rotates the rotor 12 through which the motor axis A-A does not extend. Instead of adding a new coil for each pole as in traditional AC induction motors, the branches 42 and axial returns 28 surrounding a single coil 26 channel the flux to the plurality of flux projections 44 which flux pair across the paired branches 42a, 42b to create a plurality of poles from the single coil 26. In the example shown, flux rings 24a, 24b each include thirty flux projections 44a, 44b, respectively. As such, for each phase assembly 22, one coil 26 supports thirty poles, although lower and higher poles can be created depending on the number of flux projections 44 of the circular flux projection arrays 38. As such, activating one coil 26 activates many poles, whereas in some traditional AC motors and DC brushless motors activation of one coil activates one pole. Electric machine 10 includes multiple coils 26 that are arrayed along and about the axis of rotation of the rotor 12 as part of multiple phase assemblies 22. The multiple phase assemblies 22 providing the multiple coils 26 multiplies the number of poles that can simultaneously act on permanent magnet array 20 and thus drive rotation of rotor 12.

Figure 4A:
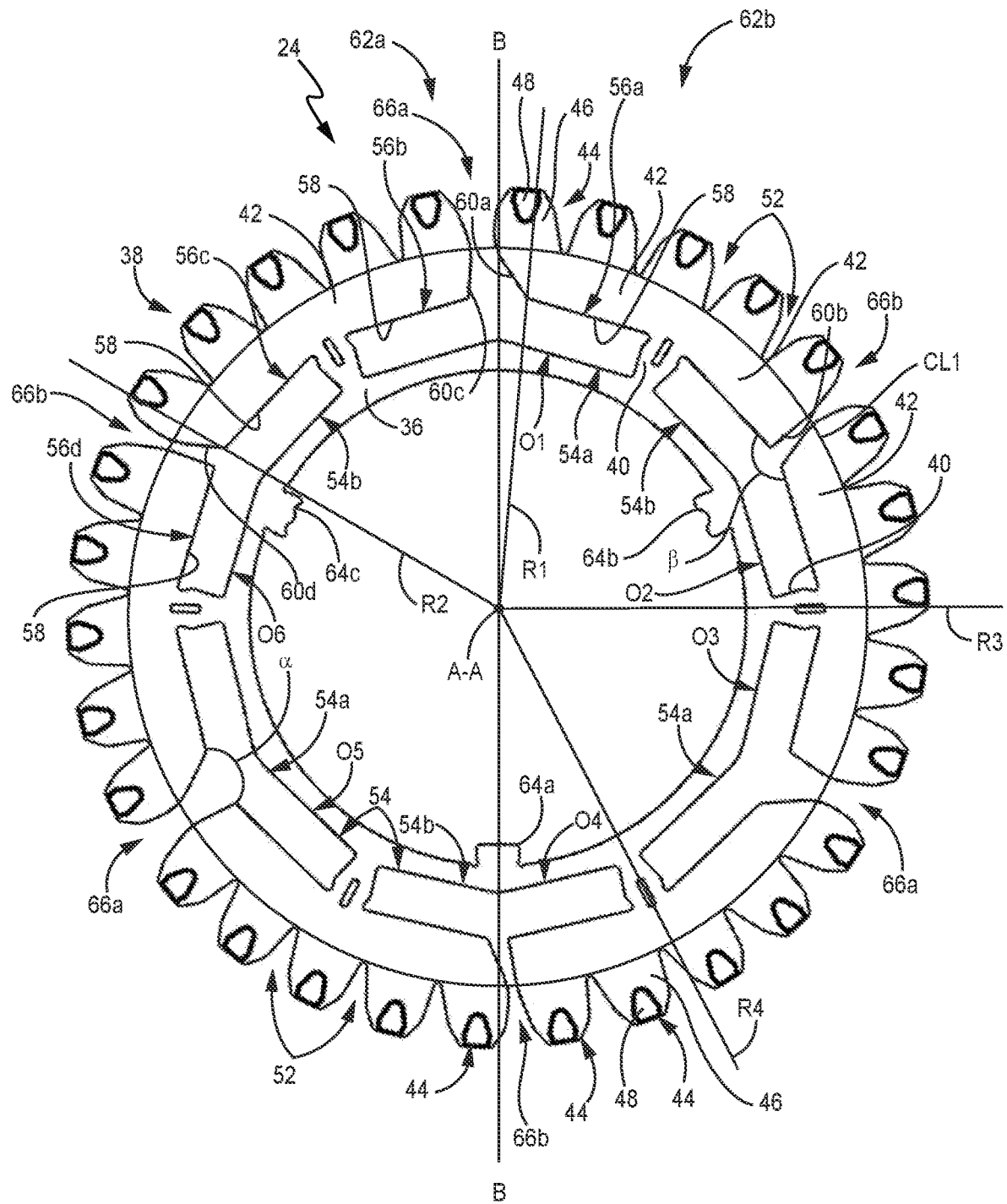
FIG. 4A is an end view of a flux ring in a first axial direction.
Figure 4B:
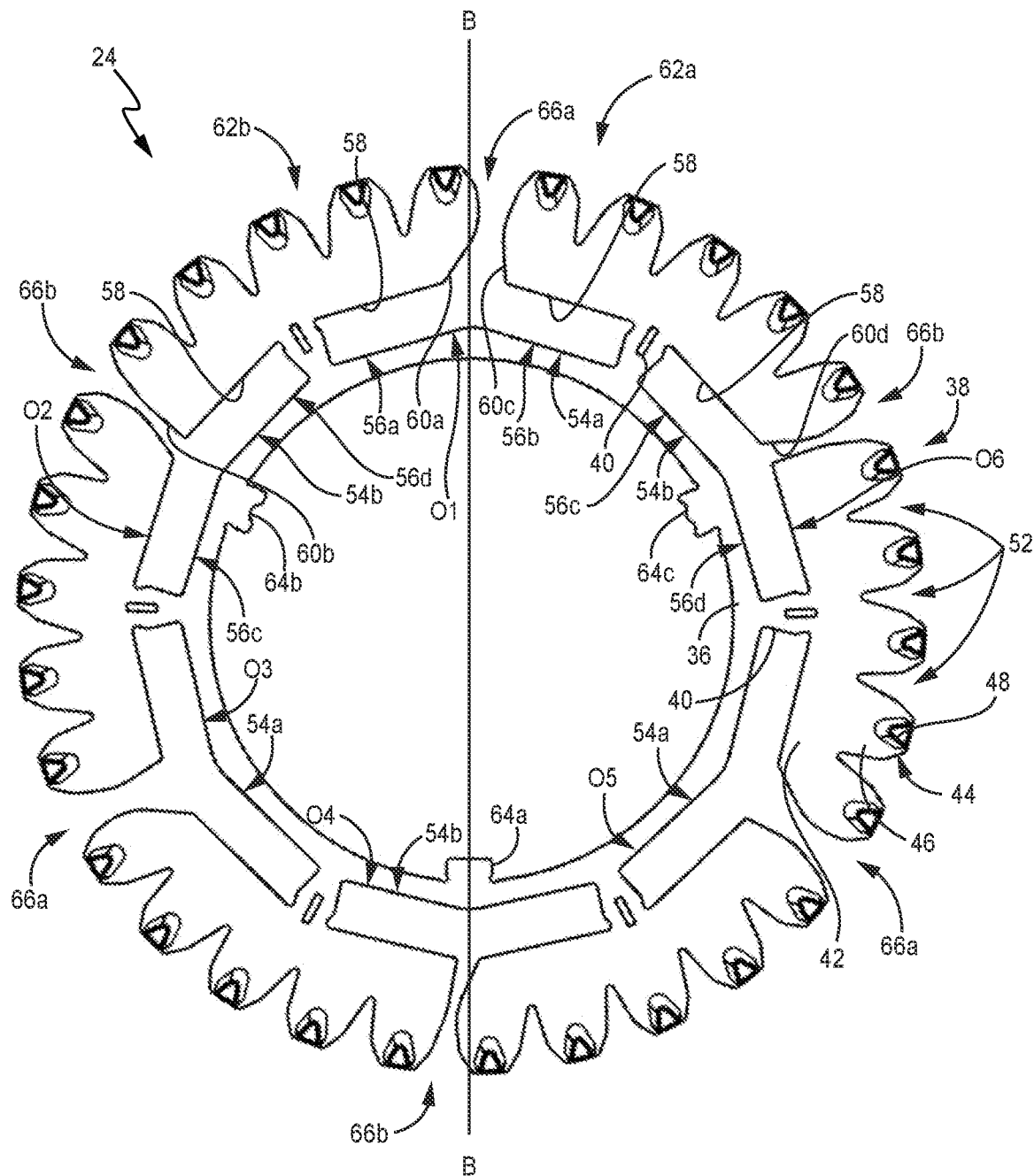
FIG. 4B is an end view of the flux ring in a second axial direction.
Figure 4C:
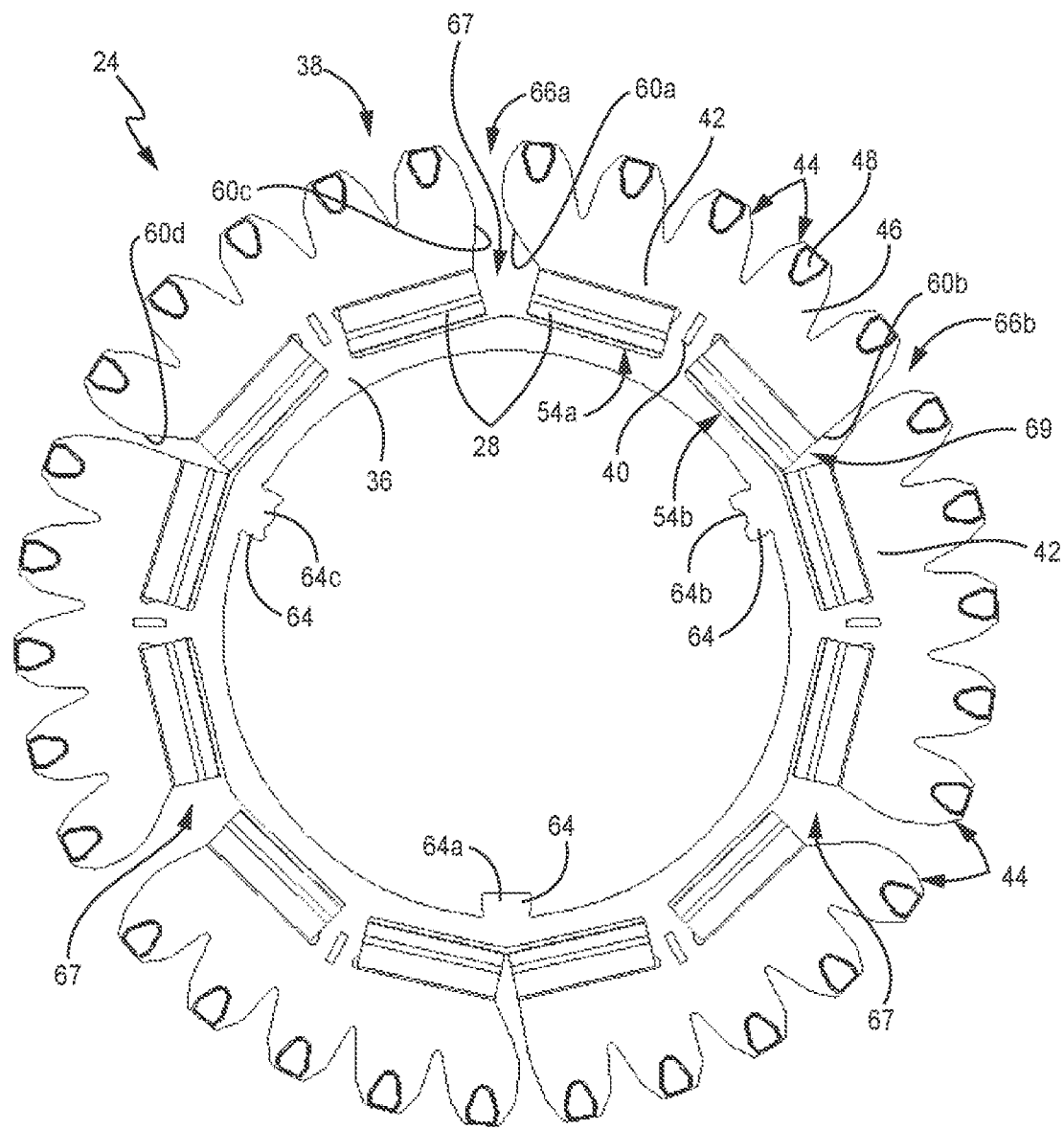
FIG. 4C is an end view of the flux ring in the first axial direction also showing axial returns.

FIG. 4A is a first end view of flux ring 24. FIG. 4B is a second end view of flux ring 24 taken from an opposite side of flux ring 24 from that shown in FIG. 4A. FIG. 4C is the first end view of flux ring 24 also showing axial returns 28. FIGS. 4A-4C will be discussed together. Flux ring 24 includes ring body 36, trunks 40, branches 42, flux projections 44, spacing gaps 52, and return openings 54a, 54b (collectively herein "return opening 54" or "return openings 54"), locators 64a-64c (collectively herein "locator 64" or "locators 64"), and circumferential gaps 66a, 66b (collectively herein "circumferential gaps 66" or "circumferential gap 66"). Each branch 42 includes return interface surfaces 58. Each flux projection 44 includes holder 46 and tooth 48. This disclosure makes reference to separation distance, which can be the linear distance between two structures, the circumferential distance (as measured as an arc about the motor axis) between two structures, or an angular distance (as measured by the radial angle relative the motor axis) between two structures, unless otherwise specified.

Ring body 36 is disposed annularly about motor axis A-A. Trunks 40 extend radially from ring body 36. In the example shown, trunks 40 extend radially outward because flux ring 24 is for an outer rotator motor (e.g., electric machine 10 (FIGS. 1 and 2A)). It is understood, however, that trunks 40 can extend radially inward towards axis A-A in other examples. Each branch 42 is connected to an associated trunk 40. In the example shown, each branch 42 extends in each circumferential direction CD1 and CD2 relative to the associated trunk 40. Branches 42 are disposed asymmetrically about axis A-A. Flux projections 44 extend radially and axially relative to each branch 42. In the example shown, each branch 42 supports five separate flux projections 44, but it is understood that each branch 42 can support more or less than five flux projections 44. Each branch 42 and associated flux projections 44 can be considered to form a flux unit that extends radially relative to ring body 36. In the example shown, flux ring 24 includes six flux units. The flux units are disposed asymmetrically about axis A-A.

Each flux projection 44 is formed by a holder 46 that extends from the branch 42 and by a tooth 48 supported by and extending from the holder 46. Holder 46 can be formed from the laminate forming branch 42. Holder 46 extends radially from the branch 42 and is configured to support an associated tooth 48 that extends axially from that holder 46. Holders 46 can extend between the two axial ends of flux ring 24. Spacing gaps 52 are disposed circumferentially between adjacent ones of flux projections 44. The width of each flux projection 44 narrows in the radial direction towards the air gap 30 (FIGS. 1 and 2A). Flux projections 44 are disposed asymmetrically about axis A-A.

Circumferential line CL1 forms a circle centered on axis A-A. Circumferential line CL1 is disposed at the trough of each spacing gap 52 between adjacent ones of the flux projections 44. Circumferential line CL1 is disposed at the interface between branches 42 and flux projections 44. Branch 42 can be formed from a single laminate piece while flux projections 44 can be formed from laminate (e.g., holder 46) and powdered metal (e.g., tooth 48). The laminate portion of flux projections 44 can be formed integrally with the laminate of branch 42.

Return openings 54a, 54b are defined radially between branches 42 and ring body 36. Return openings 54a, 54b Return openings 54a, 54b form a ring of axial openings disposed circumferentially around motor axis A-A. The return interface surfaces 58 of branches 42 partially define each return opening 54a, 54b. Return interface surfaces 58 of branches 42 can extend tangential to a circle centered on motor axis A-A. Each return interface surface 58 of each branch 42 is disposed tangential to the same circle centered on motor axis A-A. As such, a radial line extending from motor axis A-A can be orthogonal to the planar return interface surface 58. In the example shown, each branch 42 partially defines a return opening 54a and partially defines a return opening 54b. As such, each branch 42 includes a pair of return interface surfaces 58. Return openings 54a, 54b are configured to receive axial returns 28. The axial returns 28 directly contact return interface surfaces 58 to facilitate flux transfer therebetween and form flux loops.

Return openings 54a, 54b, which can also be referred to as return slots, are defined circumferentially between adjacent ones of trunks 40. In the example shown, each trunk 40 defines an end of a return opening 54a and an end of a return opening 54b. Trunks 40 are asymmetrically disposed about motor axis A-A such that the configuration of return openings 54a varies from the configuration of return opening 54b. The separation distance between adjacent trunks 40 varies to cause the variable sized return openings 54a, 54b.

Return openings 54a, 54b are alternatingly disposed circumferentially about axis A-A. As such, each return opening 54a is disposed circumferentially between two return openings 54b, and each return opening 54b is disposed circumferentially between two return openings 54a. The return openings 54a, 54b together define an annular ring about motor axis A-A within which axial returns 28 are disposed. Return openings 54a, 54b are asymmetrically disposed about motor axis A-A. In the example shown, return openings 54a have different configurations from return openings 54b. Return openings 54a extend further about motor axis A-A than return openings 54b. As such, return openings 54a have a larger circumferential width than return openings 54b. The circumferential width of return openings 54 is the length taken along the circumference of a circle centered on axis A-A. The circumferential width of each return opening 54 can be taken between the trunks 40 that circumferentially bracket the return opening 54.

Return openings 54a are disposed asymmetrically relative to each other about motor axis A-A such that return openings 54a are not evenly spaced about motor axis A-A. Return openings 54b are similarly asymmetric about motor axis A-A relative to each other such that return openings 54b are not evenly spaced about motor axis A-A. Each of return openings 54a, 54b is configured to support a pair of axial returns 28. Trunks 40 define the circumferential ends of each return opening 54a, 54b.

Each return opening Ma has two receiving portions 56a, 56b that are each partially defined by different ones of the branches 42 defining that return opening Ma. More specifically, each receiving portion 56a, 56b is partially defined by the return interface surface 58 of a branch 42. Each receiving portion 56a, 56b is configured to receive an axial return 28. An angle α is formed between the return interface surfaces 58 of adjacent ones of the branches 42 defining return openings 54a. As such, receiving portions 56a, 56b are transverse relative each other. Angle α is an obtuse angle.

Each return opening 54b has two receiving portions 56c, 56d that are each partially defined by different ones of the branches 42 defining return opening 54b. More specifically, each receiving portion 56a, 56b is partially defined by the return interface surface 58 of a branch 42. Each receiving portion 56c, 56d is configured to receive an axial return 28. An angle β is formed between the return interface surfaces 58 of adjacent ones of the branches 42 defining return openings 54b. As such, receiving portions 56c, 56d are transverse relative to each other. Angle β is an obtuse angle. Angle β can be the same as angle α.

Each axial return 28 can have a common configuration with the other axial returns 28. Return interface surfaces 58 have planar faces oriented towards motor axis A-A and are configured to interface with axial returns 28. Each return interface surface 58 be disposed orthogonal to a radial line extending from axis A-A. Axial returns 28 directly contact return interface surfaces 58 to form flux loops. Each return interface surface 58 can have the same configuration. For example, each return interface surface 58 can have the same width between the trunk 40 of the branch 42 of that return interface surface 58 and the end of the return interface surface 58 circumferentially opposite the trunk 40 about axis A-A. As such, each receiving portion 56a-56d can have the same width.

Circumferential gaps 66a, 66b are disposed between adjacent ones of the flux units. Circumferential gaps 66 are disposed on opposite circumferential ends of each branch 42. Circumferential gaps 66 are alternatingly arrayed about motor axis A-A. In the example shown, each branch 42 partially defines a circumferential gap 66a at a first circumferential end of the branch 42 and partially defines a circumferential gap 66b at a second, opposite circumferential end of the branch 42. Branches 42 can have different configurations to position circumferential gaps 66a, 66b; return openings 54a, 54b; and flux projections 44 for assembling flux ring 24 into a phase assembly 22, as discussed in more detail below. In the example shown, branches 42 are formed in two configurations that are grouped together to form tooth segment pairs. The first configuration of branches 42 have branch ends 60a, 60b and the second configuration of branches have branch ends 60c, 60d. Each tooth segment pair is circumferentially bracketed between circumferential gaps 66a and includes a circumferential gap 66b between the paired branches 42. The tooth segment pairs can be rotationally symmetric about axis A-A. As such, the tooth segment pairs can exhibit three-fold rotational symmetry about axis A-A.

Branch ends 60a and branch ends 60c partially define circumferential gaps 66a. Branch ends 60a extend circumferentially toward the respective trunk 40 supporting that branch 42 as branch ends 60a extend away from the interface between flux projections 44 and branch 42 and towards return opening 54a. Similarly, branch ends 60c extend circumferentially toward the respective trunk 40 supporting that branch 42 as branch ends 60c extend away from the interface between flux projections 44 and branch 42 and towards return opening 54a.

Circumferential gaps 66a have a first radial portion that narrows along the radial extent of circumferential gap 66a towards motor axis A-A. Each circumferential gap 66a has a second radial portion that widens along the radial extent of that circumferential gap 66a towards motor axis A-A. The first radial portion is defined between the flux projections 44 on the circumferential sides of circumferential gap 66a. The second radial portion is defined between the adjacent branch ends 60a, 60c. Circumferential gap 66a can thereby be considered to have an hourglass configuration. A circumferential width of circumferential gaps 66a at any radial location along each circumferential gap 66a is larger than the circumferential widths of either spacer gaps 52 or circumferential gaps 66b at the same radial distance from axis A-A.

Branch ends 60b and branch ends 60d partially define circumferential gaps 66b. Branch ends 60b can extend circumferentially towards the respective trunk 40 supporting that branch 42 as branch ends 60b extend away from the interface between flux projections 44 and the branch 42 and towards return opening 54b. In some examples, branch end 60b extends only radially such that branch end 60b is not canted towards the trunk 40 of that branch 42. Branch ends 60d extend circumferentially toward the respective trunk 40 supporting that branch 42 as branch ends 60d extend away from the interface between flux projections 44 and the branch 42 and towards return opening 54b.

Circumferential gaps 66b can have a first radial portion that narrows along the radial extent of circumferential gap 66b away from the air gap 30 (FIGS. 1 and 2A) towards motor axis A-A. Each circumferential gap 66b includes a second radial portion that widens along the radial extent of circumferential gap 66b toward motor axis A-A. The first radial portion is defined between the flux projections 44 on the circumferential sides of circumferential gap 66b. The second radial portion is defined between the adjacent branch ends 60b, 60d. Circumferential gaps 66b can be considered to have hourglass configurations.

Branch ends 60a-60d are circumferentially canted to position axial returns 28 and flux projections 44 at desired locations circumferentially about motor axis A-A. Axial returns 28 extend between and contact adjacent ones of flux rings 24 forming a phase assembly 22. A pair of axial returns 28 are disposed in each return opening 54a and a pair of axial returns 28 are disposed in each return opening 54b. Axial returns 28 include planar surfaces that contact the planar surfaces of return interface surfaces 58 of branches 42. Circumferential gaps 66a are wider than circumferential gaps 66b such that axial returns 28 in return openings 54a are offset relative each other a greater distance than the axial returns 28 in return openings 54b. The circumferential spacing between the axial returns 28 in return openings 54a provides a pathway for electrical connectors to extend radially between those axial returns 28 and to the coil 26 (best seen in FIG. 3A).

The width of each circumferential gap 66a at each radial location along circumferential gap 66a relative to motor axis A-A is larger than the width of circumferential gaps 66b at the same radial locations. The separation distance between adjacent branches 42 and flux projections 44 defining circumferential gaps 66a is larger than the separation distance between branches 42 and flux projections 44 defining circumferential gaps 66b. As discussed in more detail below, circumferential gaps 66a provide an opening for coil connector 50b (best seen in FIGS. 5C and 5D) to extend from a radial side coil 26 opposite axial return 28, around coil 26, and through a wire gap 67 between those axial returns 28 to facilitate electrical connection to the AC power source.

Circumferential gaps 66b are disposed radially outward of the interface between two transversely disposed axial returns 28. Circumferential gaps 66b separate adjacent branches 42 such that those adjacent branches 42 are spaced circumferentially relative to each other. Circumferential gap 66b removes material from flux ring 24 providing for a lighter weight electric machine 10. Circumferential gaps 66a, 66b between adjacent branches 42 inhibit the formation of eddy currents. Circumferential gaps 66a, 66b thereby also prevent a continuous electrical circuit from being formed about the motor axis A-A. Circumferential gaps 66b are circumferentially narrower than circumferential gaps 66a. As such, the gap 69 between the axial returns 28 associated with circumferential gaps 66b are narrower than the gaps 67 between the axial returns 28 associated with circumferential gaps 66a. The variations in size and asymmetric spacing of axial returns 28 about axis A-A facilitates larger axial returns 28 in a compact arrangement, providing an efficient, compact electric machine. Axial returns 28 are disposed asymmetrically about motor axis A-A and, in the example shown, have three different separation distances between adjacent axial returns 28. The axial returns 28 associated with the same tree, which includes a trunk 40 and associated branch 42, are spaced by the trunk 40 of that tree, creating a gap of a first size. The axial returns of adjacent trees are spaced by one of gaps 67, 69, which have sizes different from each other and different than the size of the gap created by the trunk 40.

Axial returns 28 are unevenly arrayed circumferentially about motor axis A-A. The lamination stacks forming the axial returns 28 are thus unevenly arrayed circumferentially about motor axis A-A. The lamination stacks forming the axial returns 28 are unevenly arrayed circumferentially about motor axis A-A such that a first pair of adjacent lamination stacks of the have a first separation distance between them and a second pair of adjacent lamination stacks have a second separation distance between them that is different than the first separation distance. The lamination stacks forming the axial returns 28 are unevenly arrayed circumferentially about motor axis A-A such that a third pair of adjacent lamination stacks have a third separation distance between them that is different than the first separation distance and the second separation distance.

Flux ring 24 is operatively aligned about flip axis B-B such that flux ring 24 can form both flux rings of a phase assembly 22. Flip axis B-B divides flux ring 24 into a first lateral portion 62a and a second lateral portion 62b. Flux ring 24 is operatively aligned about flip axis B-B such that a phase assembly 22 can be formed from flux rings 24 having the same base configuration. For example, both flux ring 24a in FIG. 3A and flux ring 24b in FIG. 3A of a phase assembly 22a in FIG. 3A have the same base configuration. If both flux rings 24a, 24b in are oriented in the same axial direction then flux rings 24a, 24b would axially align.

Flux ring 24 is operatively aligned on flip axis B-B to facilitate the forming a phase assembly 22. Flux ring 24 is configured such that a single flux ring 24 can be used to form each phase half of the phase assembly 22. Each flux ring 24 has a face side that is oriented towards the coil 26 of the phase assembly 22. Each flux ring 24 has an away side that is oriented away from the coil 26 of the phase assembly 22. The laminate sheets forming each flux ring 24 are stacked axially between the face side and the away side. The coil 26 is thus bracketed between the face sides. The face sides are oriented towards each other while the away sides are oriented away from each other. The teeth 48 are cantilevered out over the face sides such that the coil is in a toroidal chamber defined by the face sides of the flux rings 24, the teeth 48 of the flux rings 24, and the axial returns 28.

For example, a first flux ring 24 is oriented such that its teeth 48 extend in a first axial direction relative to motor axis A-A and a second flux ring 24 is oriented such that its teeth 48 extend in the opposite second axial direction. The second flux ring 24 is rotated about flip axis B-B to a second orientation different than the first orientation of the first flux ring 24. With the flux rings 24 in the differing orientations, the return openings 54 of each flux ring 24 are axially aligned while the flux projections 44 of each flux ring 24 are axially misaligned. With the two flux rings 24 in the opposing orientations, return openings 54a of the first flux ring 24 of the phase assembly 22 are axially aligned with return openings 54a of the second flux ring 24 of the phase assembly 22 to facilitate mounting of axial returns 28. Return openings 54b of the paired flux rings 24 are similarly aligned. Trunks 40 and return interface surfaces 58 axially align as trunks 40 and return interface surfaces 58 partially define return openings 54. Return interface surfaces 58 align to facilitate axial returns 28 electrically connecting the paired flux rings 24.

The aligned return openings 54 facilitate mounting of axial returns 28. In some examples, the return openings 54 disposed on the first lateral portion 62a of flux ring 24 are mirror images of the return openings 54 formed on the second lateral portion 62b of flux ring 24 about flip axis B-B. In the example shown, one of return openings 54a self-aligns about axis B-B and one of return openings 54b self-aligns about axis B-B.

Unlike return openings 54, flux projections 44 are axially misaligned between the opposing flux rings 24 forming the phase assembly 22. Flux projections 44 of the first flux ring 24 are circumferentially offset from flux projections 44 of the second flux ring 24 to form flux paired sets of flux projections 44.

The positions of the return openings 54 and the flux projections 44 on the first flux ring 24 of the phase assembly 22 are the flip mirror of the positions of the return openings 54 and the flux projections 44 of the second flux ring 24 of the phase assembly 22. The positions associated with the first flux ring 24 are the flip mirror of the positions associated with the second flux ring 24 such that the positions of the flux projections 44 of the first flux ring 24 with respect to the face side of that first flux ring 24 are the same as the positions of the flux projections 44 of the second flux ring 24 with respect to the away side of the second flux ring 24. The positions associated with the first flux ring 24 are the flip mirror of the positions associated with the second flux ring 24 such that the positions of the return openings 54 of the first flux ring 24 with respect to the face side of the first flux ring 24 are the same as the positions of the return openings 54 with respect to both the face side and the away side of the second flux ring 24. The positions associated with the first flux ring 24 are the flip mirror of the positions associated with the second flux ring 24 such that, if the first flux ring 24 and the second flux ring 24 were axially aligned and the first face side of each of the first and second flux rings 24 faced in the same axial direction and the flux projections 44 of the first flux ring 24 were axially aligned with the flux projections 44 of the second flux ring 24, then the return openings 54 of the first flux ring 24 axially align with the return openings 54 of the second flux ring 24.

In the example shown, return openings 54 are designed as openings O1-O6. Return openings O1, O3, and O5 are formed by return openings 54a. Return opening O1 is configured to operatively align with itself about flip axis B-B. Receiving portion 56a of return opening O1 in a first flux ring 24 aligns with receiving portion 56b of return opening O1 of an opposing second flux ring 24 when a phase assembly 22 is assembled. As such, a single axial return 28 extends through receiving portion 56a of opening O1 in the first flux ring 24 and through receiving portion 56b of opening O1 in the second flux ring 24. Return opening O3 is aligned with return opening O5 about axis B-B such that return openings O3 and O5 axially align in the flux rings 24 of a phase assembly 22. As such, an axial return 28 can extend through return opening O3 of a first flux ring 24 and through opening O5 of a second flux ring 24.

Return openings O2, O4, and O6 are formed by return openings 54b. Return opening O4 is rotatably aligned relative itself about axis B-B. Receiving portion 56a of return opening O4 in a first flux ring 24 aligns with receiving portion 56b of return opening O4 of an opposing second flux ring 24 when the phase assembly 22 is assembled. As such, a single axial return 28 can extend through receiving portion 56a of opening O4 in the first flux ring 24 and through receiving portion 56b of opening O4 in the second flux ring 24. Return opening O2 is operatively aligned with return opening O6 about axis B-B such that return openings O2 and O6 axially align in the flux rings 24 of a phase assembly 22.

As such, an axial return 28 can extend through return opening O2 of a first flux ring 24 and through opening O6 of a second flux ring 24.

While the return openings 54a, 54b of each lateral portion 62a, 62b are rotatably aligned about axis B-B, flux projections 44 are rotatably misaligned about axis B-B. The subset the flux projections 44 disposed on first lateral portion 62a are not mirrored with the flux projections 44 on second lateral portion 62b. The flux projections 44 on the first lateral portion 62a of flux ring 24 axially align with the gaps between adjacent flux projections 44 (e.g., with one of spacing gaps 52 or circumferential gaps 66a, 66b) of the second lateral portion 62b. The flux projections 44 on the second lateral portion 62b of flux ring 24 axially align with the gaps between adjacent flux projections 44 of first lateral portion 62a.

Each flux ring 24 is thus partially mirrored about flip axis B-B. The portions of flux ring 24 radially between motor axis A-A and return interface surfaces 58 of branches 42, including return interface surfaces 58, (e.g., ring body 36, trunks 40, return openings 54, and return interface surfaces 58) are mirrored about axis B-B. Conversely, the portions of flux ring 24 radially between return interface surfaces 58 of branches 42 and air gap 30 (FIGS. 1 and 2A) (e.g., branches 42, flux projections 44, spacer gaps 52, circumferential gaps 66a, 66b) are not mirrored about axis B-B but are instead misaligned about axis B-B.

Locators 64 extend radially inward from ring body 36 in the example shown. Locators 64 facilitate assembly of two of flux rings 24 into a phase assembly 22. The locators 64 further facilitate assembling such phase assemblies 22 together to form a stator, such as stator 14 (best seen in FIGS. 2B and 6A-6C). In the example shown, flux ring 24 includes three locators 64a, 64b, 64c corresponding to the three phases of electric machine 10 (FIGS. 1 and 2A). It is understood, however, that flux rings 24 can include any desired number of locators 64 for aligning flux rings 24 to assemble into phase assemblies 22 and/or stator 14.

Locators 64 are formed as projections extending from ring body 36. In the example shown, locators 64 extend radially from ring body 36 towards motor axis A-A. Locators 64 thereby extend radially away from air gap 30. While locators 64 are shown as positive alignment features such that locators 64 are formed by material extending from flux ring 24, it is understood that locators 64 can be formed in any desired manner. For example, locators 64 can be formed as negative alignment features, such as by a notch, groove, or other removal of material.

In the example show, locators 64a, 64b, 64c have differing configurations to facilitate visual identification of each locator 64a, 64b, 64c. Locator 64a is formed as a tab. Locator 64b is formed as a tab having a notch. Locator 64c is formed as a tab having multiple notches. It is understood, however, that locators 64a-64c can be formed in any desired manner.

Locator 64a is disposed on the flip axis B-B and is mirrored about flip axis B-B. As such, in the example shown axis B-B bisects locator 64a. Locator 64b and locator 64c are circumferentially offset from locator 64a about motor axis A-A. Locator 64b can be located at the same axial location along axis B-B as locator 64c such that the locations of locators 64b, 64c are mirrored about axis B-B.

Locator 64a is spaced from locator 64b about motor axis A-A by a first offset, locator 64a is spaced from locator 64c about motor axis A-A by a second offset, and locator 64b is spaced from locator 64c about motor axis A-A by a third offset. The locations of locators 64a-64c are not rotationally symmetric about motor axis A-A. In some examples, the first offset is the same as the second offset while the third offset differs from the first and second offsets. In one example, first offset and second offset are less than 120-degrees while third offset is greater than 120-degrees. The asymmetric offsets between locators 64 facilitates axial alignment of phase assemblies 22 along axis A-A to form stator 14, as discussed in more detail below.

Flux ring 24 is configured to facilitate a large total width of axial returns 28 while also providing locations for the coil connectors 50b to extend from the coil 26 radially inward. Flux ring 24 includes components disposed asymmetrically about motor axis A-A to facilitate both operative alignment about axis B-B and desired positioning of axial returns 28 and flux projections 44. Flux projections 44 and associated teeth 48 are required to be at certain circumferential positions in to flux pair with an associated flux ring 24 in a phase assembly 22. However, axial returns 28 are not so constrained. The spacing between axial returns 28 is generally free so long as planar interfaces are formed between the axial returns 28 and each flux ring 24 of the phase assembly 22.

The narrower circumferential gaps 66b relative to circumferential gaps 66a provide a smaller overall size of flux ring 24 without sacrificing the size of axial returns 28. For example, if each circumferential gap 66 was configured as a circumferential gap 66a, then the flux ring 24 would need to have a larger diameter, and thus include more material, to support the same size of axial returns 28 as shown, increasing the weight and size of electric machine 10.

In the example shown, flux ring 24 includes a set of three circumferential gaps 66a. As discussed in more detail below, flux ring 24 can be used to form each flux ring 24a-24f (FIG. 2B, 6A-6C) of a stator 14. Each circumferential gap 66a provides a location for a coil connector 50b to extend around the axial end of its coil 26 and radially inward towards motor axis A-A. Each of the three separate circumferential gaps 66a are configured to provide a location for the coil connector 50b of each of the three phase assemblies 22 of a three phase motor to extend through.

Return opening 54 are asymmetrically spaced about motor axis A-A such that axial returns 28 are asymmetrically disposed about motor axis A-A. The asymmetric spacing of axial returns 28 creates the gaps 67 between axial returns 28 within return openings 54a to allow the coil connectors 50a, 50b to extend radially inward to a core of stator 14 between the axial returns 28. Trunks 40 are asymmetric about motor axis A-A to size the different return openings 54a, 54b. Trunks 40 are unevenly arrayed circumferentially around the motor axis A-A such that a first pair of adjacent trunks 40 have a first separation distance between them and a second pair of adjacent trunks 40 have a second separation distance between them that is different than the first separation distance. In some examples, the trunks 40 are unevenly arrayed circumferentially around the motor axis A-A such that a third pair of adjacent trunks 40 has a third separation distance between them that is different than the first separation distance and the second separation distance.

Branches 42 are asymmetrically spaced about motor axis A-A. Branches 42 are unevenly arrayed circumferentially around the motor axis A-A such that a first pair of adjacent branches 42 or groups of branches 42 have a first separation distance between them and a second pair of adjacent branches 42 or groups of branches 42 have a second separation distance between them that is different than the first separation distance. In some examples, branches 42 are unevenly arrayed circumferentially around the motor axis A-A such that a third pair of adjacent branches 42 or groups of branches 42 have a third separation distance between them that is different than the first separation distance and the second separation distance.

The asymmetric spacing of branches 42 positions return interface surfaces 58 of opposing flux rings 24 forming a phase assembly 22 at suitable locations to form planar interfaces with axial returns 28. The axial returns 28 interface with the planar interface surfaces 58 on each of the flux rings 24 of a phase assembly 22. As such, axial returns 28 are keyed to the return openings 54 ensure proper alignment between the flux rings 24. The asymmetric spacing of branches 42 also properly positions flux projections 44 in each of the flux rings 24 of a phase assembly 22 relative to each other during operation. Flux projections 44 are asymmetrically spaced about motor axis A-A. The asymmetric spacing of flux projections 44 facilitates flipping about axis B-B such that flux projections 44 are axially misaligned on the paired flux rings 24 forming a phase assembly 22.

The terminal flux projections 44 of each branch 42 can extend circumferentially relative to the return interface surface 58 of the branch 42 that the flux projection 44 extends from. The terminal flux projections 44 are those flux projections 44 that are adjacent to and partially define one of circumferential gaps 66a, 66b. The flux projections 44 are configured such that the flux projection 44 furthest in circumferential direction CD1 along each branch 42 extends circumferentially outwards relative to the return interface surface 58 of the branch 42. The first circumferential direction CD1 is counterclockwise in the view FIG. 4A and clockwise in the view of FIG. 4B. The circumferential projection of the terminal flux projection 44 relative to the branch 42 positions flux projection 44 for operative flipping about axis B-B and forming the flux paired ones of flux projections 44. In the example shown, the flux projections 44 defining circumferential gaps 66a and extending radially relative to branch ends 60a extend furthest circumferentially relative to an associated return interface surface 58.

Radial line R1 extends from motor axis A-A through the interface between branch end 60a and return interface surface 58. Radial line R1 extends through the terminal one of flux projections 44 furthest in circumferential direction CD1 and partially defining circumferential gap 66a. Radial line R1 is disposed circumferentially between the tooth 48 of that flux projection 44 and the teeth 48 of the remaining flux projections 44 of that branch 42. Radial line R1 can extend partially through that tooth 48. The divided portion of that flux projection 44 (i.e., the portion extending in circumferential direction CD1 relative to radial line R1) can include up to the entire tooth 48. In various examples, the divided portion of flux projection 44 can include at least 95% or more of the volume of the tooth 48 of that flux projection 44 and/or the area of axial end 74a of the tooth 48 of that flux projection 44.

Radial line R2 extending from motor axis A-A through the interface between branch end 60d and return interface surface 58 extends through the terminal one of flux projections 44 furthest in circumferential direction CD1 and partially defining circumferential gap 66b. Radial line R2 is not disposed circumferentially between the tooth 48 of that flux projection 44 and the teeth 48 of the remaining flux projections 44 of that branch 42. Radial line R2 is disposed circumferentially between the tooth 48 of that flux projection 44 and circumferential gap 66b. Radial line R2 can extend partially through that tooth 48. In some examples, the divided portion of that flux projection 44 (i.e., the portion extending in circumferential direction CD1 relative to radial line R2) can include no portion of the tooth 48. The divided portion of flux projection 44 can include up to 1%, 2%, 5%, or more of the volume of the tooth 48 of that flux projection 44 and/or the area of axial end 74a of the tooth 48 of that flux projection 44.

Radial line R3 extends through the center of a trunk 40 supporting a branch 42 having branch ends 60c, 60d. Radial line R4 extends through the center of a trunk 40 supporting a branch 42 having branch ends 60a, 60b. Trunks 40 can be disposed at the midpoint of the base of each branch 42 such that each return interface surface 58 extends the same distance away from trunk 40. Trunks 40 can thereby bisect the bases of each branch 42. Flux projections 44 are circumferentially offset on branches 42 relative to the radial lines R3, R4 such that the radial lines R3, R4 do not extend through a radial centerline of the middle one of flux projections 44 on that branch 42. The set of flux projections 44 of each branch 42 is thereby circumferentially offset from the trunk 40 supporting that branch 42. In the example shown, flux projections 44 on the branches 42 having branch ends 60c, 60d are offset to a lesser degree than flux projections 44 on the branches 42 having base ends 60a, 60b. The circumferential offset of flux projections 44 facilitates positioning of return openings 54a, 54b and flux projections 44 for operative flipping about flip axis B-B.

To form a phase assembly 22, a first flux ring 24 is disposed opposite a second flux ring 24. The first flux ring 24 and second flux ring 24 are positioned to be coaxial with the motor axis A-A. Each of the flux rings 24 has the same base configuration that defines the radial and circumferential locations of the return openings 54 of each flux ring 24 and of the flux projections 44 of each flux ring 24. The flux rings 24 can thus be considered to have the same operative geometries.

The first flux ring 24 is in a first position on the motor axis A-A and the second flux ring 24 is in a position on the motor axis A-A having a flipped orientation about flip axis B-B relative to the first position. The locator 64a of the first flux ring 24 is axially aligned with the locator 64a of the second flux ring 24 to properly position the two flux rings 24 relative to each other. As such, the flip axis B-B of the first flux ring 24 is disposed parallel to and in a common plane with the flip axis B-B of the second flux ring 24 of the phase assembly 22. With locators 64a axially aligned, the locator 64b of the first flux ring 24 is axially aligned with the locator 64c of the second flux ring 24 and the locator 64c of the first flux ring 24 is axially aligned with the locator 64b of the second flux ring 24. With locators 64a aligned, the teeth 48 of the first flux ring 24 extend into the circumferential spaces between teeth 48 of the second flux ring 24, and the teeth 48 of the second flux ring 24 extend into the circumferential spaces between teeth 48 of the first flux ring 24.

The asymmetric spacing of locators 64 about motor axis A-A facilitates proper alignment and provides mistake proofing. If the locator 64a of the first flux ring 24 is axially aligned with either of locators 64b, 64c of the second flux ring 24, then other ones of the locators 64 will be axially misaligned. The axial misalignment between the pair of locators 64 identifies the paired flux rings 24 as misaligned. The asymmetric spacing between locators 64a, 64b, 64c further facilitates assembling phase assemblies 22 formed from the same configuration of flux ring 24 into a stator 14, as discussed in more detail below.

A coil 26 is positioned between the first flux ring 24 and the second flux ring 24 such that the face side of each flux ring faces the coil 26. The flux projections 44 of the first flux ring 24 are circumferentially offset from the flux projections 44 of the second flux ring 44. The return openings 54 of each flux ring 24 are axially aligned. The positions of the return opening 54 and flux projections 44 of the first flux ring 24 with respect to the face side of the first flux ring 24 are the same as the positions of the return openings 54 and the flux projections 44 with respect to the away side of the second flux ring 24. Axial returns 28 are inserted into the return openings 54 of the flux rings 24 such that the axial returns 28 bridge between the flux rings 24 and such that the axial returns 28 are arrayed about the motor axis A-A.

Flux ring 24 provides significant advantages. Return openings 54 are asymmetric about axis A-A but are symmetric about flip axis B-B. The asymmetric spacing about axis A-A provides mounting locations for axial returns 28 and facilitates the formation of gaps 67 between axial returns 28 to provide locations for coil connectors 50a, 50b to extend between those axial returns 28 without decreasing the size of the axial returns 28. Maintaining the larger sizes of axial returns 28 facilitates efficient motor operation in a compact arrangement. Flux projections 44 are asymmetric about motor axis A-A and are not rotationally symmetric about flip axis B-B. The asymmetry of flux projections 44 facilitates sizing of circumferential gaps 66a, 66b and proper positioning of flux projections 44 relative each other in opposed flux rings 24 of a phase assembly 22. Flux ring 24 is operatively aligned about flip axis B-B such that a single base configuration of flux ring 24 can be used to form both flux rings 24 of a phase assembly 22. In addition, flux rings 24 are rotatably positionable about motor axis A-A to form each phase assembly 22 of a stator 14. Such a configuration reduces part count and allows for a single part to be used to form each flux ring 24, simplifying manufacturing and assembly. Only a single configuration of flux ring 24 needs be manufactured to produce each flux ring in a phase assembly 22 and in a stator 14.

Figure 5A:
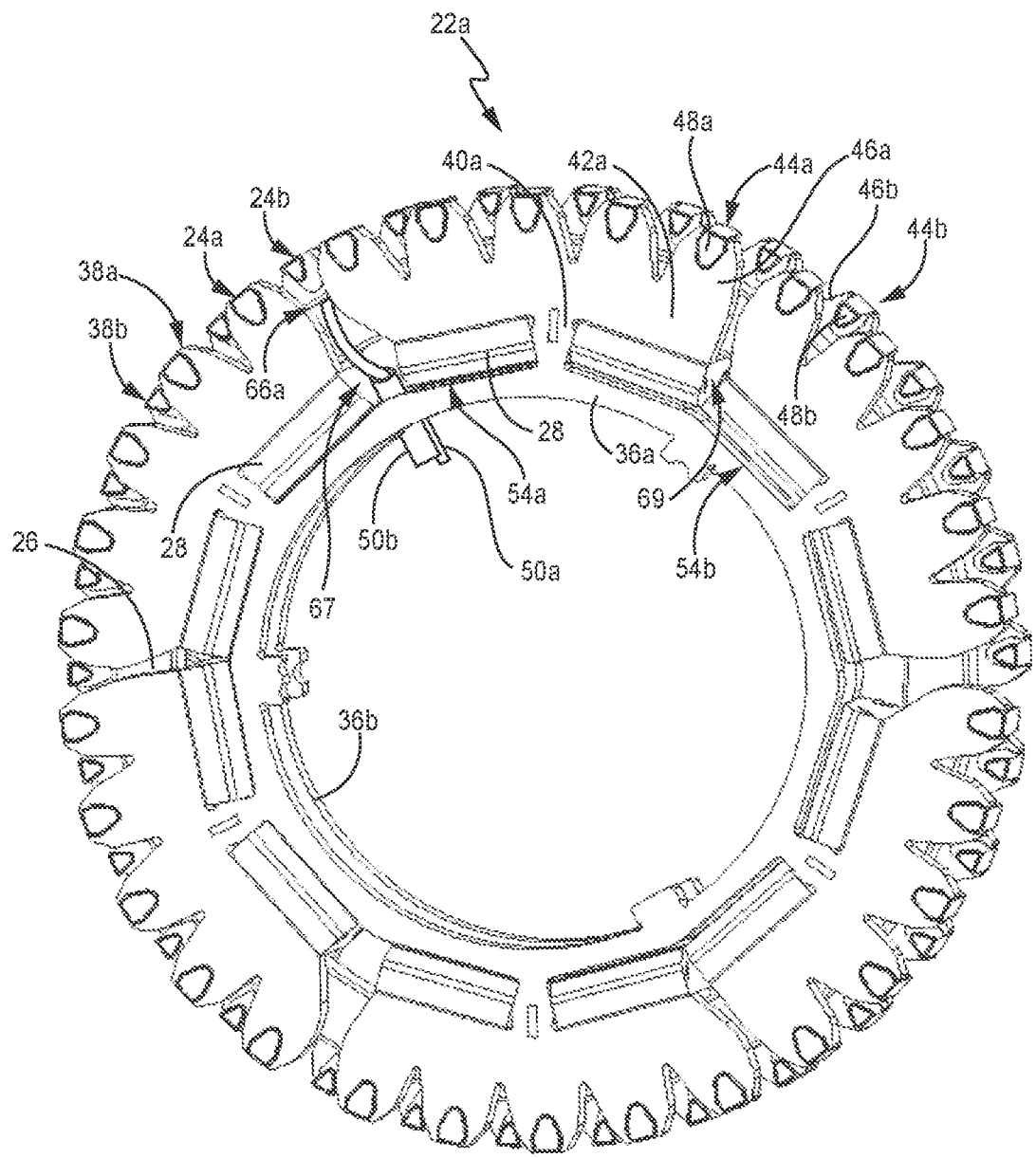
FIG. 5A is an isometric view of a phase assembly.
Figure 5B:
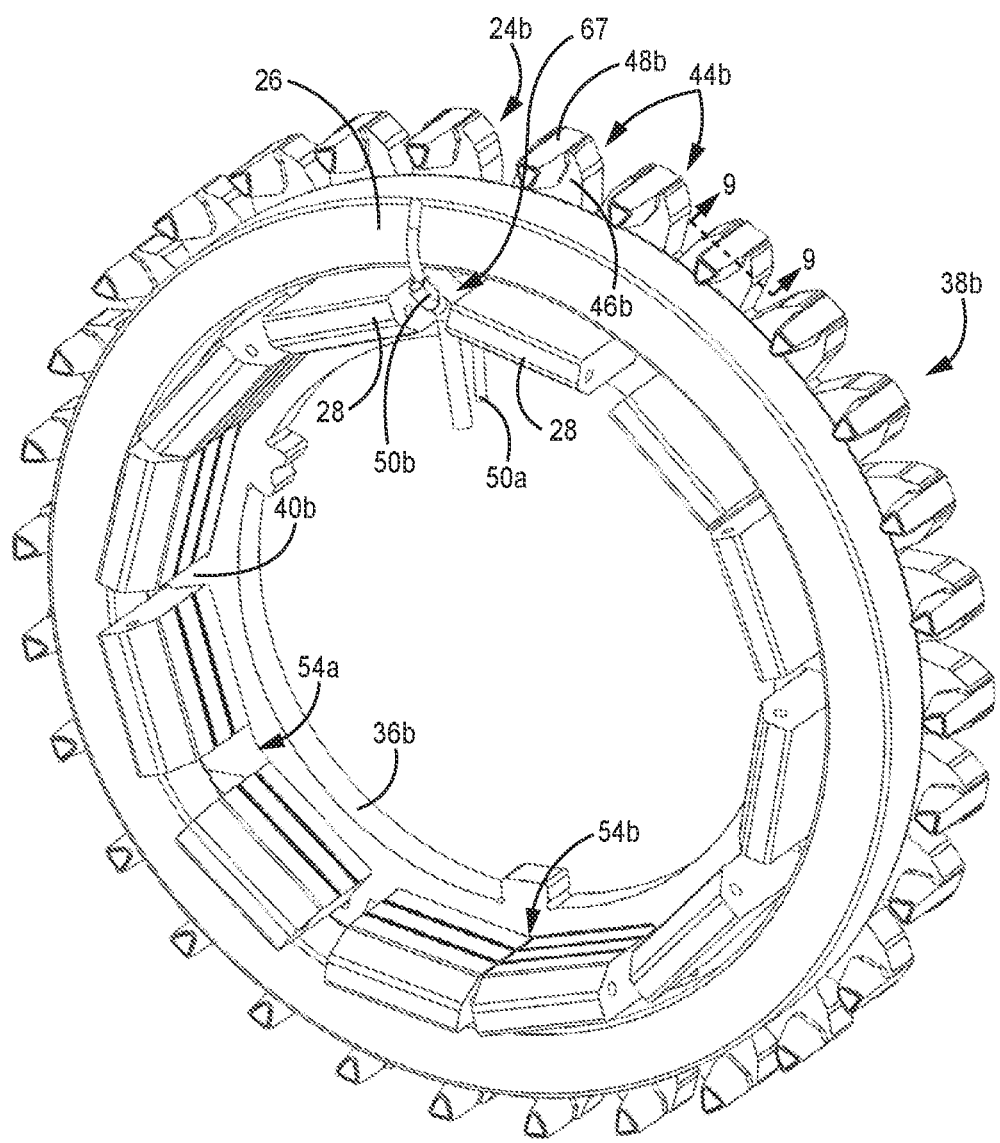
FIG. 5B is an isometric view of the phase assembly shown in FIG. 5A with a flux ring removed.
Figure 5C:
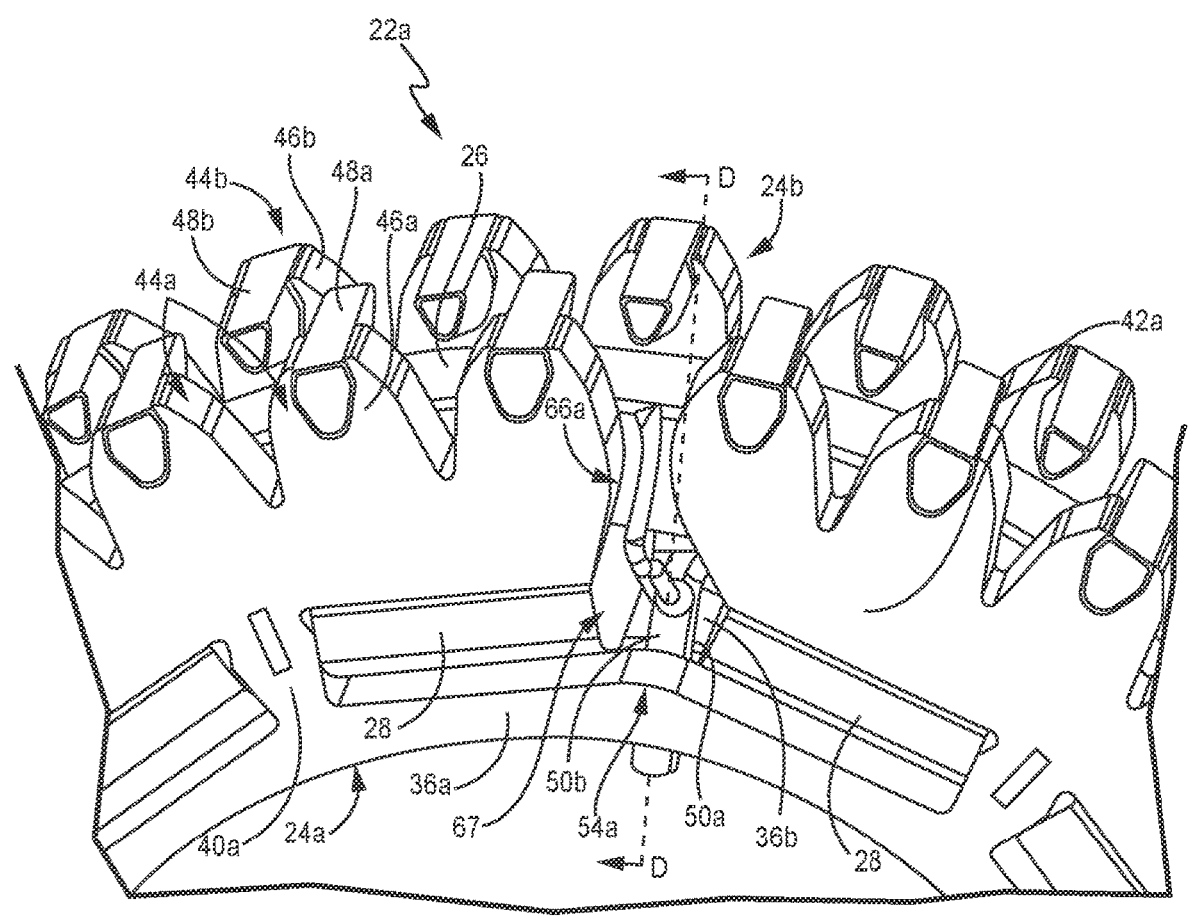
FIG. 5C is an enlarged isometric view of a portion of the phase assembly shown in FIG. 5A.
Figure 5D:
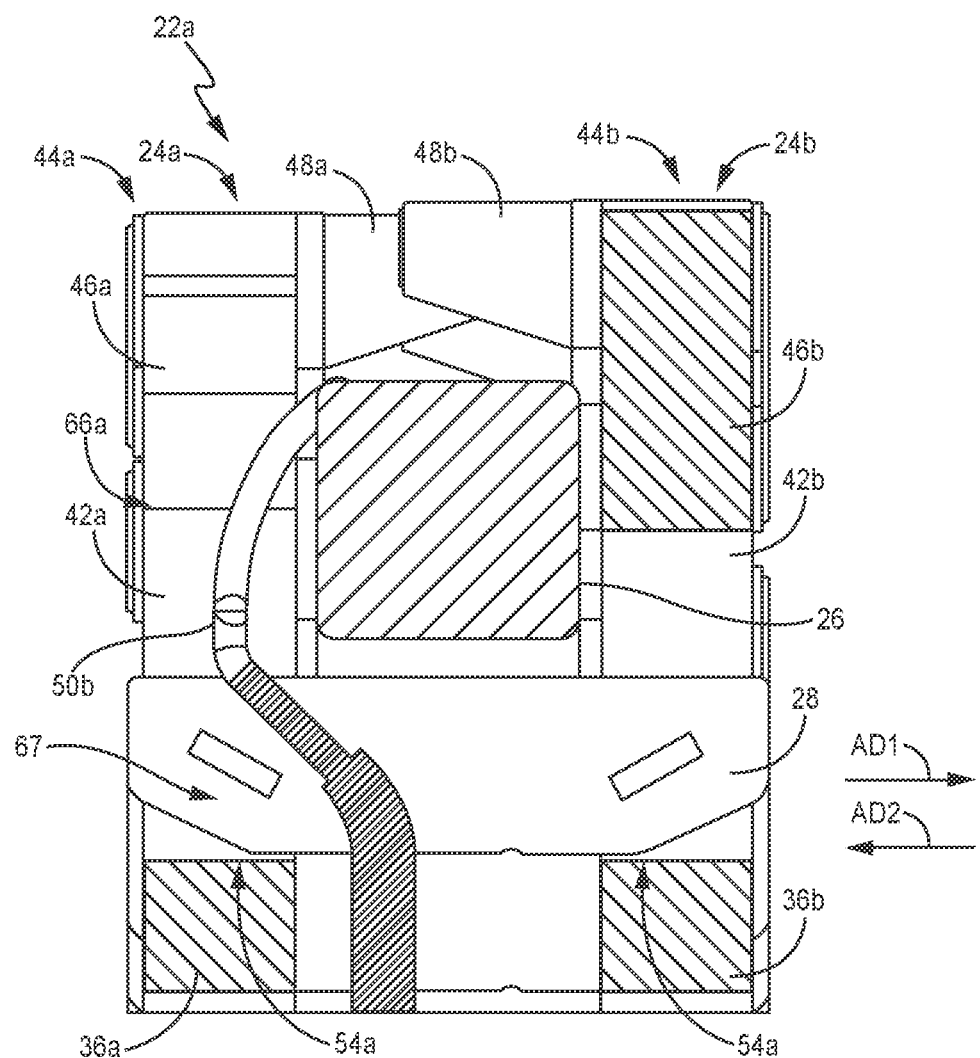
FIG. 5D is an enlarged cross-sectional view taken along line D-D in FIG. 5A.

FIG. 5A is an isometric view of phase assembly 22a. FIG. 5B is an isometric view of phase assembly 22a with flux ring 24a removed. FIG. 5C is an enlarged isometric view of a portion of phase assembly 22a. FIG. 5D is an enlarged cross-sectional view taken along line D-D in FIG. 5A. FIGS. 5A-5D will be discussed together. Phase assembly 22a includes flux rings 24a, 24b; coil 26; and axial returns 28. Flux ring 24a includes ring body 36a, trunks 40a, branches 42a, and flux projections 44a. Flux ring 24b includes ring body 36b, trunks 40b, branches 42b, and flux projections 44b. Each flux projection 44a, 44b respectively includes holder 46a, 46b and tooth 48a, 48b. Coil connectors 50a, 50b of coil 26 are shown.

Flux rings 24a, 24b are disposed annularly about motor axis A-A. Coil 26 is disposed axially between flux rings 24a, 24b. More specifically, coil 26 is disposed axially between branches 42 of flux ring 24a and branches 42 of flux ring 24b. Coil 26 is further disposed radially between axial returns 28 and portions of the teeth 48a, 48b of each flux ring 24a, 24b. Axial returns 28 are oriented axially relative to motor axis A-A and are disposed on an opposite radial side of coil 26 from teeth 48a, 48b. Axial returns 28 extend into return openings 54 formed in each of flux ring 24a and flux ring 24b and directly contact branches 42a, 42b at planar interfaces.

Flux ring 24a is in a first orientation with teeth 48a oriented in first axial direction AD1 and flux ring 24b is in a second orientation with teeth 48b oriented in second axial direction AD2 opposite the first axial direction AD1. Flux ring 24 has the same configuration as flux ring 24b except that flux ring 24a is rotated about a flip axis B-B (FIGS. 4A and 4B) orthogonal to the motor axis A-A. Neither flux ring 24a, 24b is rotationally symmetrical about an axis orthogonal to motor axis A-A. Unlike flux rings 24a, 24b, phase assembly 22a is rotationally symmetrical about an axis orthogonal to motor axis A-A. More specifically, phase assembly 22a has two-fold rotationally symmetry about an axis orthogonal to motor axis A-A, which axis is on the same plane as the flip axis B-B and is disposed axially between the flux rings 24a, 24b.

Flux rings 24a, 24b are not mirror images of each other but are instead operatively aligned such that with flux ring 24a in the first orientation and flux ring 24b in the second orientation the return openings 54a, 54b of flux ring 24a are respectively axially and circumferentially aligned with return openings 54a, 54b of flux ring 24b. The teeth 48a of flux ring 24a are axially misaligned with the teeth 48b of flux ring 24b to form the flux circuits between paired ones of the teeth 48a, 48b of each flux ring 24a, 24b. The teeth 48a of flux ring 24a are interposed between the teeth 48b of flux ring 24b annularly about axis A-A.

Coil connectors 50a, 50b extend from coil 26 and provide electrical connections for coil 26. Coil connectors 50a, 50b can be the terminal ends of the wire winding around motor axis A-A that forms coil. Each of coil connectors 50a, 50b extend radially inward towards motor axis A-A because electric machine 10 is an outer rotator motor.

Coil connector 50a extends from a radially inner side of coil 26. Coil connector 50a extends between adjacent ones of axial returns 28 in a return opening 54a to the interior of phase assembly 22. As discussed above, return openings 54a are sized to circumferentially space the axial returns 28 in that return opening 54a and provide a gap 67 for coil connectors 50a, 50b to extend between the axial returns 28. Because coil connector 50a extends from the radially inner side of coil 26a, coil connector 50a can extend directly radially inward from coil 26 to the interior of phase assembly 22 without projecting axially relative to the axial sides of coil 26.

Unlike coil connector 50a, coil connector 50b extends from a radially outer side of coil 26 to the interior of phase assembly 22. Coil connector 50b must project axially relative to coil 26 to pass over the axial side of coil 26 and around coil 26 to the interior of phase assembly 22. Each of coil connector 50a and coil connector 50b extend through an axial gap between ring body 36a and ring body 36b.

Circumferential gap 66a between adjacent ones of the branches 42 of flux ring 24a facilitates routing coil connector 50b to the interior of phase assembly 22. The spacing between the branches 42 defining circumferential gap 66a provides a location for the coil connector 50b to project axially relative to coil 26 and to extend radially inward and around the axial face of coil 26.

As best seen in FIG. 5D, coil connector 50b projects axially relative to coil 26 and axis A-A such that coil connector 50b circumferentially overlaps with portions of flux ring 24a relative to axis A-A. Coil connector 50b can extend axially to be circumferentially between the flux projections 44a defining circumferential gap 66a and can be disposed circumferentially between the branches 42a defining circumferential gap 66a. Circumferential gap 66a provides a location for coil connector 50b to extend radially inward without removing laminate material from flux ring 24. Coil connector 50b passing through circumferential gap 66a facilitates a compact arrangement of electric machine 10 because the length of each phase assembly 22 along motor axis A-A does not need to be enlarged to provide room to route coil connector 50b between flux ring 24a and coil 26. Coil connector 50b is not axially between branches 42 or flux projections 44 of flux rings 24a, 24b but is instead disposed circumferentially between laminate portions of flux ring 24a.

Flux rings 24a, 24b provide significant advantages. Circumferential gap 66a is formed between adjacent ones of the branches 42 and positions axial returns 28 to facilitate routing coil connectors 50a, 50b to the core of phase assembly 22a. Axial returns 28 are asymmetric about axis A-A to provide the gap 67 for coil connectors 50a, 50b to extend therebetween. Circumferential gaps 66a provide space for coil connector 50b to be extend axially along axis A-A relative to coil 26 to be routed around the axial face of coil 26. Coil connector 50b extends axially to circumferentially overlap with portions of the flux ring 24a. However, the length of phase assembly 22a and axial length of the laminate forming flux rings 24a, 24b relative to axis A-A is not affected. Circumferential gap 66a allows coil connector 50b to extend around an axial side of coil 26 and between adjacent branches 42 defining circumferential gap 66a. Routing coil connector 50b through circumferential gap 66a facilitates a compact arrangement of phase assembly 22a and allows the flux rings 24a, 24b to be positioned as axially close to coil 26 along axis A-A as practicable. In addition, circumferential gap 66a facilitates winding the wire forming coil 26 in a single circumferential direction providing a single wound coil 26.

Figure 6A:
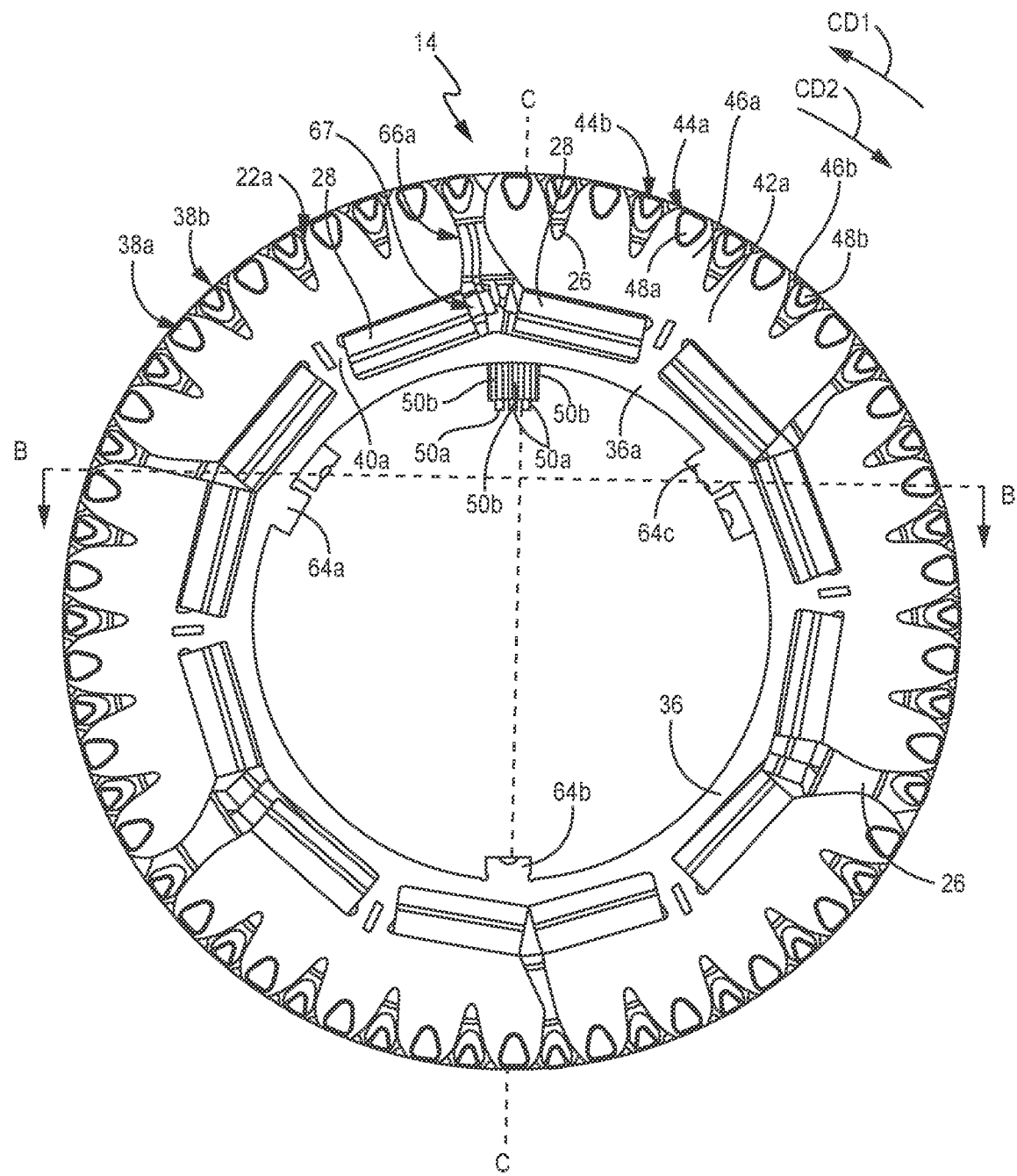
FIG. 6A is an elevational end view of a stator.
Figure 6B:
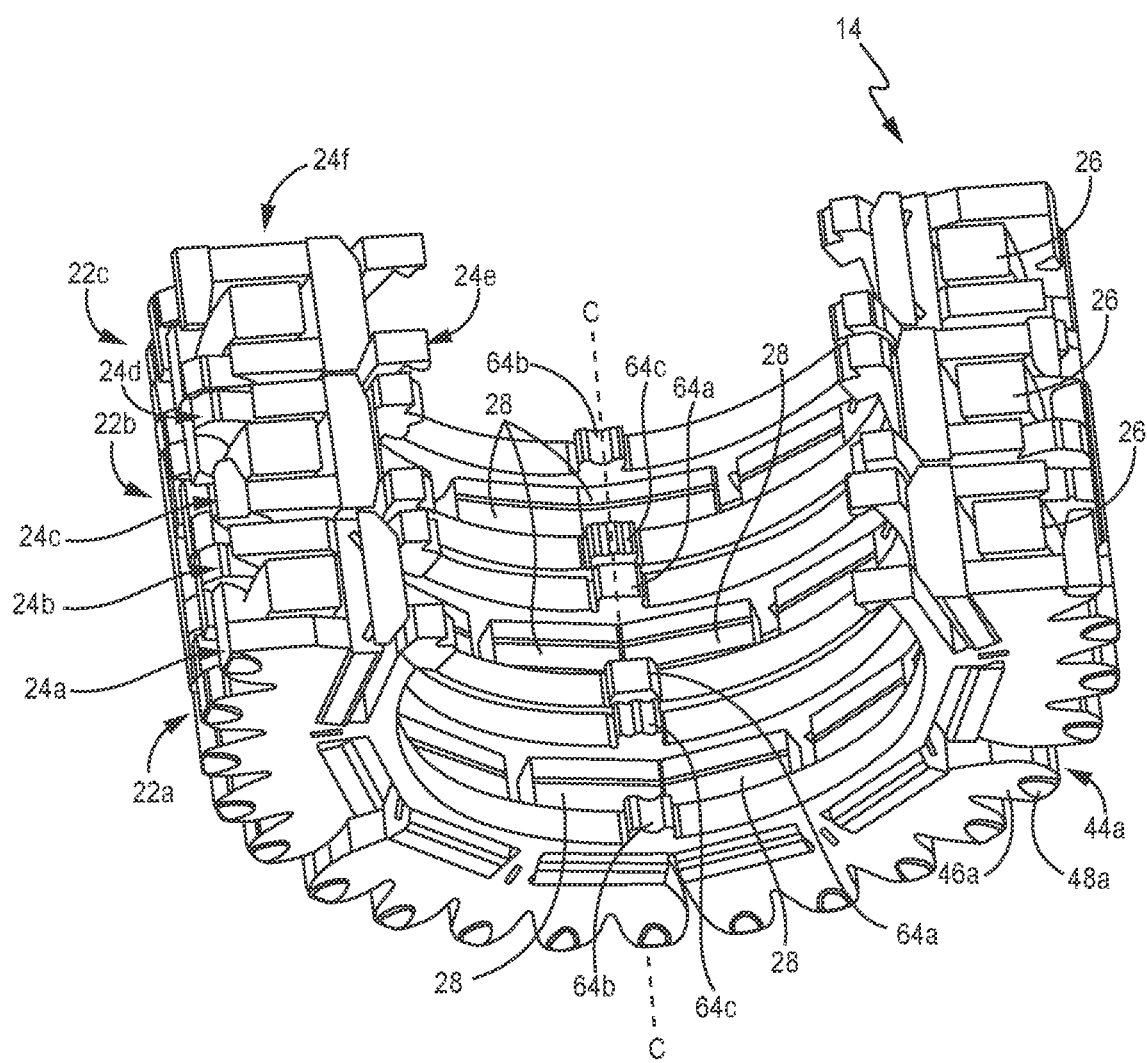
FIG. 6B is a cross-sectional view taken along line B-B in FIG. 6A.

FIG. 6A is an elevational end view of stator 14. FIG. 6B is a cross-sectional view taken along line B-B in FIG. 6A. FIG. 6C is a top view of stator 14. FIGS. 6A-6C will be discussed together. Stator 14 includes phase assembly 22a, phase assembly 22b, and phase assembly 22c. Phase assembly 22a includes flux rings 24a, 24b; coil 26; and axial returns 28. Phase assembly 22b includes flux rings 24c, 24d; coil 26; and axial returns 28. Phase assembly 22c includes flux rings 24e, 24f; coil 26; and axial returns 28.

Stator 14 is formed from phase assemblies 22a-22c each having a common phase configuration. Phase assembly 22a is disposed at a first axial end of stator 14, phase assembly 22c is disposed at a second axial end of stator 14, and phase assembly 22b is disposed axially between phase assembly 22a and phase assembly 22c. The phase assemblies 22a-22c are stacked axially along motor axis A-A and disposed coaxially with motor axis A-A.

Phase assembly 22a is formed by paired flux rings 24a, 24b disposed on opposite axial sides of coil 26. Phase assembly 22a includes an array of axial returns 28 about circumferential axis A-A. The axial returns 28 extend between and contact each of flux rings 24a, 24b. The axial returns 28 electrically connect flux rings 24a, 24b. Phase assembly 22b is formed by paired flux rings 24c, 24d disposed on the axial sides of a coil 26. Phase assembly 22b includes an array of axial returns 28 about circumferential axis A-A. The axial returns 28 extend between and contact each of flux rings 24c, 24d. The axial returns 28 electrically connect flux rings 24c, 24d. Phase assembly 22c is formed by paired flux rings 24e, 24f disposed on the axial sides of a coil 26. Phase assembly 22c includes an array of axial returns 28c about circumferential axis A-A. The axial returns 28 extend between and contact each of flux rings 24e, 24f. The axial returns 28 electrically connect flux rings 24e, 24f.

As discussed above, a single base configuration of a flux ring 24 can be used to form each flux ring 24 in a phase assembly 22. Each phase assembly 22 formed from such flux rings 24 has the same base phase configuration. In the example shown, each of flux rings 24a-24f have the same base configuration but are offset relative each other about the motor axis A-A and/or about their flip axes B-B (FIGS. 4A and 4B). For example, flux ring 24b is flipped on a flip axis B-B relative to flux ring 24a but is not rotated about axis A-A relative to flux ring 24a. Flux ring 24c is rotated about motor axis A-A relative to flux ring 24a. Flux ring 24d is flipped on a flip axis B-B relative to flux ring 24c but is not rotated about motor axis A-A relative to flux ring 24c. Flux ring 24e is rotated about motor axis A-A relative to both flux ring 24a and flux ring 24c. Flux ring 24f is flipped on a flip axis B-B relative to flux ring 24e but is not rotated about motor axis A-A relative to flux ring 24e.

The flux rings 24a-24f have the same base configuration to align return openings 54 and misalign teeth 48 between the paired ones of flux rings 24a-24f that form the phase assemblies 22a-22c. Forming each flux ring 24a-24f with a common base configuration simplifies manufacturing as only a single part type is required to form each of the six flux rings 24a-24f of the three phase stator 14. The single configuration of flux ring 24 can be used to form all six flux rings of the stator 14 by rotating the base flux ring 24 about motor axis A-A and/or flipping the base flux ring 24 about axis B-B.

Each phase assembly 22a-22c thereby has the same base phase configuration. Phase assemblies 22a-22c are stacked axially along motor axis A-A. Phase assemblies 22a-22c are rotationally offset relative to each other about motor axis A-A to properly offset the phase assemblies 22a-22c for generating electromagnetic flux to drive rotor 12. The phase assemblies 22a-22c are rotationally offset relative to each other about axis A-A to form stator 14. As discussed above, the AC signal for the three-phase stator shown is provided to each phase assembly 22a-22c 120-degrees electrically offset. However, phase assemblies 22a-22c are not 120-degrees mechanically offset relative each other about motor axis A-A. In the example shown, phase assembly 22a is offset in circumferential CD2 relative to phase assembly 22b by less than 120-degrees about motor axis A-A. Phase assembly 22c is offset is circumferential direction CD1 relative to phase assembly 22b by less than 120-degrees about motor axis A-A. The mechanical offsets about motor axis A-A position the flux paired ones of flux projections 44 of each phase assembly 22a-22c at the proper locations relative each other to generate the electromagnetic flux in time to act on magnets 32 and drive rotation of rotor 12.

Common components of each phase assembly 22a-22c are offset relative to each other circumferentially about motor axis A-A such that the components are not axially aligned along motor axis A-A. As best seen in FIG. 6B, the axial returns 28 of phase assembly 22a are offset from the axial returns 28 of both phase assembly 22b and phase assembly 22c about motor axis A-A. Similarly, the axial returns 28 of phase assembly 22b are offset from the axial returns 28 of phase assembly 22c about motor axis A-A. As shown in FIG. 6A, coil connectors 50a, 50b for each phase assembly 22a-22c extend into the interior of stator 14 at different circumferential locations about motor axis A-A.

As best seen in FIG. 6C, the teeth 48a of flux ring 24a are axially misaligned with teeth 48b-48f along motor axis A-A such that a line parallel to motor axis A-A extending through the circumferential midpoint of a tooth 48a does not extend through the circumferential midpoint of any of teeth 48b-48f; the teeth 48b are axially misaligned with teeth 48c-48f along motor axis A-A; the teeth 48c are axially misaligned with teeth 48d-48f along motor axis A-A; the teeth 48d are axially misaligned with teeth 48e, 48f along motor axis A-A; and the teeth 48d are axially misaligned with teeth 48f along motor axis A-A. As such, the flux paired ones of flux projections 44 in each phase assembly 22 are offset about motor axis A-A from the flux paired ones of flux projections 44 in the other phase assemblies 22. The phase assemblies 22a-22c are mechanically offset about axis A-A to facilitate driving rotation of rotor 12 by the out of phase AC signals delivered through the coils 26 of phase assemblies 22a-22c.

Referring specifically to FIG. 6B, locators 64 are utilized to align phase assemblies 22a, 22b, 22c relative each other to form stator 14. As discussed above, locators 64a are aligned between the paired ones of flux rings 24a-24f forming each phase assembly 22a-22c. With locators 64a aligned, locator 64b of the first flux ring 24 of the pair (e.g., flux ring 24a for phase assembly 22a) is aligned with locator 64c of the second flux ring 24 of the pair (e.g., flux ring 24b for phase assembly 22a) and locator 64c of the first flux ring 24 of the pair is aligned with locator 64b of the second flux ring of the pair.

In the example shown, locators 64 are disposed in three axial arrays within stator 14. One of the arrays is considered a master aligning array that indicates that phase assemblies 22a, 22b, 22c are properly aligned along and about motor axis A-A to form stator 14. The aligning array includes three pairs of locators 64 aligned axially relative to motor axis A-A. The other two arrays include at least one pair of locators 64 that is axially misaligned with the other locators 64 of that array relative to motor axis A-A. In the example shown, the locators 64 of the aligning array are arranged axially in first axial direction AD1 from flux ring 24a to flux ring 24f as locator 64b, locator 64c, locator 64a, locator 64a, locator 64c, and locator 64b.

While phase assemblies 22a-22c are discussed as aligned to form stator 14 based on the various pairs of locators 64, it is understood that phase assemblies 22a-22c can be operably positioned relative each other in any desired manner. For example, each phase assembly 22 can include a single locating feature (e.g., the paired locators 64a of flux rings 24 forming that phase assembly 22) that is placed at a desired circumferential position relative to motor axis A-A based on the axial position of that phase assembly 22 in stator 14. During assembly of stator 14, the locating feature of each phase assembly 22 can be oriented at the desired positions to properly position each phase assembly 22 relative to the other phase assemblies 22. For example, a series of three slots can be arrayed about motor axis A-A and phase assemblies 22 can be oriented by aligning the locator 64 on each phase assembly 22 with the slots.

Phase assemblies 22a-22c are configured such that stator 14 is rotationally symmetrical about a stator flip axis C-C. Stator flip axis C-C extends orthogonal to motor axis A-A and is disposed axially along motor axis A-A between the paired locators 64a of the axially middle phase assembly 22 (e.g., between flux rings 24c, 24d of phase assembly 22b). The axis C-C is parallel to both axis B-B of flux ring 24c and axis B-B of flux ring 24d. The axis C-C is disposed on the same plane as one extending through both axis B-B of flux ring 24c and axis B-B of flux ring 24d. However, phase assemblies 22a, 22c are rotationally offset from the flux rings 24c, 24d of phase assembly 22b about motor axis A-A. As such, axis C-C is oriented transverse to the axes B-B of flux rings 24a, 24b and the axes B-B of flux rings 24e, 24f. Each flux ring 24a-24f is not rotationally symmetrical about an axis orthogonal to motor axis A-A. Unlike flux rings 24, stator 14 is rotationally symmetrical about an axis orthogonal to axis A-A. More specifically, stator 14 has two-fold rotational symmetry about stator flip axis C-C.

Stator 14 provides significant advantages. Each phase assembly 22a, 22b, 22c can have the same base phase configuration. Having phase assemblies 22a, 22b, 22c with the same base configuration reduces part count and simplifies manufacturing. Only a single configuration of a phase assembly 22 needs to be manufactured to form the three phase stator 14 shown. The various flux rings 24a-24f having the same configuration are rotated about axis A-A and flipped about an axis B-B to form the six different orientations of the flux rings 24a-24f forming the three phase stator 14. A single base flux ring configuration can thereby be used to form each of six distinct parts of the stator 14, reducing part count and material cost, while also simplifying manufacturing. Stator 14 is also rotationally symmetric about axis C-C, simplifying installation and operation of stator 14.

Figure 7A:
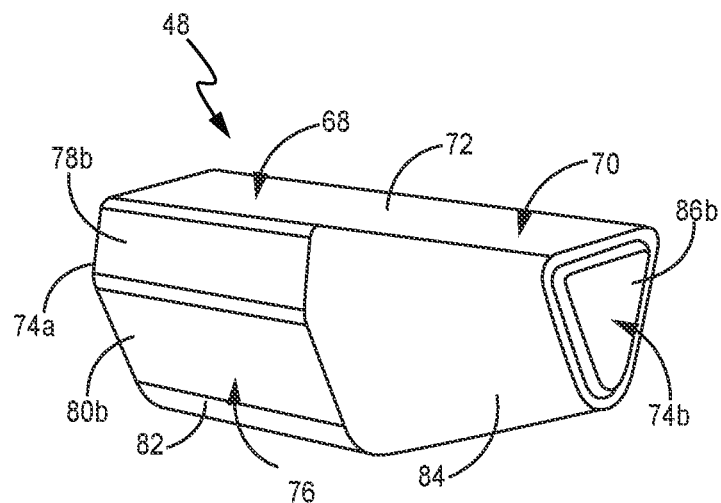
FIG. 7A is an isometric view of a tooth.
Figure 7B:
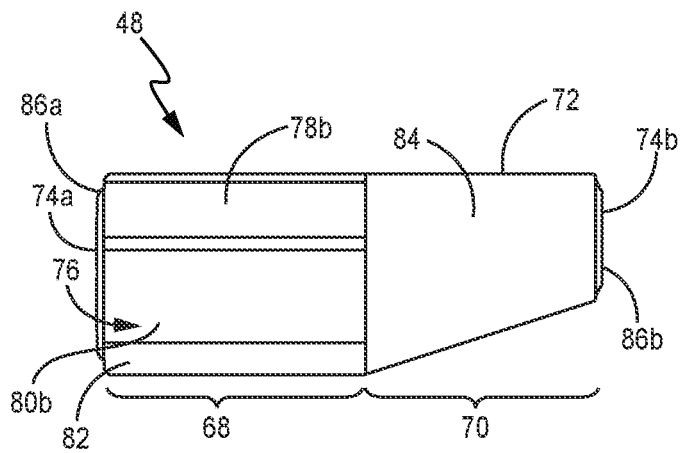
FIG. 7B is a side elevation view of the tooth of FIG. 7A.
Figure 7C:
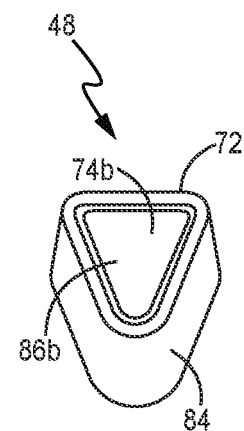
FIG. 7C is a first end elevation view of the tooth of FIG. 7A.
Figure 7D:
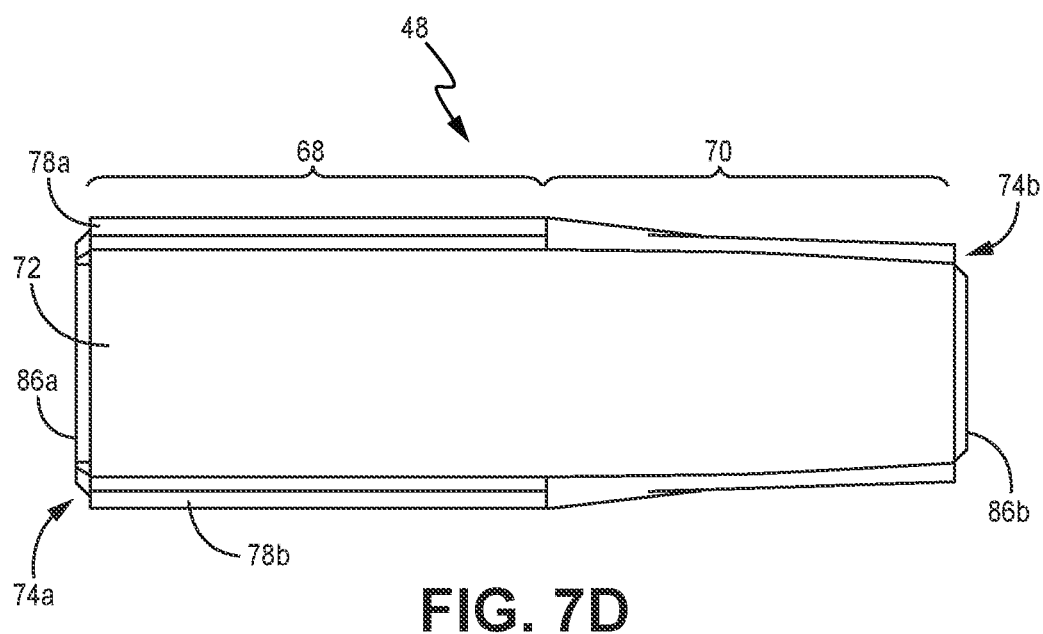
FIG. 7D is a top view of the tooth of FIG. 7A.
Figure 7E:
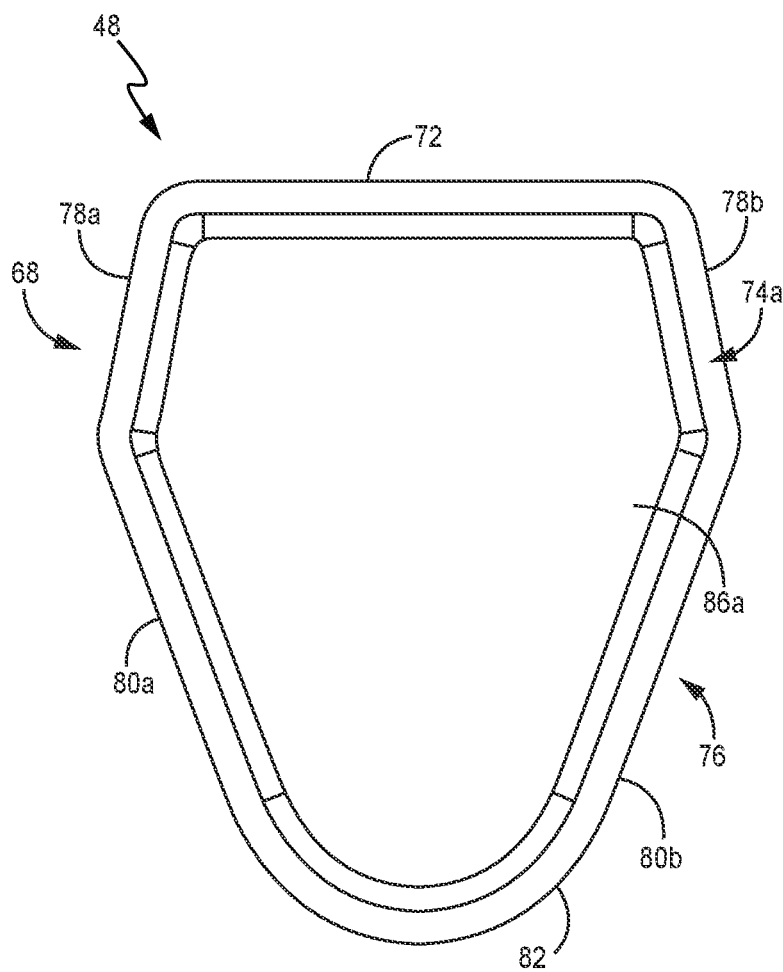
FIG. 7E is a second end elevation view of the tooth of FIG. 7A.

FIG. 7A is an isometric view of a tooth 48. FIG. 7B is a side elevation view of tooth 48 of FIG. 7A. FIG. 7C is a first end elevation view of tooth 48 of FIG. 7A. FIG. 7D is a top view of tooth 48 of FIG. 7A. FIG. 7E is a second end elevation view of tooth 48 of FIG. 7A. FIGS. 7A-7E will be discussed together. Tooth 48 includes first portion 68, second portion 70, gap face 72, and axial ends 74a, 74b. First portion 68 includes contact face 76 and clamp faces 78a, 78b. Contact face 76 includes lateral surfaces 80a, 80b and base surface 82. Second portion 70 includes contoured portion 84.

Tooth 48 is a powdered metal component comprising compacted metal particles having desirable magnetic properties, such as iron particles, among other options. Tooth 48 is axially elongate between axial end 74a and axial end 74b. Axial end 74a is formed by an axially oriented face of first portion 68. Axial end 74a is the distal end of first portion 68. Axial end 74b is formed by an axially oriented face of second portion 70. Axial end 74b is the distal end of second portion 70.

First portion 68 can have a continuous or nearly continuous cross-sectional profile orthogonal to motor axis A-A between axial end 74a and the interface between first portion 68 and second portion 70. Gap face 72 can be configured to produce an operationally consistent gap between tooth 48 and the magnets 32 of permanent magnet array 20. In some examples, gap face 72 can be planar. A radial line extending from motor axis A-A can be orthogonal to the planar gap face 72. The portion of gap face 72 formed on first portion 68 can be rectangular and have a common circumferential width along its axial length relative to axis A-A. The portion of gap face 72 formed on second portion can be rectangular or can be tapered to narrow towards axial end 74b, as discussed in more detail below. While gap face 72 is described as planar, it is understood that gap face 72 can have a radius such that gap face 72 is one of convex (e.g., for an outer rotator) and concave (e.g., for an inner rotator). The radius of tooth 48 at gap face 72 can match the radius of the radially outer ends of the flux projection array 38 that tooth 48 is disposed in.

Clamp face 78a extends radially and circumferentially away from a first circumferential side of gap face 72 relative to motor axis A-A. Clamp face 78b extends radially and circumferentially away from the second circumferential side of gap face 72 relative to motor axis A-A. As such, tooth 48 widens radially away from gap face 72 along the height of tooth 48 between the clamp faces 78a, 78b.

Contact face 76 extends between an end of clamp face 78a opposite gap face 72 and an end of clamp face 78b opposite gap face 72. The lateral surface 80a extends between the end of clamp face 78a and base surface 82. The lateral surface 80b extends between the end of clamp face 78b and base surface 82. Each of lateral surface 80a and lateral surface

80*b* can be planar. The width of tooth 48 between lateral surfaces 80*a*, 80*b* narrows along the height of tooth 48 away from gap face 72.

The plane along lateral surface 80*a* is transverse to the plane of clamp face 78*a* and the plane along lateral surface 80*b*. In some examples, lateral surface 80*a* is disposed transverse to the plane of clamp face 78*b*. In other examples, the plane of lateral surface 80*a* is parallel to the plane along clamp face 78*b*. Similarly, the plane along lateral surface 80*b* is transverse to the plane of clamp face 78*b* and lateral surface 80*aa*. In some examples, the plane along lateral surface 80*b* is transverse to the plane of clamp face 78*a*. In other examples, the plane of lateral surface 80*b* is parallel to the plane along clamp face 78*a*. Base surface 82 is a curved surface that forms an end of tooth 48 opposite gap face 72. The base surface 82 defines the end of tooth 48 that is spaced furthest from the air gap 30 during operation. Contact face 76 is configured to directly contact and interface with the laminate of a holder 46, as discussed in more detail below.

Second axial portion 70 projects axially from first axial portion 68 relative to motor axis A-A. Second portion 70 is tapered such that axial end 74*b* has a smaller cross-sectional area orthogonal to motor axis A-A than axial end 74*a*. Second portion 70 is tapered between the interface with first portion 68 and axial end 74*b*. A cross-sectional area of second axial end 74 taken along a plane orthogonal to the motor axis A-A reduces between the interface between first portion 68 and second portion 70 and axial end 74*b*. Second portion 70 is partially defined by gap face 72 and contoured portion 84. Contoured portion 84 extends from a first circumferential side of gap face 72 to a second circumferential side of gap face 72. Contoured portion 84 is formed from a curved wall that is tapered between first portion 68 and axial end 74*b* to reduce the cross-sectional area of second portion 70. While the cross-sectional area of second portion 70 reduces, gap face 72 maintains a constant profile on both first portion 68 and second portion 70. It is understood, however, that while the width of gap face 72 can vary in second portion 70, the profile of gap face 72 remains consistent. For example, gap face 72 can be planar on both first portion 68 and second portion 70.

Contoured portion 84 can be smoothly tapered such that contoured portion 84 provides a constant, smooth transition between axial end 74*b* and the interface between first portion 68 and second portion 70. Second portion 70 can have an axial rate of change of cross-sectional area from axial end 74*b* to the flux transfer portion formed by first portion 68 that is a constant, linear or curved, without any inflection or steps in the rate of change. Contoured portion 84 extends from and is integral with contact face 76 and clamp face 78.

In some examples, axial end 74*b* includes an interface surface that is engaged by a tool or otherwise to force tooth 48 from a mold during manufacturing. In the example shown, projection 86*b* forms the ejection feature to aid in ejection from the mold during manufacturing and to prevent artifacts from being formed on tooth 48 during the ejection process. Projection 86*b* also facilitates assembly and provides a surface that can be engaged during press-fitting of tooth 48 into a holder 46. In the example shown, projection 86*b* has a cross-sectional profile orthogonal to axis A-A that is the same shape as the cross-sectional profile of axial end 74*b* orthogonal to axis A-A, but the cross-section of projection 86*b* has a smaller area. Projection 86*b* includes a contoured edge to provide a smooth transition to axial end 74*b* that aids in ejection during manufacturing and prevents the formation of artifacts. In the example shown, axial end 74*a* also includes a projection 86*a* similar to projection 86*b*.

Projection 86*a* provides an interface surface that can be contacted during manufacturing and/or assembly of tooth 48 and holder 46. In the example shown, projection 86*a* has a cross-sectional profile orthogonal to axis A-A that is the same shape as the cross-sectional profile of axial end 74*a* orthogonal to axis A-A, but the cross-section of projection 86*a* has a smaller area.

Figure 8:
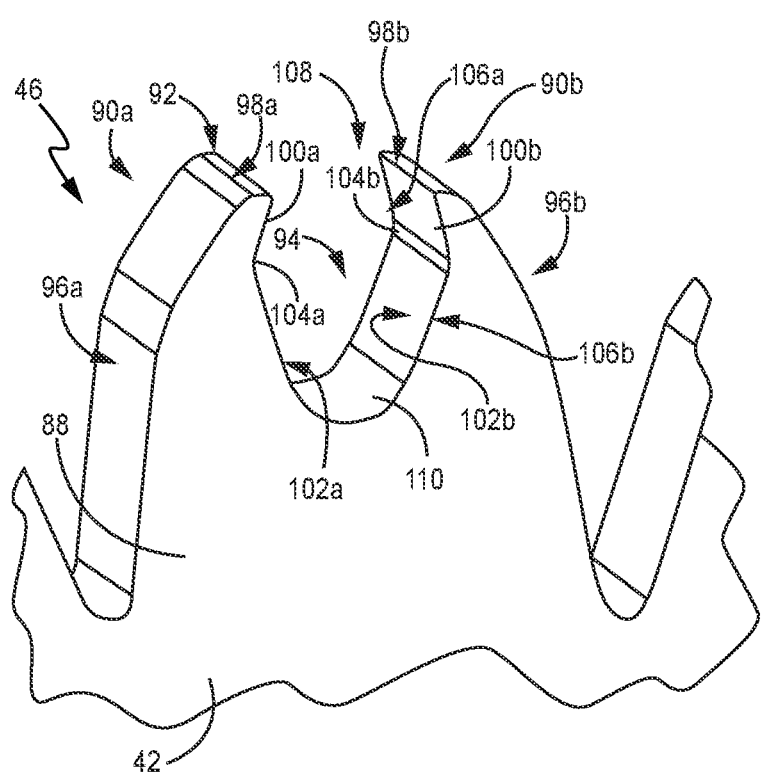
FIG. 8 is an enlarged isometric view of a portion of a flux ring showing a holder of a flux projection without a tooth.

FIG. 8 is an enlarged isometric view of a portion of a flux ring 24 showing a holder 46 of a flux projection 44 without a tooth 48. Holder 46 includes holder body 88; fingers 90*a*, 90*b*; radial end 92; receiving chamber 94; and outer sides 96*a*, 96*b*. Fingers 90*a*, 90*b* include, respectively, distal ends 98*a*, 98*b*; holding portions 100*a*, 100*b*; seating portions 102*a*, 102*b*; and transition portions 104*a*, 104*b*.

Holder 46 extends from a branch 42 to the radial end 92. Holder 46 projects from branch 42 and is spaced circumferentially from adjacent holders 46. Holder 46 is formed from the laminate forming branch 42. Holder 46 can thereby be integrally formed and unitary with branch 42. The axial length HL of holder 46 can be the same as the axial width of branch 42. As such, holder 46 can extend fully between the axial sides of branch 42. The axial length HL of holder 46 remains constant along the radial height of holder relative to axis A-A between branch 42 and radial end 92.

Holder body 88 extends radially from branch 42 to receiving chamber 94. Fingers 90*a*, 90*b* extend from holder body 88 and away from branch 42. Fingers 90*a*, 90*b* define the portion of holder 46 closest to air gap 30 (FIGS. 1 and 2A) and permanent magnet array 20 (FIGS. 1 and 2A). Spacing gaps 52 are shown in FIG. 8 between adjacent ones of the holders 46. As discussed above, the terminal holders 46 on each branch 42 are spaced from adjacent holders 46 on adjacent branch 42 by circumferential gaps 66*a*, 66*b* (best seen in FIGS. 4A-4C). Holder 46 widens between the interface with branch 42 and radial end 92. Radial end 92 is a circumferentially narrowest portion of holder 46.

Finger 90*a* is spaced from finger 90*b* to define receiving chamber 94 therebetween. Fingers 90*a*, 90*b* respectively extend from holder body 88 away from base 110 of receiving chamber 94 to distal ends 98*a*, 98*b*. Receiving chamber 94 includes axial openings 106*a*, 106*b* and radial opening 108. Axial openings 106*a*, 106*b* and radial opening 108 are each defined between fingers 90*a*, 90*b*. Radial opening 108 is defined between distal ends 98*a*, 98*b*. As such, receiving chamber 94 can be considered to be enclosed on three of six sides of the receiving chamber 94. Receiving chamber 94 is open at both axial ends and open at the end radially towards the air gap 30. Receiving chamber 94 is closed at both circumferential sides formed by fingers 90*a*, 90*b* and at base 110.

First finger 90*a* and second finger 90*b* are contoured to grasp and retain tooth 48 within retaining cavity. Holding portions 100*a*, 100*b* extend radially and circumferentially from distal ends 98*a*, 98*b*, respectively, and relative to axis A-A. Holding portions 100*a*, 100*b* are formed on the circumferentially inner walls of fingers 90*a*, 90*b*, respectively. Each holding portion 100*a*, 100*b* extends circumferentially away from radial opening 108 such that a width of receiving chamber 94 increases as receiving chamber 94 extends away from radial opening 108. The distal ends 98*a*, 98*b* thereby project over a portion of receiving chamber 94.

Holding portions 100*a*, 100*b* extend to transition portions 104*a*, 104*b*, respectively. Transition portions 104*a*, 104*b* are, respectively, inflection points between holding portions 100*a*, 100*b*, and seating portions 102*a*, 102*b*. Seating portions 102*a*, 102*b* extend radially and circumferentially from transition portions 104*a*, 104*b*. Seating portions 102*a*, 102*b* extend circumferentially inward and converge towards base 110. As such, the width of receiving chamber 94 narrows between transition portions 104a, 104b and base 110. Seating portions 102a, 102b include, respectively, seating face 112a, 112b and base face 114a, 114b. The respective base faces 114a, 114b extend towards each other to meet at and form base 110. Seating faces 112a, 112b can be planar. A plane along the surface of seating face 112a is transverse to a plane along the surface of holding portion 100a and transverse to a plane along the surface of seating face 112b. A plane along the surface of seating face 112a can be transverse to or parallel to a plane along the surface of holding portion 100b. Similarly, the plane along the surface of seating face 112b is transverse to the plane along the surface of holding portion 100b and transverse to the plane along the surface of seating face 112a. The plane along the surface of seating face 112b can be transverse to or parallel to the plane along the surface of holding portion 100a.

While receiving chamber 94 first widens and then narrows radially inward from radial opening 108 to base 110, the width of holder 46 between outer sides 96a, 96b increases from radial end 92 to the interface with branch 42. Similarly, the width of each finger 90a, 90b increases between distal ends 98a, 98b and base 110.

Figure 9A:
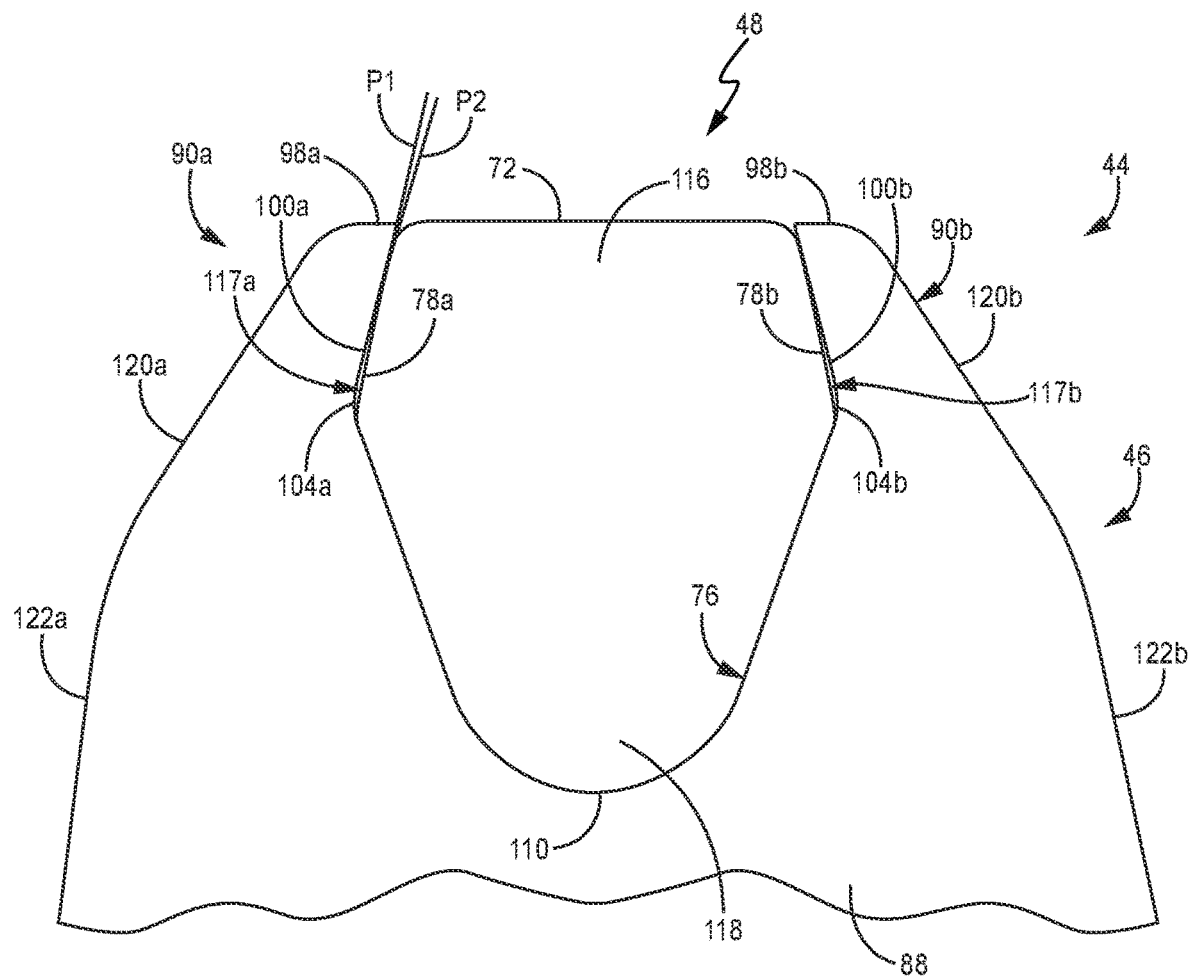
FIG. 9A is an enlarged cross-sectional view of a flux projection taken along line 9-9 in FIG. 5B.
Figure 9B:
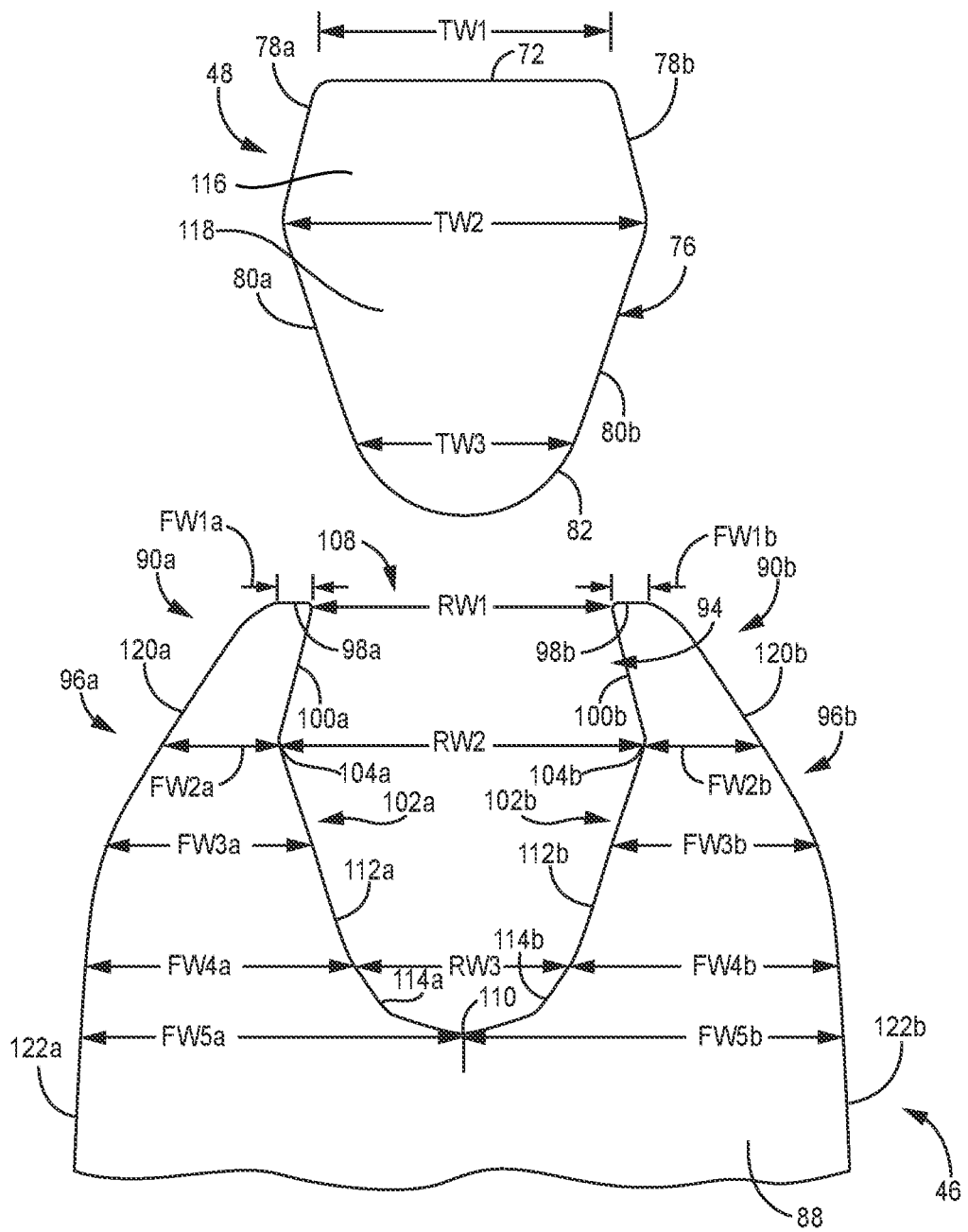
FIG. 9B is an exploded cross-sectional view of the flux projection shown in FIG. 9A.

FIG. 9A is an enlarged cross-sectional view of a flux projection 44 taken along line 9-9 in FIG. 5B. FIG. 9B is an exploded cross-sectional view of the flux projection 44 shown in FIG. 9A. FIGS. 9A and 9B will be discussed together. Flux projection 44 includes holder 46 and tooth 48. Holder 46 includes holder body 88 and fingers 90a, 90b. Holder body 88 includes outer sides 96a, 96b. Fingers 90a, 90b include distal ends 98a, 98b; holding portions 100a, 100b; seating portions 102a, 102b; and transition portions 104a, 104b. Tooth 48 includes first portion 68, second portion 70, gap face 72, and axial ends 74a, 74b. First portion 68 includes contact face 76 and clamp faces 78a, 78b. Contact face 76 includes lateral surface 80a, lateral surface 80b, and base surface 82. Second portion 70 includes contoured portion 84.

Flux projection 44 includes tooth 48 supported by holder 46. In some examples, holder 46 is formed from stacked laminate and tooth 48 is formed from powdered metal. Holder 46 is configured to engage tooth 48 and clamp tooth 48 within receiving chamber 94. More specifically, fingers 90a, 90b are configured as a spring claw that exerts a radial spring force on tooth 48 towards branch 42 to seat tooth 48 within receiving chamber 94. Fingers 90a, 90b interface with tooth 48 and force tooth 48 radially into base 110 to hold tooth 48 in place and maintain contact between tooth 48 and holder 46.

First portion 68 of tooth 48 is disposed within receiving chamber 94 and directly interfaces with the laminate stack of holder 46. Tooth 48 is configured to directly contact as much of the portion of holder 46 defining receiving chamber 94 as is possible to minimize gaps between tooth 48 and holder 46 and facilitate electromagnetic flux transfer. Flux flows radially through flux projection 44 to axial returns 28 (best seen in FIG. 3A). Flux projection 44 is configured to encourage radial flux flow through holder 46 to the laminate of an associated branch 42 (best seen in FIGS. 4A-4C).

First portion 68 of tooth 48 includes tooth outer portion 116 and tooth inner portion 118. Gap face 72 and clamp faces 78a, 78b are formed on tooth outer portion 116. In the example shown, tooth outer portion 116 has a trapezoidal cross-sectional profile in a plane orthogonal to motor axis A-A. In the example shown, tooth inner portion 118 has a triangular cross-sectional profile in with a rounded base point formed by base surface 82, taken in a plane orthogonal to motor axis A-A. Tooth inner portion 118 can be considered to have a U-shaped cross-sectional profile. In the example shown, tooth inner portion 118 has a U-shaped cross-sectional profile that narrows widthwise between the legs of the U along the height of tooth 48 and towards the end of tooth opposite gap face 72. It is understood, however, that not all examples are so configured.

Gap face 72 of tooth 48 is disposed between distal end 98a of first finger 90a and distal end 98b of second finger 90b. Gap face 72 is exposed through radial opening 108 of the receiving chamber 94. Gap face 72 is exposed to the air gap 30 (FIGS. 1 and 2A) formed between stator 14 and rotor 12. In some examples, gap face 72 is planar with distal ends 98a, 98b. As such, the radial end of flux projection 44 exposed to the air gap 30 can be partly formed by holder 46 and partly formed by tooth 48.

Tooth 48 has first width TW1 at gap face 72; second width TW2 at the interface between clamp faces 78a, 78b and lateral surfaces 80a, 80b, respectively; and third width TW3 proximate the interface between lateral surfaces 80a, 80b, and base surface 82. First width TW1 extends across gap face 72 and is a width of the radial-most portion of tooth 48 towards the air gap 30. The second width TW2 is larger than the first width TW1 as clamp faces 78a, 78b extend circumferentially away from radial opening 108. Third width TW3 is narrower than second width TW2 as contact face 76 narrows as contact face 76 extends away from clamp faces 78a, 78b. Third width TW3 is shown at the radial location where the planar lateral surfaces 80a, 80b transition to the curved base surface 82. In the example shown, third width TW3 is narrower than both second width TW2 and first width TW1. It is understood, however, that, in some examples, third width TW3 can be the same as or larger than first width TW1.

Holder 46 interfaces with and directly contacts tooth 48 to retain tooth 48 in receiving chamber 94. Holder 46 includes outer sides 96a, 96b that respectively include first surfaces 120a, 120b and second surfaces 122a, 122. Holder 46 defines receiving chamber 94. An outer portion of receiving chamber 94 extending between radial opening 108 and transition portions 104a, 104b can have a trapezoidal cross-sectional profile orthogonal to axis A-A to receive and interface with the trapezoidal cross-sectional profile of tooth outer portion 116. An inner portion of receiving chamber 94 between transition portions 104a, 104b and base 110 can have a cross-sectional profile orthogonal to axis A-A that is triangular with a rounded tip to receive and interface with tooth inner portion 118. The inner portion of receiving chamber 94 can be considered to have a U-shaped cross-sectional profile. In the example show, the inner portion of receiving chamber 94 has a U-shaped cross-sectional profile that widens between the legs of the U along the height of receiving chamber 94 from base 110 towards radial opening 108.

Tooth 48 and holder 46 are keyed together such that tooth 48 directly interfaces with holder 46 on both circumferential sides of tooth 48 and the radial end of tooth 48 opposite radial opening 108.

First finger 90a widens radially between distal end 98a and base 110. First finger 90a has a first width FW1a at distal end 98a. First finger 90a has a second width FW2a at the radial location aligned with transition portion 104a. First finger 90a has a third width FW3a proximate the interface between first surface 120a and second surface 122a of outer side 96a. First finger 90a has a fourth width FW4a at the radial location of the transition between seating face 112a and base face 114a. First finger 90a has a fifth width FW5a proximate the radial location of base 110. First width FW1a is smaller than second width FW2a, second width FW2a is smaller than third width FW3a, third width FW3a is smaller than fourth width FW4a, and fourth width FW4a is smaller than fifth width FW5a.

Finger 90a widens at a first rate between the distal end 98a and the location of transition portion 104a to increase the width of first finger 90a between the location of first width FW1a and the location of second width FW2a. Holding portion 100a and first surface 120a each extend in the same circumferential direction relative to axis A-A as those portions extend away from radial end 92 of holder 46.

Third width FW3a is larger than both of second width FW2a and first width FW1a. Third width FW3a is taken at a location proximate the interface between first surface 120a and second surface 122a of outer side 96a. Finger 90a widens at a second rate between the radial location of transition portion 104a and the radial location third width FW3a. Seating portion 102a and the first surface 120a extend in opposite circumferential directions as those portions extend away from radial end 92.

Fourth width FW4a is larger than each of third width FW3a, second width FW2a, and first width FW1a. Fourth width FW4a is taken at the radial location of the transition between seating face 112a and base face 114a. Finger 90a widens at a third rate between the radial location of transition portion 104a and the radial location fourth width FW4a. Seating portion 102a and second surface 122a extend in opposite circumferential directions as seating portion 102a and first surface 120a extend away from radial end 92.

Fifth width FW5a is larger than each of fourth width FW4a, third width FW3a, second width FW2a, and first width FW1a. Fifth width FW5a is taken proximate the radial location of base 110 of receiving chamber 94. Finger 90a widens at a fourth rate between the radial locations of fourth width FW4a and fifth width FW5a. Base face 114a and second surface 122a extend in opposite circumferential directions as those portions extend radially away from radial end 92.

Finger 90a widens at various rates between distal end 98a and the interface of finger 90a with holder body 88. The first rate can be the slowest widening rate. The second rate can be greater than the first rate such that the width of finger 90a increases more per each unit of distance along the radial height of holder 46 in those portions having the second rate than in those portions having the first rate. The third rate can be less than the second rate. The third rate can be greater than the first rate. The fourth rate can be greater than any of the first rate, second rate, and third rate.

Finger 90b is configured similar to finger 90a and has first width FW1b, second width FW2b, third width FW3b, fourth width FW4b, and fifth width FW5b. The widths of finger 90b are taken at the same relative locations as the widths of finger 90a, except between outer side 96b and the portion of finger 90b defining receiving chamber 94 (e.g., third width FW3b is taken proximate the interface between first surface 120b and second surface 122b of outer side 96b). The width of finger 90b increases radially between distal end 98b and the radial location of base 110. While finger 90b is similar to finger 90a, it is understood that finger 90b can differ from finger 90a. In some examples, the slope of the portions forming outer side 96a can differ from the slopes of the portions forming outer side 96b. For example, the terminal ones of flux projections 44 defining circumferential gaps 66 can differ from other ones of flux projections 44 due to those flux projections 44 extending circumferentially beyond branch 42. It is understood, however, that all flux projections 44 widen between the radial end 92 and base 110.

Receiving chamber 94 formed between first finger 90 and second finger 90 has a first width RW1 at the radial end 92 of holder 46. Receiving chamber 94 has a second width RW2 at the radial locations of transition portions 104a, 104b. Receiving chamber 94 has a third width RW3 at a radial location between transition portions 104a, 104b and base 110. First width RW1 extends between distal ends 98a, 98b and is a width of the radial opening 108 that is exposed to the air gap 30 during operation. The second width RW2 is larger than the first width RW1 as holding portions 100a, 100b extend circumferentially away from radial opening 108. Third width RW3 is narrower than second width RW2 as contact face 76 converges along seating portions 102a, 102b towards branch 42. Third width RW3 is shown at the radial location where the seating faces 112a, 112b transition to the base face 114. In the example shown, third width RW3 is narrower than both second width RW2 and first width RW1.

An actual width of flux projection 44 is a width taken between outer sides 96a, 96b. A laminate width of flux projection 44 is the combined width of those portions of flux projection 44 formed from stacked laminate at a given radial location between branch 42 and radial end 92 of holder 46. The laminate width does not include the width of powdered metal at a given radial location. At some radial locations, the actual width of flux projection 44 is the same as the laminate width of flux projection 44. At other radial locations (e.g., between radial opening 108 and base 110 of receiving chamber 94), the actual width of flux projection 44 is greater than the laminate width of flux projection 44 because those portions of flux projection 44 include the powdered metal tooth 48. For example, the laminate width is the combined widths of finger 90a and finger 90b at radial locations along flux projection 44 that include receiving chamber 94, while the actual width at those locations is the width of holder 46 between outer side 96a and outer side 96b. Both the laminate width and the actual width of the flux projection 44 increase from radial end 92 towards branch 42. Both the laminate width and the actual width can increase at all radial locations between radial end 92 and branch 42. At some radial locations, the width of tooth 48 is greater than the laminate width of flux projection 44. For example, tooth outer portion 116 is wider than the laminate width of flux projection 44 along the full radial height of tooth outer portion 116.

Each of the laminate width, the tooth width, and the actual width increase in the portion of flux projection 44 extending from radial opening 108 to transition portions 104a, 104b and towards branch 42. Both the laminate width and the actual width increase while the tooth width decreases in the portion of the flux projection 44 from transition portions 104a, 104b towards base 110.

Tooth 48 is secured within receiving chamber 94 by fingers 90a, 90b. In the example shown, tooth 48 directly interfaces with holder 46 in three contact zones. The first contact zone is formed between finger 90a and tooth 48. More specifically, the first zone is formed where holding portion 100a directly contacts clamp face 78a and exerts a force having a radial component towards branch 42 on tooth 48. The second contact zone is formed between finger 90b and tooth 48. More specifically, the second zone is formed where holding portion 100b directly contacts clamp face 78b and exerts a force having a radial component towards branch 42 on tooth 48. Clamp face 78a is disposed on plane P1 and the surface of holding portion 100a is disposed on plane P2. Plane P1 is disposed transverse to plane P2 such that only a portion of the interface between opposing portions of holding portion 100 and clamp face 78a includes direct contact between holder 46 and tooth 48. Clamp face 78b and holding portion 100b are configured similar to clamp face 78a and holding portion 100a.

The third contact zone is formed between seating portions 102a, 102b and contact face 76. The third contact zone is disposed on each circumferential side of tooth 48 and wraps around tooth 48 between the two sides. No air gaps are formed in the contact zones to facilitate efficient flux transfer through flux projection 44.

The first width RW1 of receiving chamber 94, which is also the distance between fingers 90a, 90b, can be less than the first width TW1 of tooth 48. In some examples, the first width TW1 of the tooth 48 is 1-percent, 3-percent, or up to 5-percent wider than the first width RW1 of receiving chamber 94. The difference in widths facilitates fingers 90a, 90b exerting the spring force on tooth 48 to seat tooth 48 within receiving chamber 94. Fingers 90a, 90b act as a spring clip that exert forces on tooth 48 to seat tooth within receiving chamber 94. Each finger 90a, 90b exerts a force having both radial and circumferential components. The circumferential components can cancel such that fingers 90a, 90b radially drive tooth 48 into receiving chamber 94 and away from air gap 30 to minimize air gaps between tooth 48 and holder 46.

The interface between tooth 48 and holder 46 forces tooth down into receiving chamber 94 such that direct contact is formed in the third contact zone and between seating portions 102a, 102b and contact face 76. First finger 90a and second finger 90b form a spring claw that exerts radial force on tooth 48 to drive the engagement within the third contact zone. The radius of the curved portion of receiving chamber 94 (e.g., the radius of the curve defined by base faces 114a, 114b can be slightly smaller than the radius of the curved portion of tooth 48 (formed by base surface 82). The smaller radius of receiving chamber 94 than tooth 48 provides a tight contact fit between tooth 48 and holder 46. The spring force of fingers 90a, 90b pushes tooth 48 downward to radially align gap face 72 with distal ends 98a, 98b of fingers 90a, 90b. Gap face 72 is directly exposed to air gap 30 between rotor 12 and stator 14.

Fingers 90a, 90b collects flux proximate the distal ends 98a, 98b of fingers 90a, 90b. The increasing laminate width and finger width on the circumferential sides of receiving chamber 94 provide additional area for the flux to flow through flux projection 44, reducing flux density in those areas. The expanding width of holder 46 away from radial end 92 and towards branch 42 decreases the flux density. The decreasing width of tooth inner portion 118 and expansion of the laminate width from transition portions 104a, 104b and towards base 110 further enhance flux transfer. The decreased flux density encourages radial flux flow through flux projection 44, providing efficient operation in a light weight, compact manner Flux projection 44 does not include a tooth that widens circumferentially at the base of the tooth. In some examples, tooth 48 includes smooth, converging surfaces proximate base 110 and does not include sudden transitions. It is understood, however, that not embodiments of tooth 48 are so configured.

A first tooth gap 117a is disposed circumferentially between tooth 48 and first finger 90a and a second tooth gap 117b is disposed circumferentially between tooth 48 and second finger 90b. The first tooth gap 117a is disposed between the first contact zone and the third contact zone. The second tooth gap 117b is disposed between the second contact zone and the third contact zone. Gaps between tooth 48 and holder 46 where tooth 48 is not in direct contact with holder 46 are generally undesirable as such gaps inhibit flux flow. The radial portion of flux projection 44 formed by tooth outer portion 116 and adjacent portions of fingers 90a, 90b collect flux that flows radially through the laminate and towards axial return 28. The radially outer end of flux projection 44 is rich in flux that flows radially into flux projection 44. The interface between tooth 48 and holder 46 is configured such that the first tooth gap 117a and the second tooth gap 117b are disposed circumferentially between holding portions 100a, 100b and clamp faces 78a, 78b, respectively, in the flux-rich region of flux projection 44. Tooth gaps 117a, 117b are filled with a potting compound after assembling tooth 48 to holder 46. Holder 46 maintains the desired position and orientation of tooth 48 during the potting process.

The tooth gaps 117a, 117b are disposed radially closer to air gap 30 than to base 110. The tooth gaps 117a, 117a are disposed radially between gap face 72 and the interface between lateral surfaces 80a, 80b and clamp faces 78a, 78b. As such, the tooth gaps 117a, 117b are disposed radially between the widest portion of tooth 48 and distal ends 98a, 98b. The tooth gaps 117a, 117b are disposed in a region of flux projection 44 that is rich in flux and has high flux density. Positioning tooth gaps 117a, 117b in this region minimizes the impact of such gaps as compared to gasp in less flux-dense regions. The tooth gaps 117a, 117b are disposed radially outside of the radial portion of flux projection 44 defined by tooth inner portion 118 and circumferentially adjacent parts of fingers 90a, 90b. The tooth gaps 117a, 117b are thereby disposed radially outside of the portion of flux projection 44 where tooth 48 circumferentially narrows and each finger 90a, 90b has walls extending in each circumferential direction. The increase in the laminate width facilitated by the narrowing tooth 48 and corresponding widening fingers 90a, 90b provides efficient flux transfer during motor operation.

Tooth 48 can be axially inserted into holder 46 during assembly of flux ring 24. Tooth 48 is press-fit into receiving chamber 94 and retained by fingers 90a, 90b. As best seen in FIG. 5D, each axial end 74a, 74b of the tooth 48 can project out of the receiving chamber 94 with tooth 48 mounted to holder 46. The profile of tooth 48 is aligned with the profile of receiving chamber 94 and tooth 48 is shifted axially relative to axis A-A such that tooth 48 enters receiving chamber 94 through an axial opening 106a, 106b (FIG. 8) of receiving chamber 94. For example, axial end 74a can be aligned with axial opening 106a such that first portion 68 is the first part of tooth 48 to enter into receiving chamber 94 and interface with holder 46. Fingers 90a, 90b exert a radial force on tooth 48 at clamp faces 78a, 78b, respectively, to seat tooth 48 within receiving chamber 94. Tooth 48 being axially inserted into receiving chamber 94 can force fingers 90a, 90b apart to cause fingers 90a, 90b to exert the spring force on tooth 48 to seat tooth 48. Tooth 48 can, in some examples, be inserted by exerting an axial force on tooth 48 at one of projections 86a, 86b. The interface between fingers 90a, 90b and tooth 48 is a press-fit connection that has a high degree of precision and can be easily assembled. Fingers 90a, 90b retain tooth 48 relative to holder 46 through a potting step of the manufacturing process.

Flux projections 44 provide significant advantages. Fingers 90a, 90b retain tooth 48 within receiving chamber 94. Fingers 90a, 90b clamp tooth 48 to holder 46 such that tooth gaps are minimized between holder 46 and tooth 48 and such that any tooth gaps that do remain are disposed at advantageous locations with high flux density so as to not inhibit flux flow. The interface between tooth 48 and holder 46 facilitates radial flux flow through flux projection 44. Fingers 90a, 90b act as a spring claw that robustly holds tooth 48 in position on holder 46. The widening along flux projection 44 of both the laminate width and the actual width away from air gap 30 and towards branch 42 reduces flux density towards branch 42 and away from air gap 30. The radial widening facilitates efficient flux flow through flux projection 44 to generate the electromagnetic field and drive rotation of rotor 12. Tooth 48 narrows within receiving chamber 94 and fingers 90a, 90b widen in each circumferential direction to smoothly and quickly reduce flux density radially away from permanent magnet array 20 and encourage radial flux flow.

Figure 10:
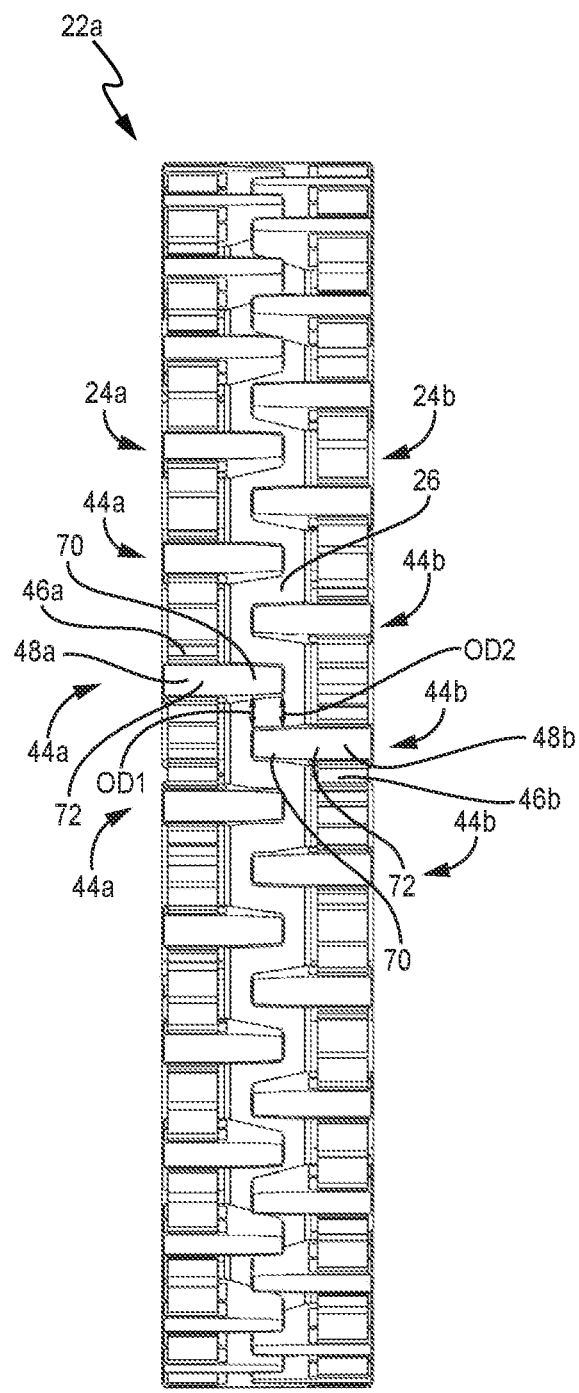
FIG. 10 is a side view of a phase assembly.

FIG. 10 is a side view of a phase assembly 22a. Flux rings 24a, 24b and coil 26 of phase assembly 22a are shown 28. Flux ring 24a includes flux projections 44a formed by holders 46a and teeth 48a. Flux ring 24b includes flux projection assembly 22b having flux projections 44b formed by holders 46b and teeth 48b.

As discussed above, second portion 70 of each tooth 48a, 48b extends axially over coil 26. Teeth 48a, 48b extend partially across the axial length of coil 26. Teeth 48a, 48b do not extend over the full axial length of coil 26, though it is understood that not all examples are so limited. The tapered second portions 70 have tapered tooth offset distances OD1, OD2 that are uniform and constant over the axial length of second portions 70 of each tooth 48a, 48b where the teeth 48a, 48b overlap circumferentially. This uniform and constant tapered tooth offset distance provides for more uniform magnetic flux transfer and reduced flux leakage.

Figure 11A:
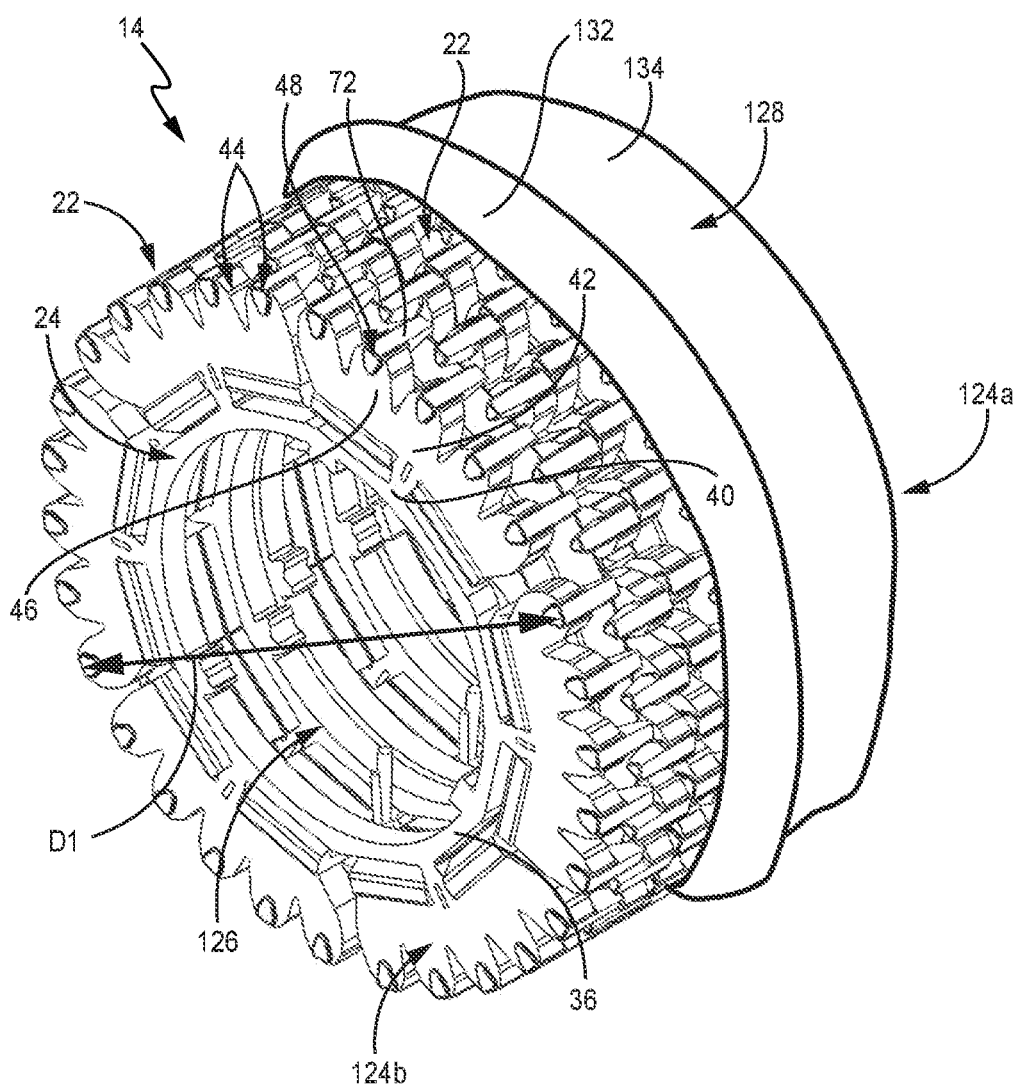
FIG. 11A is a first isometric view of a stator with a potting sleeve in a first state.
Figure 11B:
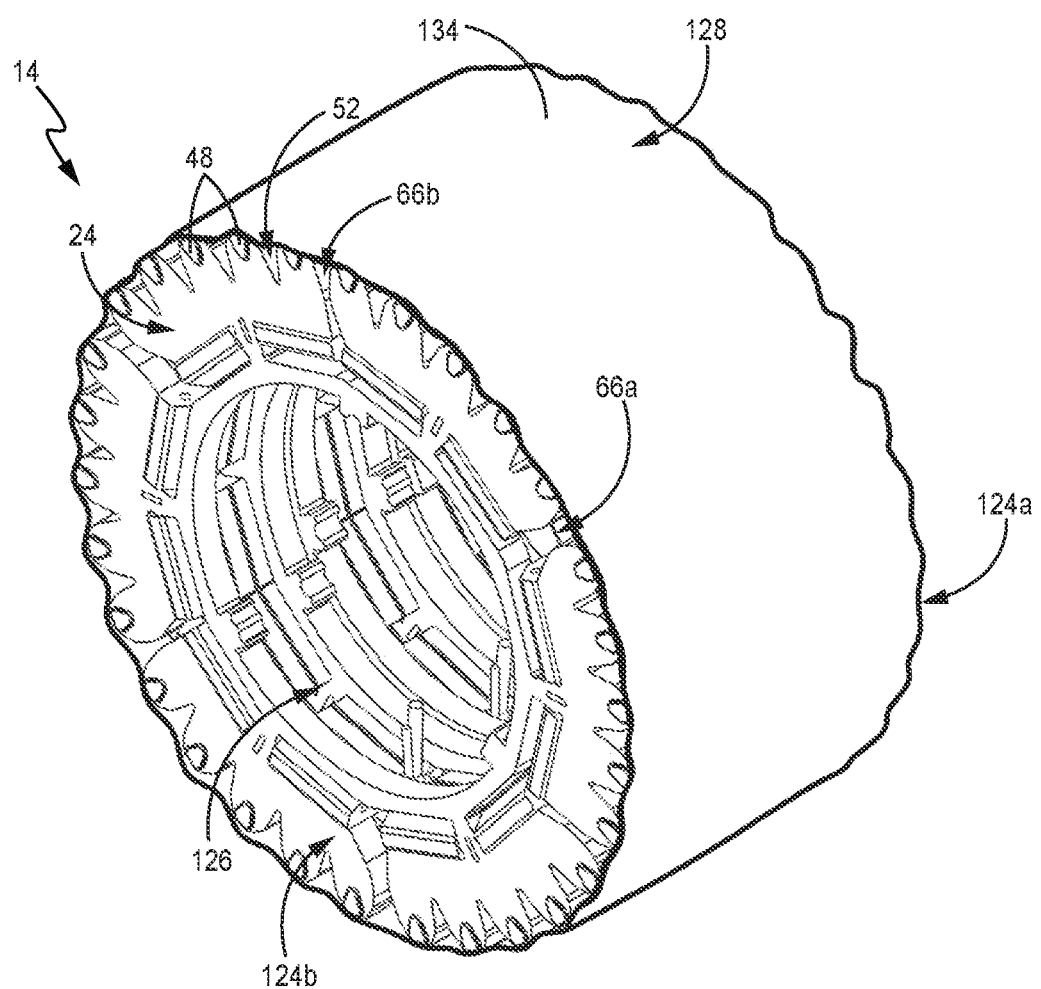
FIG. 11B is a second isometric view of the stator with the potting sleeve in a second state.
Figure 11C:
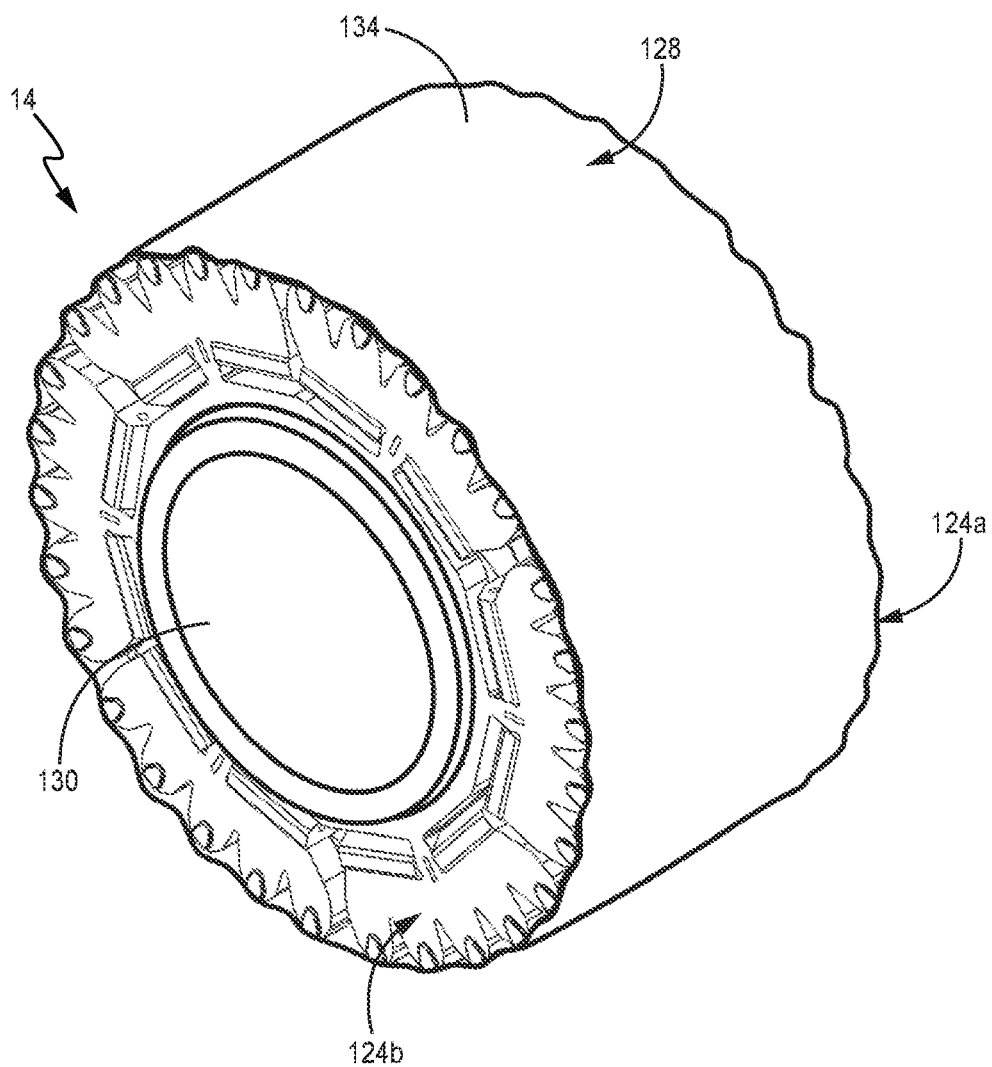
FIG. 11C is a third isometric view of the stator with the potting sleeve in the second state and showing an insert.

FIG. 11A is a first isometric view of stator 14 with potting sleeve 128 in a first state. FIG. 11B is a second isometric view of stator 14 with potting sleeve 128 in a second state. FIG. 11C is a third isometric view of stator 14 with potting sleeve 128 in the second state and showing insert 130. FIGS. 11A-11C will be discussed together. Stator 14 includes phase assemblies 22, stator ends 124a, 124b, and central aperture 126. Sleeve 128 includes sleeve interior 132 and sleeve exterior 134.

Phase assemblies 22 are disposed along motor axis A-A and extend about motor axis A-A. As discussed above, phase assemblies 22 are placed in relative operational positions relative to each other and are arrayed along motor axis A-A. The various phase assemblies 22 are rotationally offset from each other about motor axis A-A when in their operational positions.

With phase assemblies 22 in the respective operational positions, potting compound, such as an epoxy, among other options, is added to stator 14. The potting compound embeds the phase assemblies 22. The potting compound embeds the flux rings 24 within the potting compound. The axial sides of the flux rings 24 are entirely embedded in the potting compound. As such, each of branches 42 and trunk 40 are fully embedded in the potting compound. In some examples, hoops 36 are fully embedded in the potting compound. The potting compound is continuous from the outer cylindrical periphery of stator 12 to the inner cylindrical periphery of stator 12. In some examples, the potting compound is continuous to motor axis A-A (e.g., in examples that do not include insert 130).

Sleeve 128 and insert 130 are utilized during the potting process to minimize the potting compound used and facilitate a small size of air gap 30 (FIGS. 1 and 2A) between stator 14 and rotor 12 (FIGS. 1 and 2A).

Sleeve 128 is elastic and has a relaxed diameter (the dimeter of sleeve 128 in a relaxed state) smaller than a diameter D1 of stator 14. For example, sleeve 128 can be formed from an elastomer, among other options. Sleeve 128 is initially in a rolled configuration with sleeve interior 132 facing outward. Sleeve 128 is placed over stator end 124a and unrolled axially along motor axis A-A and over the exterior of stator 14. Sleeve 128 is everted as sleeve 128 rolls over the exterior of stator 14 such that sleeve interior 132 faces and interfaces with stator 14 and sleeve exterior 134 faces away from stator 14. Sleeve interior 132 directly interfaces with the exterior of stator 14 due to the differing diameters between sleeve 128 and stator 14. As such, sleeve interior 132 directly interfaces with the radial ends of the flux projections 44 of each phase assembly 22. Sleeve interior 132 can directly interface with one or both of teeth 48 and holders 46. Sleeve interior 132 can directly interface with gap faces 72 of teeth 48. Sleeve 128 continues to be rolled over the length of stator 14 until in the second state shown in FIGS. 11B and 11C. In the second state sleeve 128 extends between stator ends 124a, 124b and radially encloses stator 14.

Insert 130 is disposed in central aperture 126 of stator 14. Insert 130 is configured to interface with the interior side of stator 14, such as by contacting the radially inner side of ring bodies 36 of the flux rings 24 of each phase assembly 22. Insert 130 can be inserted axially into central aperture 126 along motor axis A-A. Insert 130 can be a plug that interfaces with stator 14. In some examples, insert 130 can be configured as a bladder that that is filled with a fluid to extend the bladder radially outward to fill central aperture 126 and contact stator 14.

Stator 14 is radially bracketed by sleeve 128 and insert 130. Sleeve 128 and insert 130 form a pot for a potting process. The potting compound can be applied to stator 14 between sleeve 128 and insert 130. As discussed above, some examples do not include insert 130 such that sleeve 128 forms the pot for the potting process.

The difference in diameters between sleeve 128 and stator 14 causes portions of sleeve 128 to contract radially inward in the gaps disposed between flux projections 44. Dimples 136 (FIGS. 12A and 12B) are thereby formed in the outer radial surface of the cured potting compound. The dimples 136 can be formed in the spacer gaps 52 (best seen in FIGS. 4A-4C) between adjacent ones of the flux projections 44, in circumferential gaps 66a, 66b (best seen in FIGS. 4A-4C) between adjacent ones of the flux projections 44, circumferentially between teeth 48 of the same flux ring 24, and in the gaps disposed circumferentially between teeth 48 of flux paired ones of the flux projections 44.

Dimples 136 are formed during the potting process and not by machining after the potting compound is cured. As such, dimples 136 can be irregularly formed in the air gap surface of stator 12 (which is the surface of stator 12 exposed to the air gap 30). The dimples 136 can have irregular depths, be formed between some pairs of teeth 48 and not other pairs of teeth 48, be formed at different locations between different pairs of teeth 48, etc. The elasticity of sleeve 128 causes the irregularities of the dimples 136.

The difference in diameters between sleeve 128 and stator 14 causes direct contact between sleeve 128 and gap faces 72 of teeth 48. As such, gaps are removed from between the gap faces 72 of teeth 48 and the pot partially formed by sleeve 128. Sleeve 128 can thereby prevent potting compound from curing on gap faces 72 such that gap faces 72 are directly exposed to the air gap 30 between stator 14 and rotor 12. As such, powdered metal components (e.g., teeth 48) can be directly exposed to the air gap 30. The gap faces 72 of one or more teeth 48 can be directly exposed to air gap 30 without machining the potting compound off of the teeth 48. It is understood that some of teeth 48 may have an inconsequential layer of potting compound on gap face 72 that may leak between sleeve 128 and that tooth 48.

Removing radial gaps between stator 14 and the pot prevents potting compound from curing on gap faces 72 and from extending radially outward beyond teeth 48. The potting compound does not need to be machined off of stator 14 to expose the teeth 48. Preventing the potting compound from extending radially beyond teeth 48 allows permanent magnet array 20 to be brought closer to stator 14 without concerns of contact between the potting compound and rotor 12. As such, the radial size of air gap 30 can be reduced, increasing motor efficiency and providing a more compact arrangement of electric machine 10.

Figure 12A:
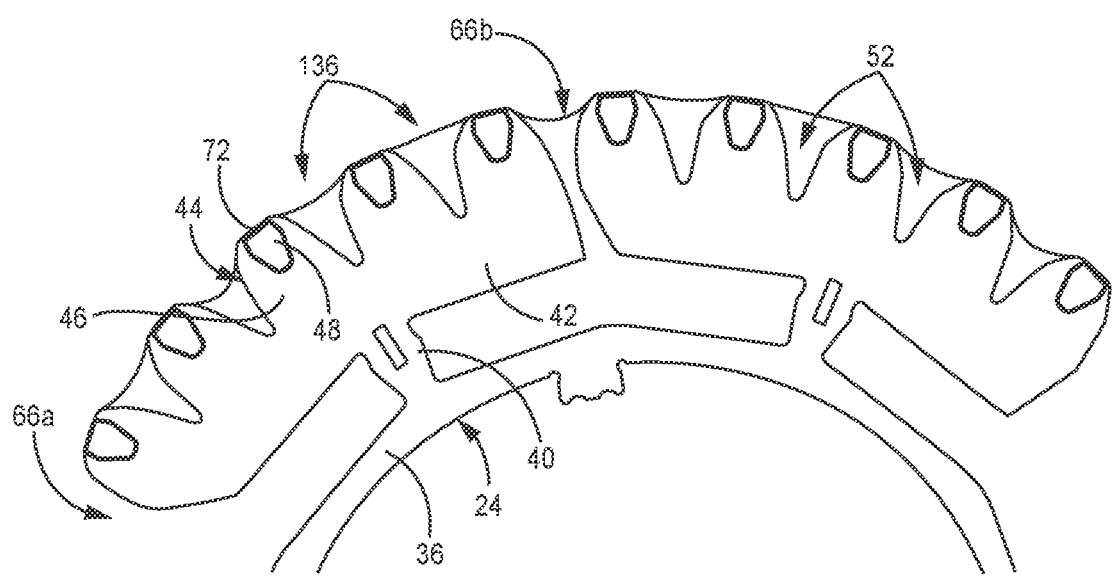
FIG. 12A is an enlarged end view showing a portion of a stator having dimples.
Figure 12B:
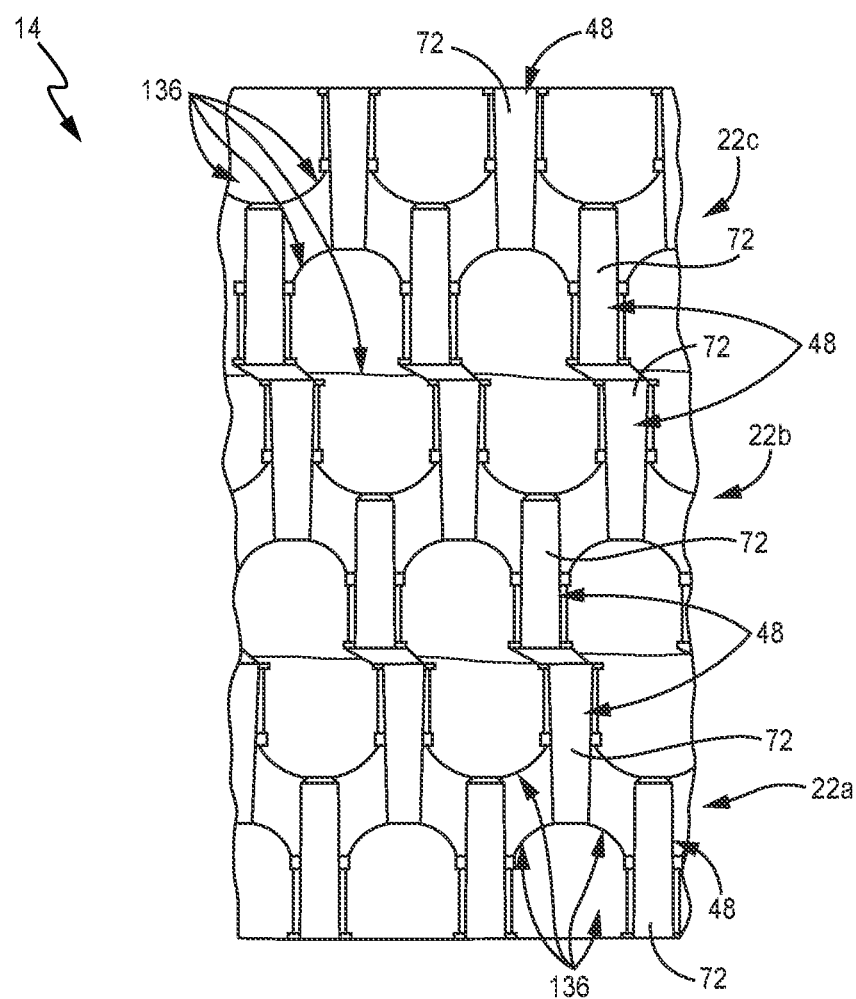
FIG. 12B is a partial side view of the stator showing dimples.

FIG. 12A is an enlarged end view showing a portion of stator 14 and dimples 136. FIG. 12B is a partial side view of stator 14 showing dimples 136. FIGS. 12A and 12B will be discussed together. Phase assemblies 22a-22c (FIG. 12B) of stator 14 are shown. Ring body 36 (FIG. 12A), trunks 40 (FIG. 12A), branches 42 (FIG. 12A), and flux projections 44 of flux ring 24a (FIG. 12A) are shown. Flux projections 44 include holders 46 and teeth 48. Gap faces 72 of teeth 48 are shown.

The exterior surface of stator 14 is irregular and contoured due to the formation of dimples 136 in the potting compound between teeth 48. Dimples 136 are formed in the surface of stator 12 exposed to the air gap 30 during operation. In the example shown, dimples 136 are formed at the radial exterior of stator 14. Dimples 136 extend radially away from the radial ends of flux projections 44. As such, flux projections 44 can form the radially outermost (or innermost in other examples) portion of stator 14 directly after the potting process is complete. More specifically, the exposed gap faces 72 of teeth 48 form the radially outermost portions of stator 14. As best seen in FIG. 12B, dimples 136 can be formed in the gaps between adjacent ones of the flux projections 44, circumferentially between teeth 48 of the same flux ring 24, in the gaps disposed circumferentially between teeth 48 of flux paired ones of the flux projections 44, and in the axial gaps between adjacent phase assemblies 22 (e.g., along axis A-A between the flux projections 44b and flux projections 44c shown in FIG. 6C).

Dimples 136 reduce the amount of potting compound used during the potting process, providing cost and materials savings. Dimples 136 further provide a variable surface of stator 14 exposed to the air gap 30. Dimples 136 thereby reduce the weight of electric machine 10. In addition, dimples 136 provide locations where any debris that does enter the air gap 30 between stator 14 and rotor 12 can collect. Dimples 136 can collect and trap the contaminants that enters the air gap 30 to prevent such contaminants from interfering with rotor 12. Unlike a smooth circumferential surface, the debris can collect in the dimples 136 and is thereby removed from the air gap 30 preventing potential contact damage from the debris. Dimples 136 provide variations in the air gap surface of stator 14 that is exposed to the air gap 30 during operation. As such, the size of the mechanical air gap 30 between stator 14 and rotor 12 varies. The variations in the size of the mechanical air gap 30 makes electric machine 10 less prone to damage at the interface between rotor 12 and stator 14.

As shown, dimples 136 are irregularly formed in the air gap surface of stator 12 that is exposed to the air gap 30. The dimples 136 can have irregular depths, some dimples 136 may be formed in a first area between adjacent teeth 48 while other dimples 136 may form in areas different than the first area between other adjacent pairs of teeth 48. In some examples, dimples 136 can be formed between some of the pairs of teeth 48 while dimples 136 are not formed between other ones of the pairs of teeth 48. The dimple profile can thereby vary between different pairs of teeth 48.

Figure 13:
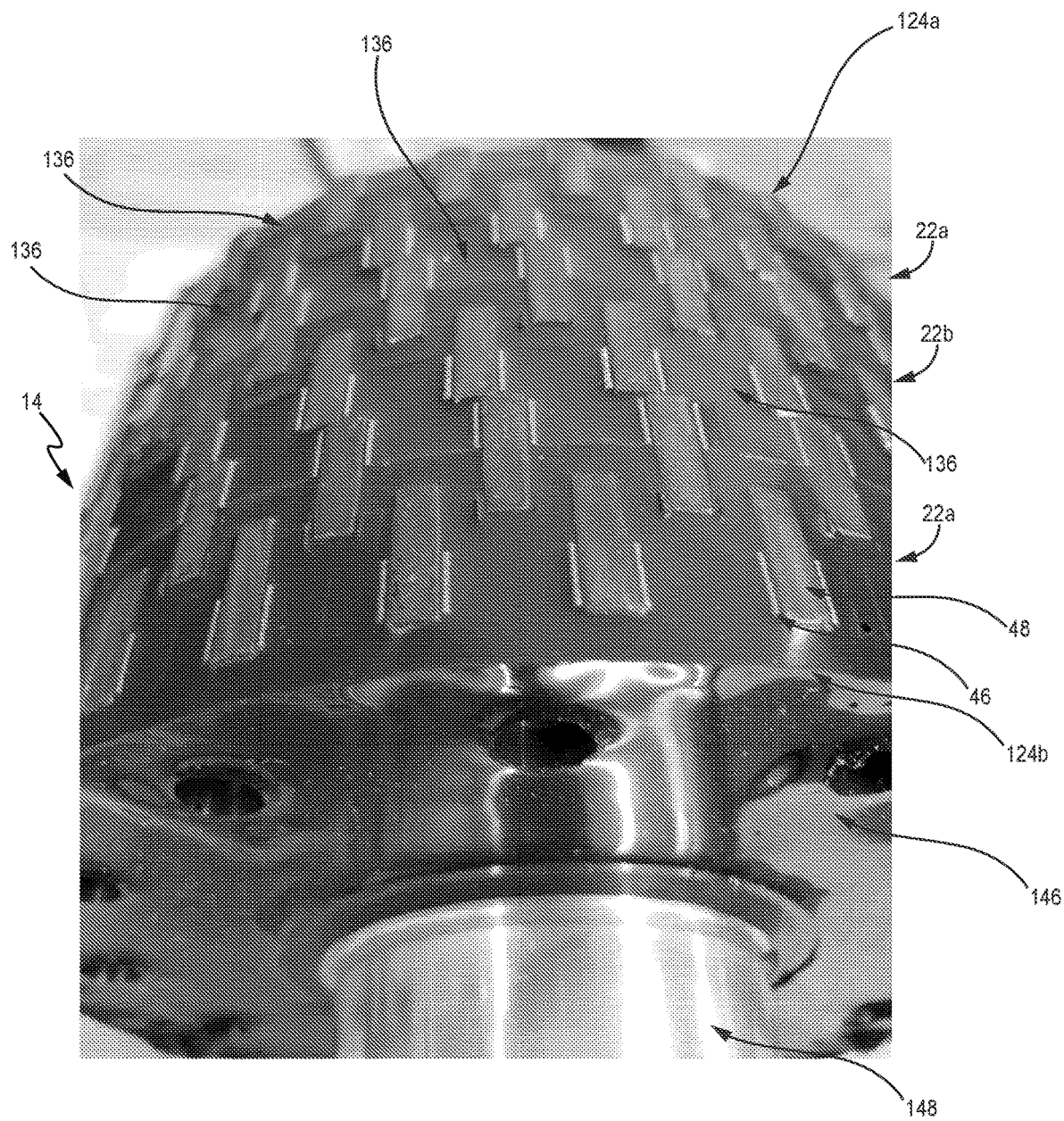
FIG. 13 is a perspective end view of a stator showing dimples.

FIG. 13 is a perspective end view of stator 14 showing dimples 136 in the air gap surface of stator 14. Stator 14 is embedded in potting compound 146. The potting compound 146 embeds the stator 14 such that the axial sides of flux rings 24 are entirely embedded within the potting compound 146. Portions of teeth 48 (e.g., gap faces 72) and portions of holders 46 (e.g., the distal ends 98a, 98b of each finger 90a, 90b) are exposed out of the potting compound 146 to the air gap 30 formed between the stator 14 and a rotor 12. As shown, the potting compound 146 can extend the full radial extent of the stator 14 to a hub 148 on which the stator 14 is mounted.

Dimples 136 are formed between teeth 48. Dimples 136 are formed during the potting process. The dimples 136 are irregularly formed on the air gap surface of stator 14. The profiles of the dimples 136 can vary relative to other ones of the dimples 136. As shown, the air gap surface of stator 14 has a relatively smooth profile proximate stator end 124b and more defined dimples 136 proximate stator end 124a. The dimples 136 are formed such that stator 14 has an irregular and contoured surface exposed to the air gap 30. Dimples 136 can extend axially between teeth 48 and circumferentially between teeth 48.

Dimples 136 further provide a variable surface of stator 14 exposed to the air gap 30. Dimples 136 thereby reduce the weight of electric machine 10. In addition, dimples 136 provide locations where any debris that does enter the air gap 30 between stator 14 and rotor 12 can collect. Trapping the contaminants in dimples 136 prevents those contaminants from adversely affecting operation of rotor 12.

Figure 14A:
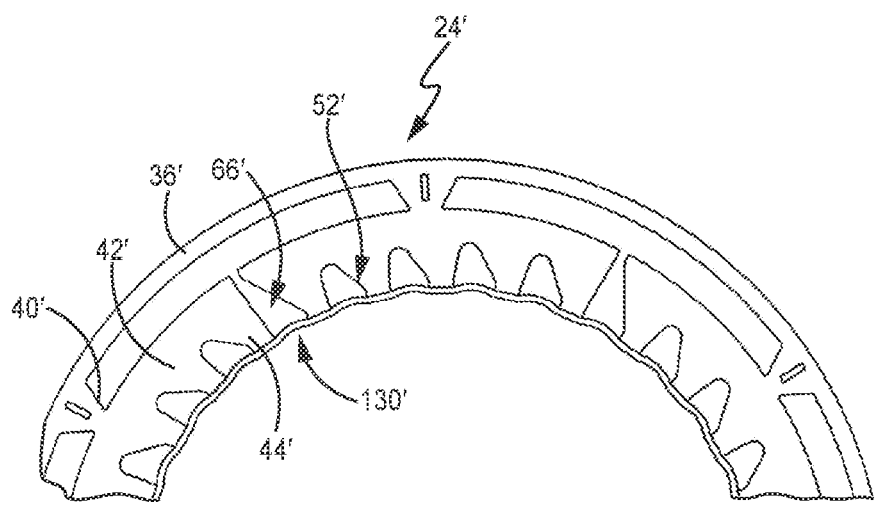
FIG. 14A is an end view of a portion of a flux ring for an inner rotator motor and showing an insert.
Figure 14B:
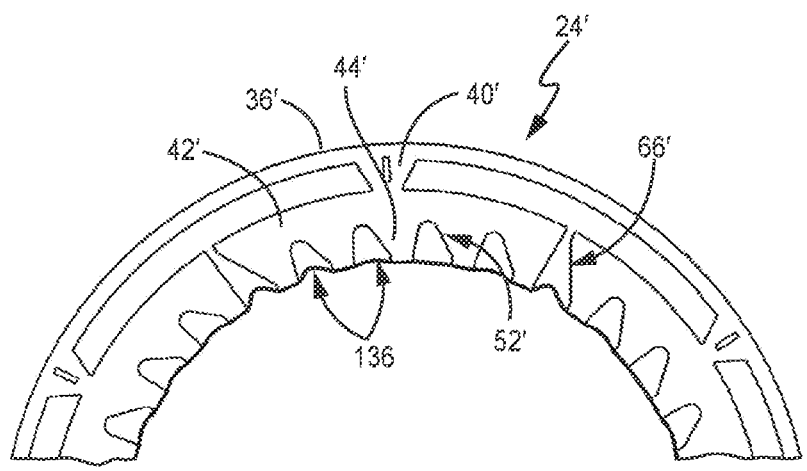
FIG. 14B is an end view similar to 14A showing the flux ring after potting compound has cured and insert is removed.

FIG. 14A is an end view of a portion of a flux ring 24' and insert 130'. FIG. 14B is an end view similar to 14A showing flux ring 24' after potting compound has cured and insert 130' is removed. Flux ring 24' includes ring body 36', trunks 40', branches 42', and flux projections 44'.

In the example shown, flux ring 24' is for a stator in an inner rotator motor where the rotor is disposed radially within stator 14'. As such, ring body 36' forms the radially outer portion of flux ring 24' relative to a rotational axis of the rotor. Trunks 40' extend radially inward from ring body 36'. Branches 42' are supported by trunks 40'. Flux projections 44' extend radially inward from branches 42'. In the example shown, flux projections 44' are laminate parts but it is understood that some examples of flux projections 44' include powdered metal components, such as teeth 48 (best seen in FIGS. 7A-7E). Circumferential gaps 66' are similar to gaps 66a, 66b (best seen in FIGS. 4A-4C) and extend radially between branches. Spacer gaps 52' are similar to gaps 52 (best seen in FIGS. 4A-4C) and extend circumferentially between adjacent ones of flux projections 44.

Insert 130' forms a radially inner portion of the pot utilized during the potting process. A sleeve, similar to sleeve 128 (FIGS. 11A-11C), can be disposed about the exterior of the stator to form the outer portion of the pot. In some examples, a rigid outer sleeve, metallic tube, or other container can be utilized radially outside of the stator of flux ring 24' as the radially outer side of the stator is not exposed to the mechanical air gap because flux ring 24' is for an inner rotator motor. Insert 130' can be elastic and extend through a center aperture of the stator. Insert 130' is inserted into the stator and expanded radially outward into the circumferential gaps 66' and spacer gaps 52' between flux projections 44'. For example, insert 130 can be a bladder configured to be filled with a fluid or can be a compression assembly, among other options. As shown in FIG. 14B, dimples 136 are formed in the potting compound between the flux projections 44.

The dimples 136 form variations in the air gap surface of the stator. As shown, dimples 136 are irregularly formed in the air gap surface of stator 12 that is exposed to the air gap. The dimples 136 can have irregular depths, some dimples 136 may be formed in a first area between adjacent teeth 48 while other dimples 136 may form in areas different than the first area between other adjacent pairs of teeth 48. In some examples, dimples 136 can be formed between some of the pairs of teeth 48 while dimples 136 are not formed between other ones of the pairs of teeth 48. The dimple profile can thereby vary between different pairs of teeth 48. Dimples 136 reduce the weight of the inner rotator motor and the material cost of the motor. In addition, dimples 136 provide locations where any debris that does enter the air gap, similar to air gap 30 (FIGS. 1 and 2A), between the stator and rotor can collect. The variations in the size of the mechanical air gap makes motor less prone to damage at the interface between rotor and stator.

Figure 15:
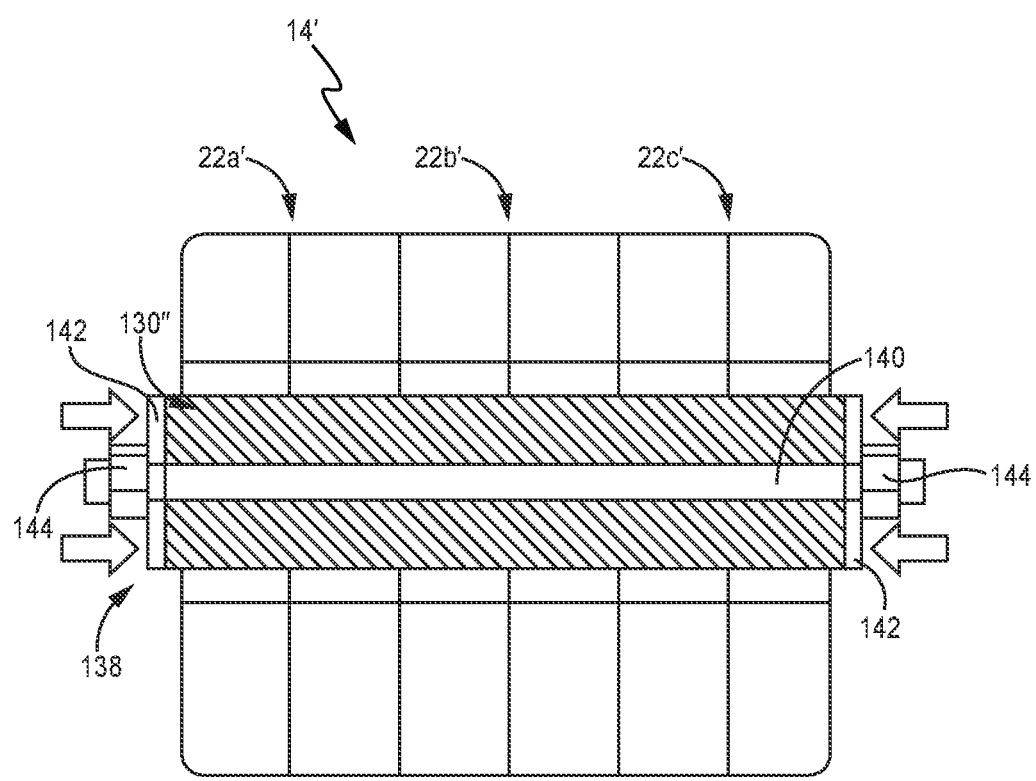
FIG. 15 is a schematic diagram of an insert within a stator of an inner rotator motor.

FIG. 15 is a schematic diagram of insert 130" within a stator 14' of an inner rotator motor. Stator 14' includes phase assembly 22a', phase assembly 22b', and phase assembly 22c'. Insert 130" is substantially similar to insert 130' (FIG. 14A) and is configured to contact the flux projections 44' (FIGS. 14A and 14B) in each phase assembly 22a'-22c' such that dimples 136 are formed in the potting compound.

Expansion assembly 138 extends through the interior of insert 130". Expansion assembly 138 includes extension 140, plates 142, and adjusters 144. Expansion assembly 138 extends through insert 130" and is configured to cause insert 130" to expand radially to contact phase assemblies 22a'-22c'. Plates 142 are disposed on opposite axial ends of stator 14'. Extension 140 extends through insert 130" and is operably connected to plates 142. For example, extension 140 can be a rod extending through insert 130" and through plates 142. Adjusters 144, which can be nuts connected to threaded ends of extension 140, are used to move the plates 142 axially closer together, providing a compressive force on insert 130". The compressive force causes insert 130" to radially expand within stator 14' to interface with phase assemblies 22a'-22c'.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flux ring for a phase assembly of a stator of a transverse flux electric motor, the flux ring comprising:
a ring body disposed about a motor axis;
a plurality of trunks extending radially from the ring body;
a plurality of branches supported by the plurality of trunks radially away from the ring body such that a plurality of return openings are formed between the ring body and the plurality of branches;
a plurality of flux projections extending radially from the plurality of branches and away from the ring body;
a first plurality of gaps each disposed circumferentially between adjacent flux projections of the plurality of flux projections; and
a second plurality of gaps each disposed circumferentially between adjacent branches of the plurality of branches;
wherein the second plurality of gaps are disposed asymmetrically about the motor axis such that a first pair of adjacent branches of the plurality of branches are spaced by a first circumferential gap, a second pair of adjacent branches of the plurality of branches are spaced by a second circumferential gap, and the first circumferential gap is larger than the second circumferential gap.

2. The flux ring of claim 1, wherein a terminal flux projection of a first branch of the first pair of adjacent branches projects circumferentially from the first branch.

3. The flux ring of claim 1, wherein each branch of the plurality of branches supports a subset of the plurality of flux projections, and wherein each subset of the plurality of flux projections is circumferentially offset relative to the trunk supporting the branch.

4. The flux ring of claim 3, wherein each return opening includes:
a first receiving portion receiving portion having a first radial side formed by a base of a first branch; and
a second receiving portion having a second radial side formed by a base of a second branch.

5. The flux ring of claim 4, wherein the base of the first branch has a first width and the base of the second branch has a second width, and wherein the first width is the same as the second width.

6. The flux ring of claim 3, wherein each trunk of the plurality of trunks defines a first circumferential side of a first return opening of the plurality of return openings and a second circumferential side of a second return opening of the plurality of return openings, and wherein the plurality of trunks are disposed asymmetrically about the motor axis.

7. The flux ring of claim 6, wherein each branch of the plurality of branches includes a first radial base extending in a first circumferential direction from the trunk supporting that branch and a second radial base extending in a second circumferential direction from the trunk supporting that branch, and wherein the first radial base is disposed transverse to the second radial base.

8. The flux ring of claim 7, wherein the first radial base has a first width and the second radial base has a second width, and wherein the first width is the same as the second width.

9. A phase assembly for a transverse flux electric motor, the phase assembly comprising:
a first flux ring disposed about a motor axis;
a second flux ring spaced axially from the first flux ring;
a coil disposed axially between the first flux ring and the second flux ring; and
a plurality of axial returns extending between the first flux ring and the second flux ring, wherein each axial return of the plurality of axial returns extends into a first return opening of the first flux ring and in a second return opening of the second flux ring;
wherein the plurality of axial returns are disposed asymmetrically about the motor axis such that a first axial return of the plurality of axial returns is circumferentially adjacent to a second axial return of the plurality of axial returns and a third axial return of the plurality of axial returns and a first circumferential gap between the first axial return and the second axial return is greater than a second circumferential gap between the first axial return and the third axial return.

10. The phase assembly of claim 9, further comprising:
a first coil connector of the coil that extends from the coil and radially through a return gap formed between the first axial return of the plurality of axial returns and the second axial return of the plurality of axial returns; and
a second coil connector of the coil that extends from the coil and radially through the return gap.

11. The phase assembly of claim 10, wherein the plurality of axial returns are disposed on a first radial side of the coil, wherein the first coil connector extends from the first radial side of the coil to the return gap, and wherein the second coil connector extends around an axial side of the coil to the return gap.

12. The phase assembly of claim 11, wherein at least a portion of the second coil connector is disposed circumferentially between laminate portions of the first flux ring.

13. The phase assembly of claim 11, wherein:
the first flux ring comprises:
   a first ring body disposed about the motor axis;
   a first plurality of trunks extending radially from the first ring body;
   a first plurality of branches supported by the first plurality of trunks radially away from the first ring body such that a plurality of the first return openings are formed between the first ring body and the first plurality of branches;
   a first plurality of flux projections extending radially from the first plurality of branches and away from the first ring body; and
   a first plurality of gaps each disposed circumferentially between adjacent branches of the first plurality of branches; and
the second coil connector extends axially relative to the coil and into a first gap of the first plurality of gaps.

14. The phase assembly of claim 13, wherein the first plurality of flux projections are disposed asymmetrically about the motor axis.

15. The phase assembly of claim 14, wherein the first plurality of branches are disposed asymmetrically about the motor axis.

16. The phase assembly of claim 13, wherein
the second flux ring comprises:
   a second ring body disposed about the motor axis;
   a second plurality of trunks extending radially from the second ring body;
   a second plurality of branches supported by the second plurality of trunks radially away from the second ring body such that a plurality of the second return openings are formed between the second ring body and the second plurality of branches;
   a second plurality of flux projections extending radially from the second plurality of branches and away from the second ring body; and
   a second plurality of gaps each disposed circumferentially between adjacent branches of the second plurality of branches;
the coil is disposed axially between the first plurality of branches and the second plurality of branches.

17. An electric motor comprising:
a rotor which rotates about a motor axis; and
a stator comprising at least one phase, each phase comprising:
   a first flux ring comprising a first plurality of trunks and a first plurality of flux projections that are supported by the first plurality of trunks, wherein the first plurality of trunks are unevenly arrayed circumferentially around the motor axis;
   a second flux ring comprising a second plurality of trunks and a second plurality of flux projections that are supported by the second plurality of trunks; and
   a coil that is coaxial with the motor axis and located directly between the first flux ring and the second flux ring, the coil configured to be energized to electromagnetically polarize the first plurality of flux projections with respect to the second plurality of flux projections;
   wherein the first plurality of trunks are unevenly arrayed circumferentially around the motor axis such that a first pair of adjacent trunks of the first plurality of trunks have a first separation distance circumferentially therebetween and a second pair of adjacent trunks of the first plurality of trunks have a second separation distance circumferentially therebetween that is different than the first separation distance.

18. The electric motor of claim 17, wherein the first plurality of trunks are unevenly arrayed circumferentially around the motor axis such that a third pair of adjacent trunks of the first plurality of trunks have a third separation distance between them that is different than the first distance and the second separation distance.

19. The electric motor of claim 17, wherein each trunk of the first plurality of trunks extends radially with respect to the motor axis and supports a respective plurality of branches that respectively support the first plurality of flux projections.

20. The phase assembly of claim 9, wherein the first plurality of axial returns are disposed asymmetrically about the motor axis such a fourth axial return of the plurality of axial returns is disposed circumferentially adjacent to the third axial return and such that a third circumferential gap between the third axial return and the fourth axial return is smaller than the second circumferential gap.

* * * * *